United States Patent [19]
Ono et al.

[11] Patent Number: 5,142,410
[45] Date of Patent: Aug. 25, 1992

[54] IMAGE RELAYING OPTICAL SYSTEM

[75] Inventors: Katsuya Ono, Tokyo; Akira Kikuchi, Kanagawa, both of Japan

[73] Assignee: Olympus Optical Co., Ltd., Tokyo, Japan

[21] Appl. No.: 508,670

[22] Filed: Apr. 13, 1990

[30] Foreign Application Priority Data

Apr. 14, 1989 [JP] Japan .................................. 1-92949
Apr. 14, 1989 [JP] Japan .................................. 1-95014

[51] Int. Cl.5 ........................ G02B 23/00; G02B 9/04
[52] U.S. Cl. .................................. 359/435; 359/434; 359/793
[58] Field of Search ........ 350/501, 504, 505, 572–574, 350/447, 474, 480, 96.26, 96.18, 96.31; 128/4, 6; 359/708, 713–716, 754, 784, 793

[56] References Cited

U.S. PATENT DOCUMENTS

| 4,545,652 | 10/1985 | Hoogland | 350/432 |
| 4,779,613 | 10/1988 | Hashiguchi et al. | 350/589 |
| 4,946,267 | 8/1990 | Hoagland | 350/447 |

FOREIGN PATENT DOCUMENTS

| 2305473 | 8/1974 | Fed. Rep. of Germany . |
| 1260786 | 4/1961 | France . |
| 49-5993 | 2/1974 | Japan . |
| 52-4245 | 1/1977 | Japan . |
| 57-207215 | 12/1982 | Japan . |
| 61-77819 | 4/1986 | Japan . |
| 1443150 | 7/1976 | United Kingdom . |

Primary Examiner—Bruce Y. Arnold
Assistant Examiner—James Phan
Attorney, Agent, or Firm—Cushman, Darby & Cushman

[57] ABSTRACT

An image transmission optical system wherein a lens unit serving for relaying an image for a unit relaying distance consists of two bar-shaped cemented lens components, and each of said lens components consists of a bar-shaped lens element and two lens elements which are cemented to both the end surfaces of said bar-shaped lens element respectively of said bar-shaped lens element and have a refractive index higher than that of said bar-shaped lens element. This image transmission optical system comprises a small number of air-contact surfaces and has favorably corrected aberrations.

11 Claims, 26 Drawing Sheets

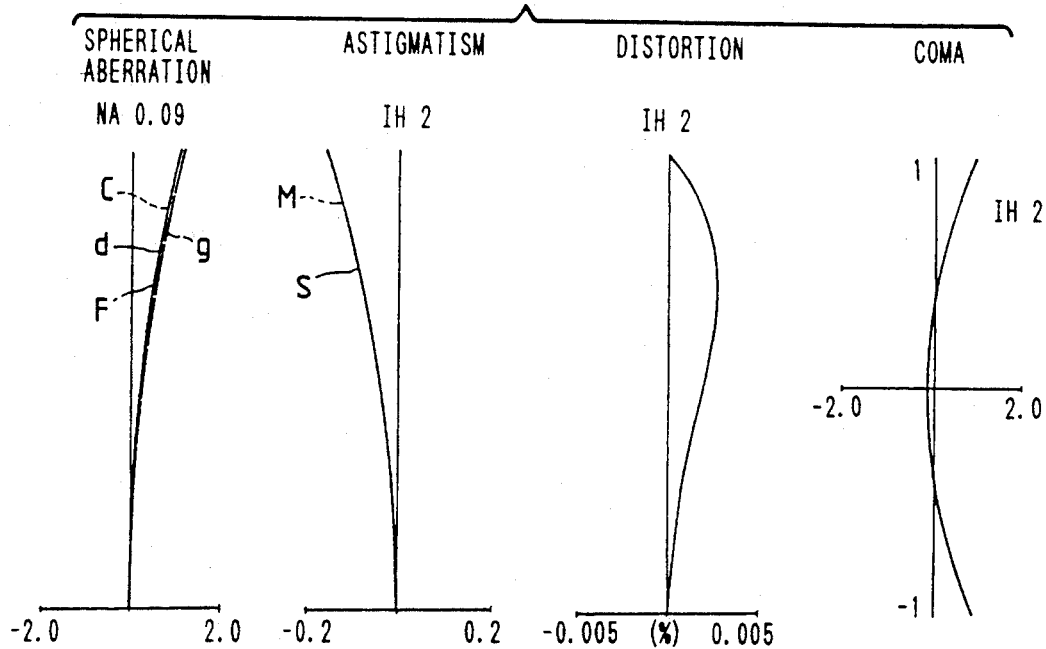
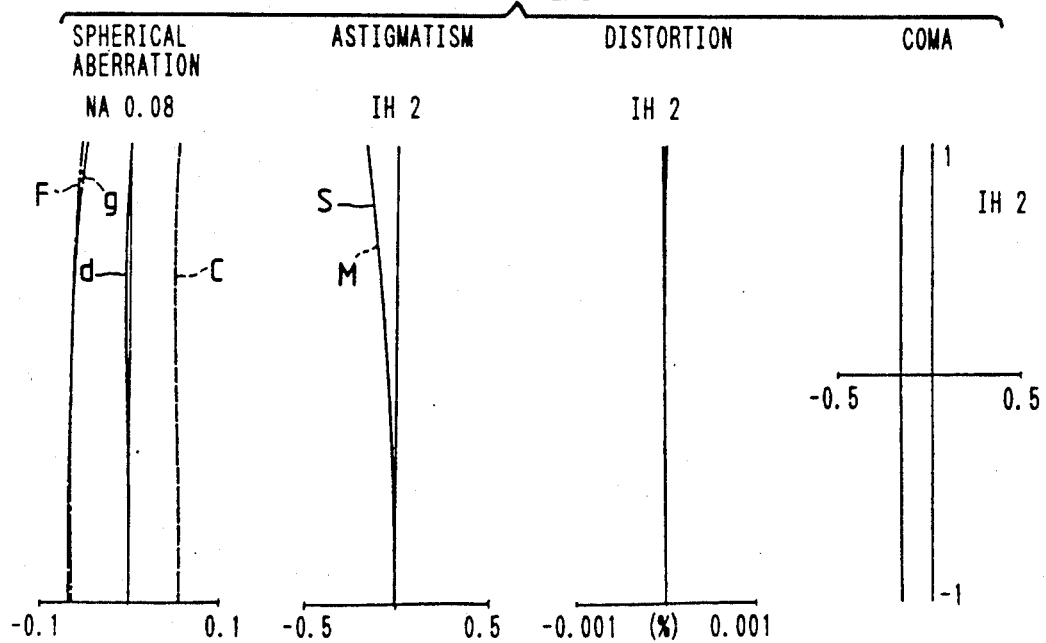

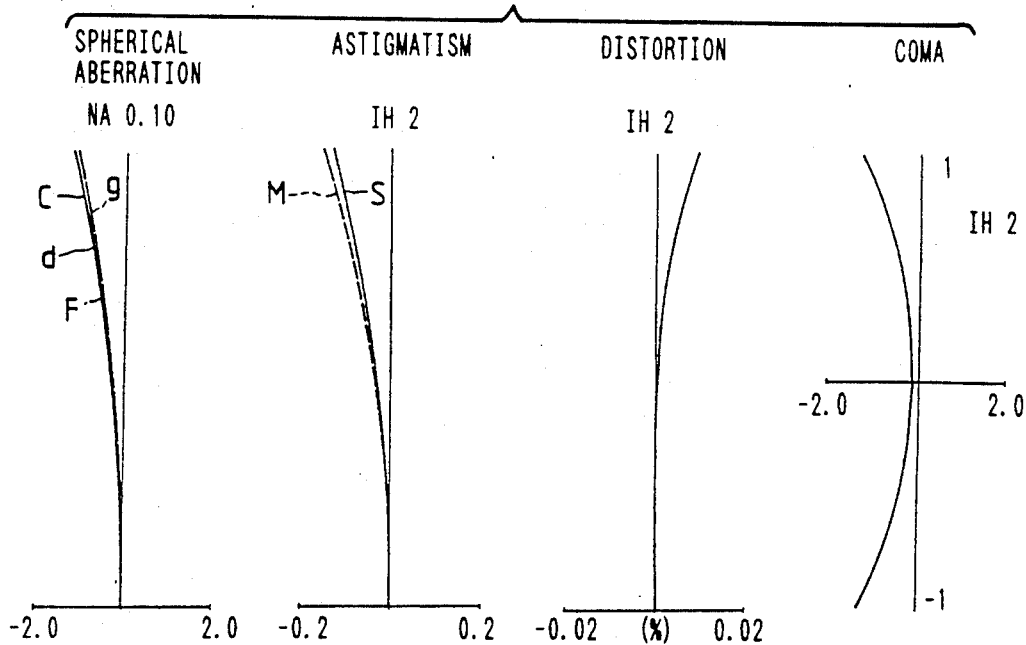
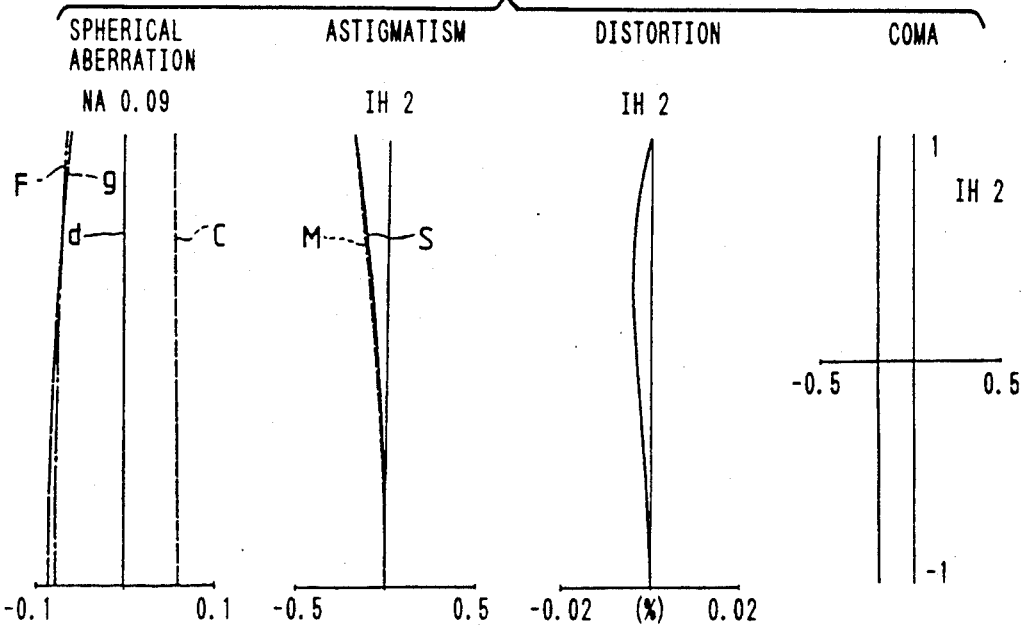

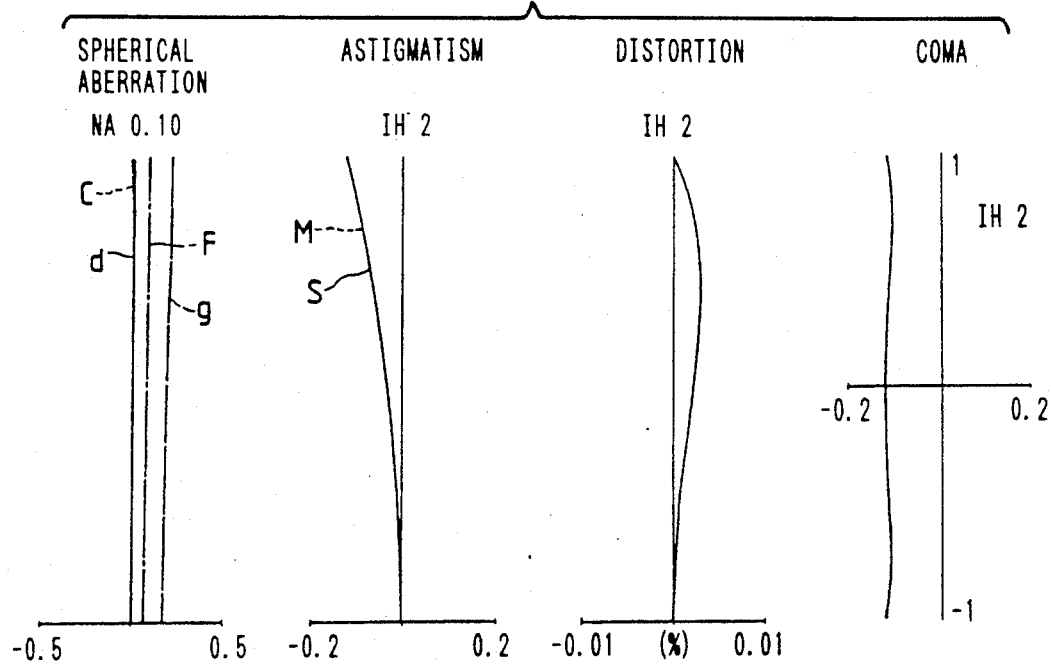
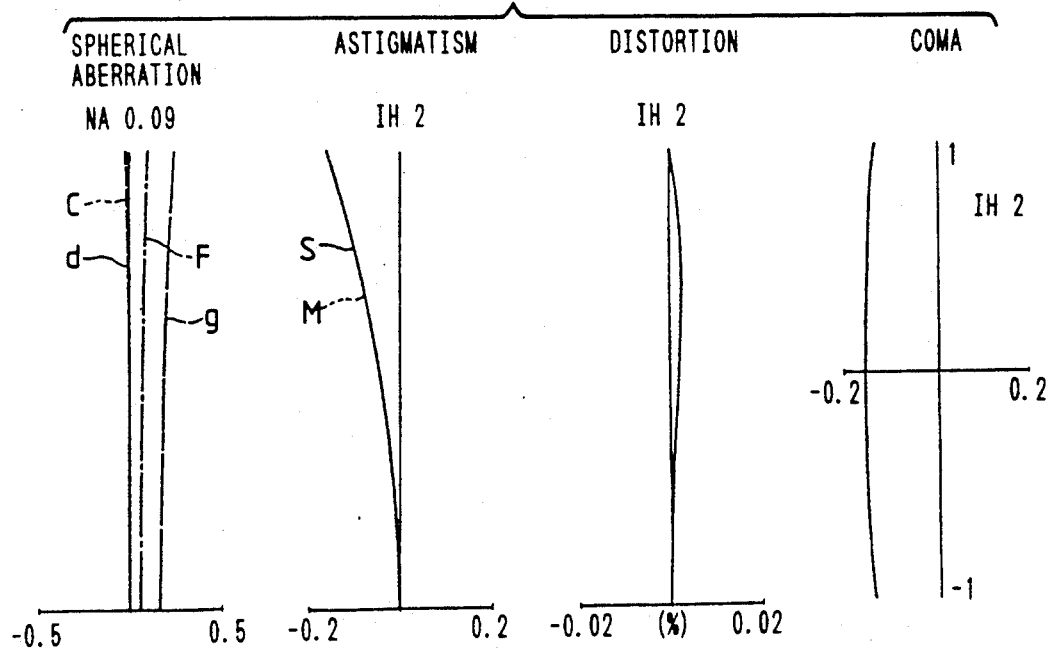

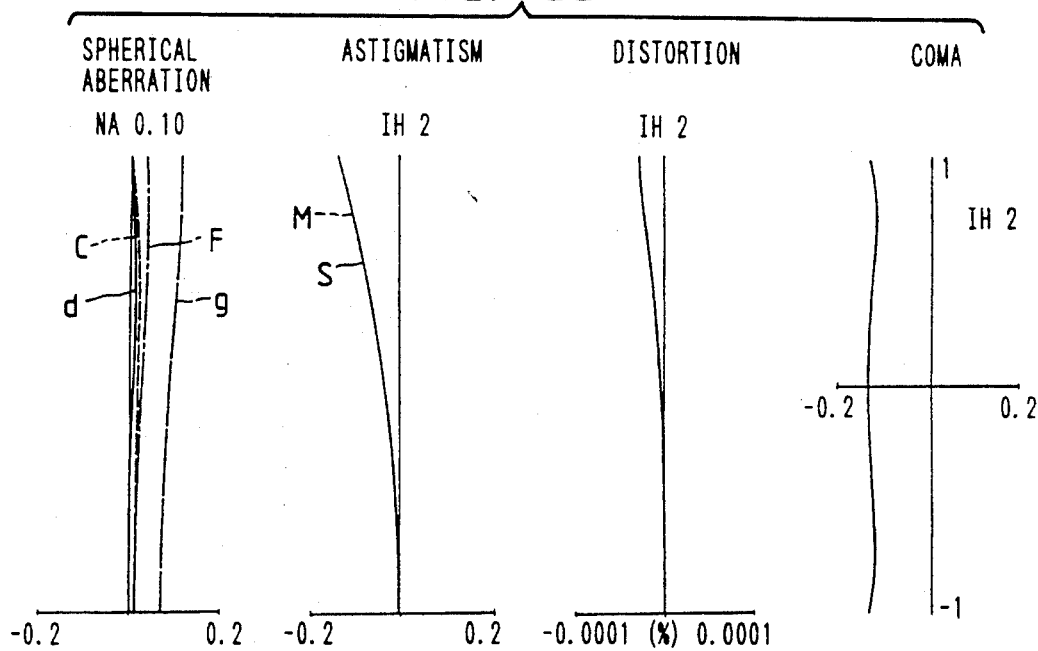
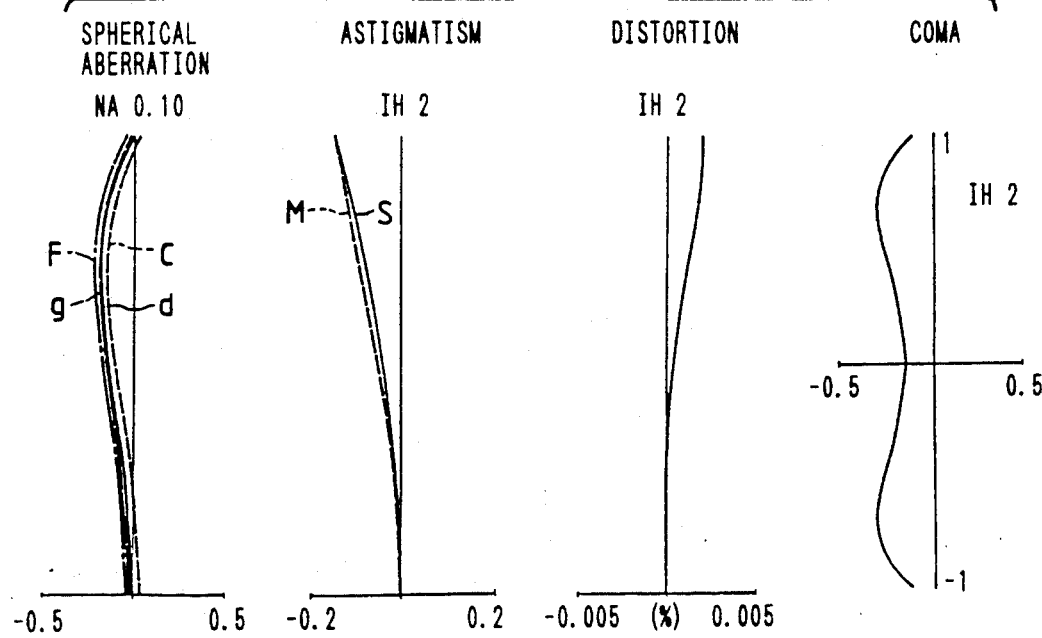

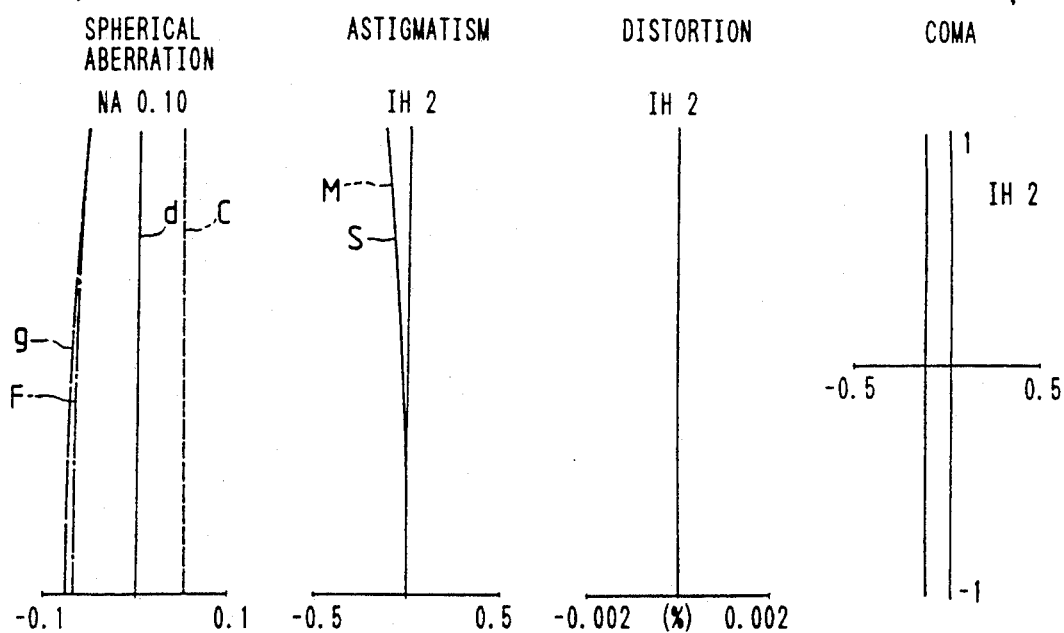
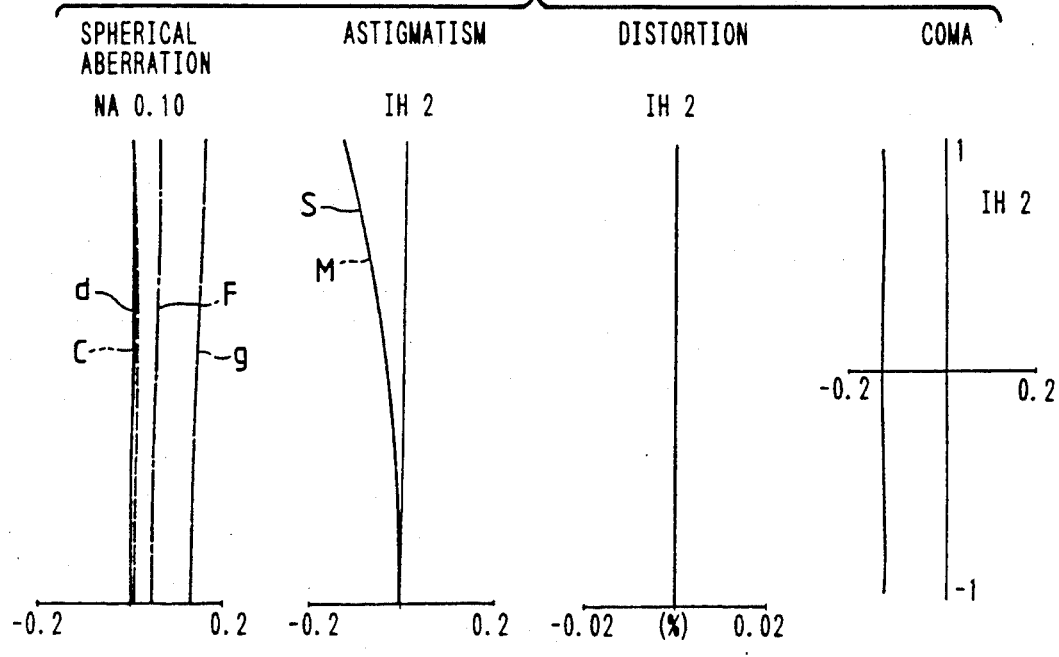

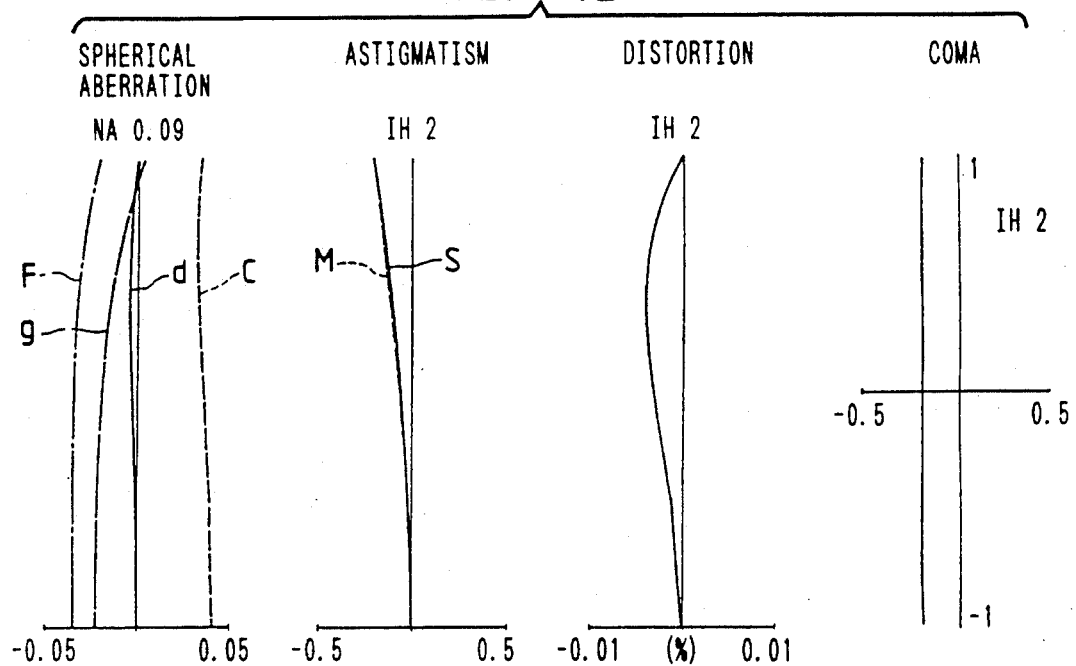
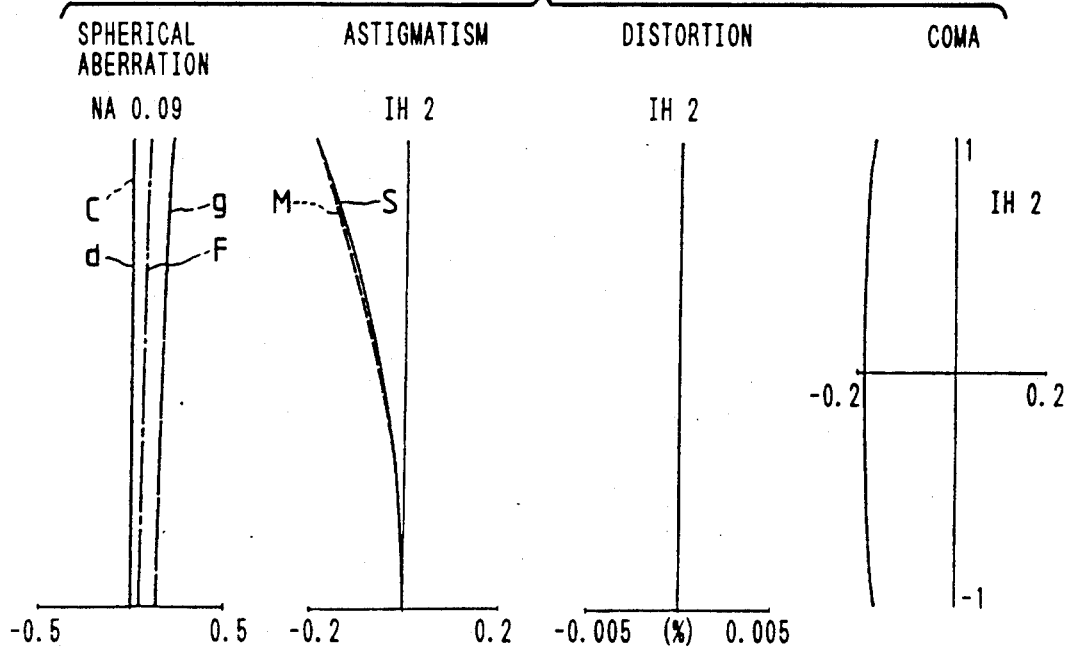

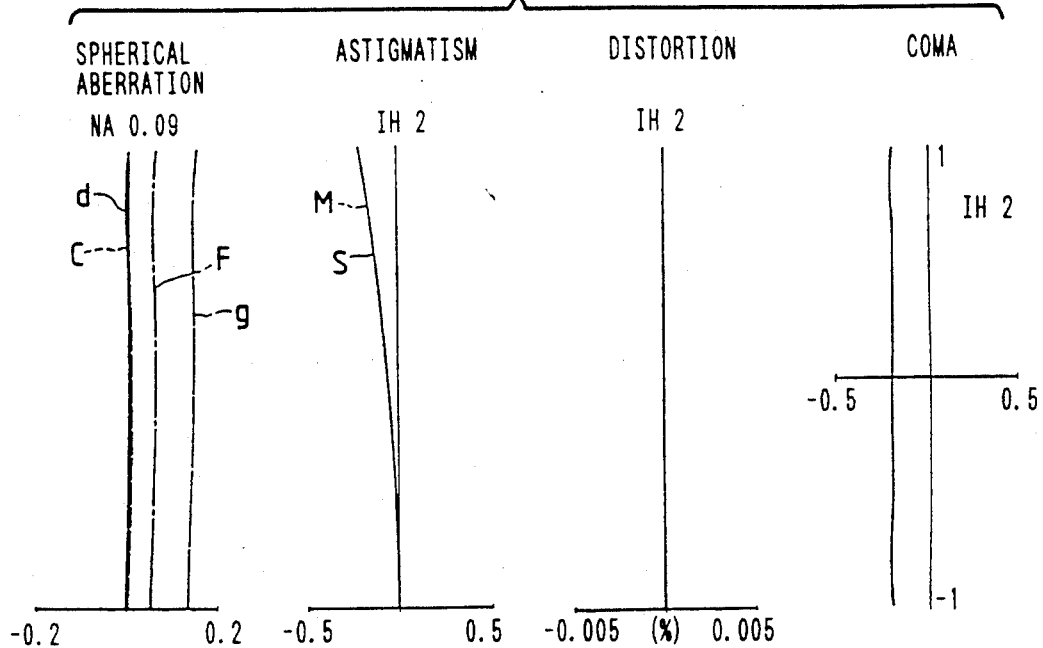
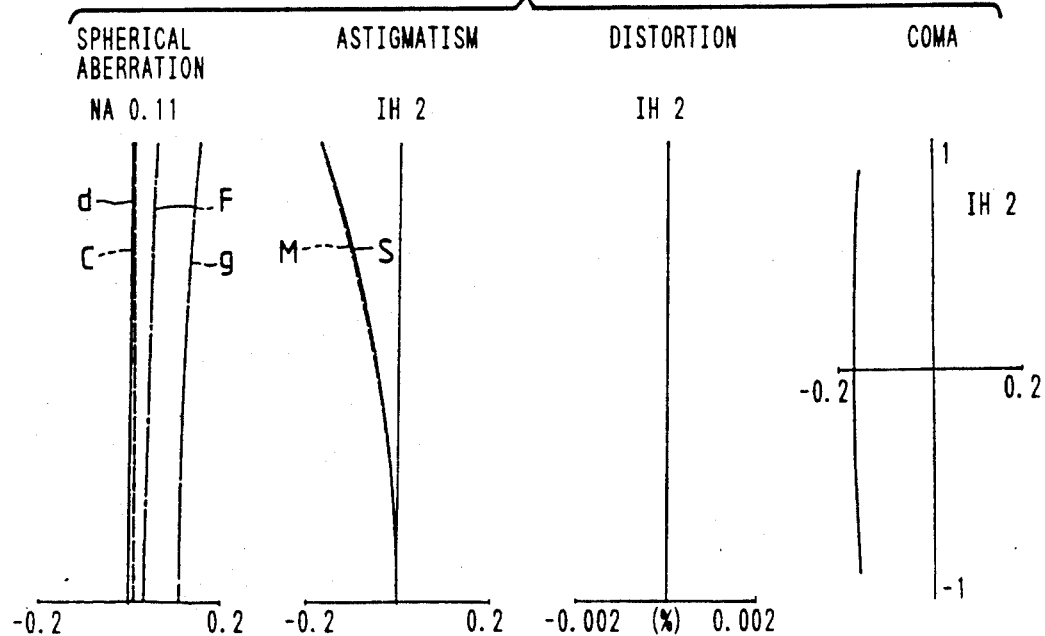

IMAGE RELAYING OPTICAL SYSTEM

BACKGROUND OF THE INVENTION (a) Field of the Invention:

The present invention relates to an image transmission optical system that may be used in optical instruments, such as flexible endoscopes and nonflexible endoscopes equipped with distal ends, which are adapted so as to insert cylindrical members into locations permitting no direct observation and allow observation of images of objects from positions apart from the objects by transmitting the images through the cylindrical members.

(b) Description of the prior art:

There is known the optical system disclosed by Japanese Patent Kokoku Publication No. Sho 49-5993 shown in FIG. 1 as an image transmission optical system to be used in non-flexible endoscopes and so on. This image transmission optical system uses bar-shaped lens components 1 and 1' which are arranged symmetrically with regard to a plane P as a lens unit for relaying an image. This lens unit functions to focus an image I of an object again as another image I'. This image transmission optical system focuses the image of object I into the image I' by using the lens unit as an image relaying unit and relays the image of the object from the left side to the right side in FIG. 1 by repeating the relaying operation described above. An image transmission optical system capable of relaying an image for a desired distance can be composed by arranging the lens unit consisting of the bar-shaped lens components 1 and 1' used as the relaying unit in a required number. Further, in the image transmission optical system, surfaces 1a and 1a' having positive refractive powers serve as the visual field lenses for sequentially transmitting a pupil even when the unit lens system for image relaying (the above-mentioned lens unit) is used in a large number.

The above-described image transmission optical system has a simple composition, but is insufficient in the aberration correcting capability thereof, whereby said optical system allows curvature of field and astigmatism to be produced remarkably and constitutes a cause for degradation of image especially when said optical system is used in a long nonflexible endoscope which requires a large number of image relaying operations.

In order to correct this defect, there is known another image transmission optical system consisting of a lens unit having the composition illustrated in FIG. 2. In this image transmission optical system, a pair of meniscus lens components 2 and 2', which have concave surfaces opposite to each other are arranged between the bar-shaped lens components 1 and 1' shown in FIG. 1, and the lens unit is arranged symmetrically with regard to the plane P. This optical system is adapted in such a manner that negative curvature of field and negative astigmatism are corrected by the meniscus lens components which are opposite to each other. However, this optical system comprises a large number of surfaces kept in contact with air, i.e., eight air-contact surfaces per lens unit. Accordingly, reflections on these air-contact surfaces pose a problem. Speaking concretely, loss of light due to reflections results in reduction of amount of light when an image is relayed in a large number of times and an image is colored due to variation of spectral reflectance of the respective reflecting surfaces. Further, the image transmission optical system comprises a large number of lens components, and requires tedious procedures and a long time for assembly. In addition, since imaging performance of the optical system is dependent more largely on eccentricity of the meniscus lens components than eccentricity of the other lens components, even a slight manufacturing or assembling error constitutes a cause for undesirable local blurring, eclipse of pupil, etc. There are known image transmission optical systems which use aspherical surfaces for solving the problem described above as exemplified by the image transmission optical system disclosed by Japanese Patent Kokai Publication No. Sho 57-207215 shown in FIG. 3. This image transmission optical system comprises lens units, each consisting of two bar-shaped cemented lens components each of which is composed of a bar-shaped biconvex lens element having a relatively high refractive index for favorably correcting Petzval's sum, and two negative lens elements made of materials having relatively low refractive indices respectively and cemented to both ends of said lens element. In this image transmission optical system, the spherical aberration produced by the cemented surfaces (spherical surfaces) is corrected by the aspherical surfaces formed as the air-contact surfaces of the lens elements having the negative refractive power.

In this image relaying optical system, however, aberrations are produced by the lens surfaces and imaging performance is degraded when radii of curvature are enlarged on the convex surfaces of the bar-shaped biconvex lens element for obtaining positive refractive power of each lens component. It is therefore necessary to obtain positive refractive power of each lens component without enlarging so much the radius of curvature on the bar-shaped lens element, and refractive power of the bar-shaped lens element must be strengthened very much. Further, this conventional image relaying optical system has a composition which hardly permits correcting astigmatism and spherical aberration at the same time. FIG. 4 shows curves illustrating aberration characteristics calculated on the basis of the numerical data listed in Table 2 of Japanese Patent Kokai Publication No. Sho 57-207215. As is understood from these curves, astigmatism is corrected sufficiently but correction of spherical aberration is no sufficient in the image transmission optical system disclosed by the above-mentioned publication. Since aberrations produced by each relay lens unit are added as an image is sequentially transmitted by relay lens units in an image transmission optical system, it is undesirable to use the above-mentioned conventional image optical system in non-flexible endoscopes.

SUMMARY OF THE INVENTION

A primary object of the present invention is to provide an image optical system comprising lens units having a small number of air-contact surfaces, having favorably corrected aberrations and being suited for use in non-flexible endoscopes.

A first type of the image transmission optical system according to the present invention comprises, as shown in FIG. 5, a plurality of lens components, and has a composition wherein a relay lens unit serving for relaying an image for a unit distance consists of two bar-shaped cemented lens components 4 and 4' arranged along the same optical axis and composed of bar-shaped lens elements 6 and 6' plus lens elements 5, 7 and 5', 7' which have a refractive index higher than that of said bar-shaped lens elements and cemented to the end surfaces thereof.

Since the lens elements cemented to the end surfaces of the bar-shaped lens elements have a refractive index higher than that of the bar-shaped lens elements proper as described above in this type of optical system, refractive power of the relay lens unit is largely dependent on the refractive power of the air-contact surfaces. Accordingly, it is possible to select relatively optional value for curvature on the cemented surfaces taking aberrations into consideration. It is therefor possible to favorably correct aberrations by adequately selecting curvature on the cemented surfaces. Moreover, since the bar-shaped cemented lens component 4 consists of the bar-shaped lens element 6 plus the lens elements 5 and 7 cemented to the end surfaces of said bar-shaped lens element 6, the lens component comprises a pair of cemented surfaces 6a, 6b and a pair of air-contact surfaces 5a, 7b. It is therefore possible to correct spherical aberration by adjusting bending of a pair and correct astigmatic difference by adjusting bending of the other pair. In other words, spherical aberration and astigmatic difference can be corrected at the same time with a minimum number of lens surfaces in this type of optical system.

It is desirable for correction of aberrations to compose the bar-shaped cemented lens components 4 and 4' so as to be symmetrical with regard to the pupil plane P. Further, since this type of optical system uses three types of lens elements, said optical system is advantageous for reducing the number of component members thereof and enhancing productivity. Furthermore, it is desirable for correction of aberrations to arrange the two bar-shaped cemented lens components, which are the same as each other, symmetrical with regard to the pupil plane P.

Moreover, when the lens elements 5, 7, 5' and 7' which are to be cemented to the end surfaces of the bar-shaped lens elements are made in the same shape and of the same material, the relay lens unit can be composed only of two types of lens elements and a single type of spacing tube is sufficient for composing the optical system, thereby making it possible to obtain a great merits to extremely reduce number of required component members as well as very desirable effects from the viewpoints of manufacturing cost and productivity. In addition, the bar-shaped cemented lens components are symmetrical with regard to the pupil plane P and can easily be assembled. Further, when the relay lens unit is designed so as to set the distance as measured from the image of object I to the lens surface 5a (the distance as measured from the image of object I' to the lens surface 5'a) equal to the distance as measured from the lens surface 7b to the pupil plane P (the distance as measured from the lens surface 7'b to the pupil plane P), the optical system composed by arranging a large number of such relay lens units in series comprises equal spaces between the relay lens units, thereby desirably permitting transmission of the pupil with no modification therethrough, and correction of aberrations of the image and pupil at the same time.

In order to correct spherical aberration, astigmatic difference, etc. more favorably in the above-described type of the image transmission optical system according to the present invention, it is effective to arrange aspherical surfaces in the bar-shaped cemented lens components 4 and 4'. When the optical axis is taken as the x axis and the direction perpendicular to the optical axis is taken as the y axis, shape of the aspherical surfaces to be used in the optical system is expressed by the following formula (i):

$$x = Cy^2/(1 + \sqrt{1-C^2y^2}) + Ey^4 + Fy^6 + Gy^8 + \ldots \quad (i)$$

wherein the reference symbol C represents curvature of the spherical surface in contact with the aspherical surface on the optical axis, and the reference symbols E, F, G, ... designate the aspherical surface coefficients.

Now, description will be made on the conditions which are to be satisfied by the bar-shaped cemented lens components 4 and 4' composing the optical system. It is desirable that the bar-shaped cemented lens components 4 and 4' have a refractive power P satisfying the following condition (1):

$$-3 < P < 5 \quad (1)$$

$$P = \phi_A/(\phi_A - \phi_B - d/n_A \cdot \phi_A \cdot \phi_B)$$

wherein the reference symbol d represents thickness of each of the lens elements cemented to the end surfaces of the bar-shaped lens element, the reference symbol $\phi_A$ designates refractive power $(n_A - 1/r_A)$ of each of the non-cemented surfaces, the reference symbol $\phi_B$ denotes refractive power $(n_B - 1/r_A)$ of each of the cemented surfaces, the reference symbol $r_B$ represents radius of curvature on each of the cemented surfaces, the reference symbol $n_A$ designates refractive index of each of the lens elements cemented to the bar-shaped lens element and the reference symbol $n_B$ denotes refractive index of the bar-shaped lens element. For judging whether or not the condition (1) is satisfied by the bar-shaped cemented lens components, refractive index of the aspherical surface is to be regarded as that of the aspherical surface which is in contact with the aspherical surface on the optical axis.

In the formula expressing value of P in the above-mentioned condition (1), the denominator represents total refractive power of the cemented surfaces and the non-cemented surfaces of the lens component. Hence, the reference symbol P represents a ratio of the refractive power of the non-cemented surfaces relative to the above-mentioned total refractive power.

If P has a value deviated out of the range defined by the condition (1), the positive refractive power $\phi_A$ or $\phi_B$ will undesirably be too strong for the above-mentioned total refractive power. If the upper limit of the condition (1) is exceeded, aberrations, especially coma, will undesirably be aggravated on the positive side. If the lower limit of the condition (1) is exceeded, in contrast, coma will undesirably be aggravated on the negative side.

When the cemented surface 6b or 6'b of the bar-shaped lens element 6 or 6' which is located on the side of the pupil P has positive refractive power, it is desirable that the lens element satisfies the following condition (2):

$$\nu_A > \nu_B \quad (2)$$

wherein the reference symbol $\nu_A$ represents Abbe's number of the lens element cemented to the pupil side end surface of the bar-shaped lens element and the reference symbol $\nu_B$ designates Abbe's number of the bar-shaped lens element.

When said cemented surface 6b or 6'b has negative refractive power, it is desirable that the bar-shaped lens element satisfies the following condition (3):

$$\nu_A < \nu_B \quad (3)$$

A second type of the image transmission optical system according to the present invention has the fundamental composition illustrated in FIG. 6. Speaking concretely, a relay lens unit of this optical system consists of a pair of bar-shaped lens components 10 and 11 having surfaces 13 and 14 of positive refractive power on the sides opposite to the images I and I' respectively, plus a biconcave lens component 12 arranged between the bar-shaped lens components. The second type of optical system is designed so as to satisfy the following conditions (4) and (5):

$$-2 < \phi_{rB}/\phi_2 < -0.1 \quad (4)$$

$$0.5 < D_A/D_B < 4.0 \quad (5)$$

wherein the reference symbol $\phi_{rB}$ represents refractive power of the surface of the bar-shaped lens component located on the side opposite to the image, the reference symbol $\phi_2$ designates refractive power of said biconcave lens component 12, the reference symbol $D_A$ denotes thickness of the bar-shaped lens components 10 or 11, and the reference symbol $D_B$ represents airspace reserved between the bar-shaped lens component 10 or 11 and the lens component 12.

If the upper limit of the condition (4) is exceeded, the positive refractive power $\phi_{rB}$ of the bar-shaped lens component 10 or 11 will be relatively large as compared with the absolute value of the negative refractive power $\phi_2$ of the lens component 12 having the concave surfaces on both the sides, thereby undercorrecting curvature of field and degrading quality of a relayed image. Further, the remarkable positive astigmatism produced by the surfaces 13 and 14 will be uncorrectable.

If the lower limit of the condition (4) is exceeded, the positive refractive power $\phi_{rB}$ of the surface 13 or 14 of the bar-shaped lens component 10 or 11 will be relatively small as compared with the absolute value of the negative refractive power $\phi_2$ of the lens component 12 having the concave surfaces on both the sides, thereby overcorrecting curvature of field and degrading quality of a relayed image. Further, the positive spherical aberration produced by the surfaces 17 and 18 of the biconcave lens component will undesirably be correctable.

If the upper limit of the condition (5) is exceeded, the airspace reserved between the bar-shaped lens components 10 or 11 and the lens component 12 will be narrowed, and both the positive refractive power $\phi_{rB}$ of the surfaces 13 or 14 of the bar-shaped lens component 10 or 11 having the function to correct curvature of field and the negative refractive power $\phi_2$ of the lens component 12 will be strengthened, thereby making it difficult to correct the curvature of field.

If the lower limit of the condition (5) is exceeded, the optical path lengths in terms of glass of the bar-shaped lens components will be shortened, thereby prolonging the optical path length in terms of air per unit relaying distance, lowering NA of the optical system and reducing amount of transmitted light.

As is understood from the foregoing description, the image transmission optical system of the second type which satisfies the conditions (4) and (5) is capable of relaying an image with high quality.

It is generally necessary for an image transmission optical system to have a function to relay a pupil in addition to that to relay an image. In the image transmission optical system according to the present invention, the image side air-contact surfaces of the bar-shaped lens components 10 and 11 serve as the field lenses of relaying a pupil.

Further, the refractive power $\phi_{rA}$ of the surface 15 or 16 of the bar-shaped lens component 10 or 11 which faces the image I or I' is almost determined by selecting a ratio in amount of light between the vicinity of the optical axis and marginal portion in the image transmission optical system after designing the optical system so as to satisfy the conditions (4) and (5). In determining this refractive index $\phi_{rA}$, it is desirable for correcting aberrations and increasing amount of the marginal ray to design the bar-shaped lens component so as to satisfy the following condition (6):

$$-0.5 < \phi_{rA}/\phi_{rB} < 0.8 \quad (6)$$

If the image side surface 15 or 16 of the bar-shaped lens component 10 or 11 has a convex function strong enough to exceed the upper limit of the condition (6), radius of curvature on the surface 13 or 14 must be prolonged for maintaining the required refractive power of the bar-shaped lens component 10 or 11, and optical path length in terms of glass of the bar-shaped lens component 10 or 11 will be prolonged. When the bar-shaped lens component 10 or 11 has an optical path length in terms of glass prolonged as described above, the lens component 12 is brought nearer to the bar-shaped lens components 10 and 11 respectively. In other words, $D_B$ is narrowed to undesirably allow the upper limit of the condition (5) to be exceeded.

If the refractive power of the image side surface 15 or 16 of the bar-shaped lens component 10 or 11 has a large negative value to allow the lower limit of the condition (6) to be exceeded, the optical system will have a small $N_A$, thereby undesirably reduce amount of transmitted light.

Also in the second type of the image transmission optical system according to the present invention, image quality can be improved by using aspherical surfaces. In order to correct the spherical aberration and astigmatism remaining in an optical system consisting only of spherical lens components, it is effective to design the air-contact surfaces of the bar-shaped lens components 10 and 11, which are arranged on the sides opposite to the images I and I' respectively and have the positive refractive power, as aspherical surfaces having portions whose refractive power is progressively weakened as the portions are farther from the optical axis toward the marginal portion, or design the air-contact surfaces 17 and 18 of the lens component 12 as aspherical surfaces having portions whose refractive power is progressively weakened as the portions are farther from the optical axis toward the marginal portion.

The shape of the aspherical surfaces to be used in the second type of the image transmission optical system is also expressed by the above-mentioned formula (i).

Now, the aspherical surfaces to be used in the two types of the image transmission optical systems according to the present invention will be described in more detail below.

First, let us define Shield's aberration coefficients as expressed by the formulas (ii) and (iii) which are to be described later. These aberration coefficients are the same as those used in universal lens design program ACCOS-V. However, ACCOS-V determines height $H_o$ of the paraxial ray on the first surface by the following formula:

$$H_o = OB \times \tan\{\sin^{-1}(NA/n_o)\}$$

wherein the reference symbol OB represents object distance, the reference symbol NA designates numerical aperture for the marginal ray and the reference symbol $n_o$ denotes refractive index of the medium located on the object side of the first surface.

In contrast, the present invention determines the height $H_o$ by the formula given below:

$$H_o = OB \times NA/n_o$$

Hence, the present invention determines aberrations by paraxial tracing on the basis of $H_0$ calculated by the latter formula.

The following formula (ii) is applicable to the meridional ray:

$$\Delta Y = (SA3)\overline{H}^3 - (CMA3)\overline{Y}^1\overline{H}^2 - \qquad \text{(ii)}$$
$$\{3(AST3) - (PTZ3)\}\overline{Y}^2\overline{H} - (DIS3)\overline{Y}^3 -$$
$$(SA5)\overline{H}^5 - (CMA5)\overline{Y}\overline{H}^4 - (TOBSA)\overline{Y}^2\overline{H}^3 -$$
$$(ELCMA)\overline{Y}^3\overline{H}^2 - \{5(AST5) - (PTZ5)\}\overline{Y}^4\overline{H} -$$
$$(DIS5)\overline{Y}^5 - (SA7)\overline{H}^7$$

The following formula (iii) is applicable to the sagital ray:

$$\Delta Z = (SA3)\overline{H}^3 - \{(AST3) - (PTZ3)\}\overline{Z}^2\overline{H} - \qquad \text{(iii)}$$
$$(SA5)\overline{H}^5 - (SOBSA)\overline{Z}^2\overline{H}^3 -$$
$$\{(AST5) - (PTZ5)\}\overline{Z}^4\overline{H} - (SA7)\overline{H}^7$$

In the formulas (ii) and (iii) mentioned above, the reference symbols $\Delta Y$ and $\Delta X$ represent deviations between the paraxial image points (the image point in a condition free from aberrations) and an actual image points for the meridional ray and the sagital ray respectively, the reference symbols $\overline{Y}$ and $\overline{Z}$ designate locations of the entrance pupils for the paraxial rays on the image surfaces normalized to the maximum image heights, and the reference symbol $\overline{H}$ denotes location of incidence of the marginal ray normalized to the pupil diameter on the pupil plane. Further, the reference symbols SA3, SA5 and SA7 represent spherical aberrations of the third order, fifth order and seventh order respectively, the reference symbols CMA3 and CMA5 designate tangential coma of the third order and fifth order respectively, the reference symbols AST3 and AST5 denote astigmatism of the third order and fifth order respectively, PTZ3 and PTZ5 represent Petzval's sums of the third order and fifth order respectively, the reference symbols DIS3 and DIS5 represent distortion of the third order and fifth order respectively, the reference symbol TOBSA designates tangential oblique spherical aberration of the fifth order, the reference symbol ELCMA denotes elliptic coma and the reference symbol SOBSA represents sagital oblique spherical aberration of the fifth order.

Shape of the aspherical surfaces used in the image transmission optical system according to the present invention is determined as described below. First, an image transmission optical system consisting only of spherical lens components is composed. The spherical surfaces selected to as aspherical surface which are in contact with said spherical surfaces on the optical axis are referred to as the reference spheres.

When a total sum of the spherical aberration coefficients for the lens surfaces arranged in this optical system has a negative value, departure from the reference sphere which corresponds to the terms of $EY^4$ and higher orders in the above-mentioned formula (i) is adopted for some selected lens surfaces in the image transmission optical system and these surfaces are designed as aspherical surfaces having portions whose negative refractive power is progressively strengthened as the portions are farther from the optical axis.

When a total sum of the spherical aberration coefficients for the lens surfaces arranged in the image transmission optical system consisting only of spherical surfaces has a positive value, departure from the reference sphere which corresponds to the terms of $EY^4$ and higher orders in the above-mentioned formula (i) is adopted for some selected lens surfaces in the image transmission optical system and these surfaces are designed as aspherical surfaces having portions whose positive refractive power is progressively strengthened as the portions are farther from the optical axis. From a viewpoint of correction of spherical aberration, it is preferable to arrange these aspherical surfaces at locations as close to the pupil as possible.

Astigmatism is increased or decreased as the spherical aberration coefficients are increased or decreased by the aspherical surfaces. Accordingly, astigmatism is produced by correcting the spherical aberration. In order to solve this problem, it is sufficient to set the term of Y of the second order in the formula (i) expressing the aspherical surface, i.e., the term expressing spherical aberration, so as to cancel the astigmatism to be produced by the terms of $Y^4$ and higher orders. It is possible by this means to correct the spherical aberration by using the aspherical surfaces and obtain a favorable image with little astigmatic difference. In this case, the total sum of the spherical aberration coefficients for the lens surfaces and the total sum of the astigmatism coefficients for the lens surface must have the same sign.

Restricted outside diameters, small NA's on the order of 0.1 and simple compositions are desired for general image transmission optical systems. For this reason, the terms of the lower orders are to be discussed with regard to the aberrations to be produced in these optical systems. It is therefore desirable for correcting aberrations over the entire range of an image to select for the aspherical surfaces a shape expressed by a formula in which the terms of lower orders, i.e., terms of the fourth order and sixth order, have large aspherical surface coefficients.

Now, description will be made on the conditions required for favorably correcting spherical aberration and astigmatic difference by selecting an adequate value for the coefficient E of the fourth order in the formula of the aspherical surface.

When an optical system comprises, as the i'th lens surface, an aspherical surface having a shape expressed only by the terms of the fourth order and lower orders of the formula of aspherical surface, the spherical aberration coefficient Si(ASP) and the astigmatism coefficient for the i'th surface can be expressed by the following formulas (iv) and (v) respectively:

$$Si(ASP) = 8ha^4 \cdot E(N_{i-1}) \qquad (iv)$$

$$Ai(ASP) = 8ha^2 \cdot hb^2 \cdot E(N_i - N_{i-1}) \qquad (v)$$

wherein the reference symbol ha and hb represent heights of the paraxial marginal ray and the paraxial principal ray respectively on the i'th lens surface, and the reference symbols $N_i$ and $N_{i+1}$ designate refractive indices of the media located on the sides of incidence and emergence respectively of the i'th lens surface.

When the coefficients of the spherical aberration and astigmatism to be produced by the spherical surface expressed by the above-mentioned formula of aspherical surface not including the term of the fourth order (that is the coefficients of the spherical aberration and astigmatism of the reference sphere of the aspherical surface) are represented by Si(SP) and Ai(SP) respectively, it is desirable for correcting spherical aberration and astigmatism that a ratio ΔS of ΣSi(ASP) relative to ΣSi(SP) and a ratio ΔA of ΣAi(ASP) relative to ΣAi(SP) satisfy the following conditions (7) and (8) respectively.

$$-2 \leq \Delta S \leq 0 \qquad (7)$$

$$(\Delta S = \Sigma Si(ASP)/\Sigma Si(SP))$$

$$-3 \leq \Delta A \leq 0 \qquad (8)$$

$$(\Delta A = \Sigma Ai(ASP)/\Sigma Ai(SP))$$

wherein the reference symbol Σ means addition of the aberration coefficients for all the surfaces arranged in the image transmission optical system.

If the upper limit or the lower limit of the condition (7) is exceeded, spherical aberration will be uncorrectable by the aspherical surfaces, thereby producing undesirable effect from viewpoint of practical use. If the upper limit or the lower limit of the condition (8) is exceeded, astigmatic difference will be uncorrectable by the aspherical surfaces, thereby producing an undesirable effect from the viewpoint of practical use.

In order to make dust adhering to the lens surfaces invisible, it is necessary to reserve certain distances between the image surfaces and lens surfaces in an image transmission optical system. The distances to be reserved between the image surfaces and the lens surfaces are different depending on adjusting power of human eyes and focal length of an eyepiece lens used with the image transmission optical system. In order to limit a size of an image to be observed within a certain field angle, focal length of an eyepiece lens is determined almost by an outside diameter of a relay lens unit. Taking these points into consideration, it is desirable for making dust adhering to lens surfaces invisible to design the image transmission optical system so as to satisfy the following condition (9):

$$0.01 \leq D/L \leq 0.2 \qquad (9)$$

wherein the reference symbol D represents distance to be reserved between the image surface and lens surface, and the reference symbol L designates a unit relaying distance, i.e., the distance to be reserved between the image I and the image I'.

On an assumption that the unit relaying distance L and outside diameter of relay lens unit are set constant, the total amount of light to be transmitted through the relay lens unit is determined approximately by the airspace $D_4$ reserved between the two bar-shaped cemented lens components though the amount is variable slightly depending on the refractive index of the bar-shaped lens elements and height of image to be transmitted. In order to obtain as large an amount of light as possible, it is desirable especially for the first type of image transmission optical system to satisfy the following condition (10):

$$0 \leq D_4/L \leq 0.4 \qquad (10)$$

BRIEF DESCRIPTION OF THE DRAWINGS

FIG. 25 through FIG. 62 show graphs illustrating aberration characteristics of the Embodiments 1 through 38 respectively of the present invention;

DETAILED DESCRIPTION OF THE PREFERRED EMBODIMENTS

Figure 1:
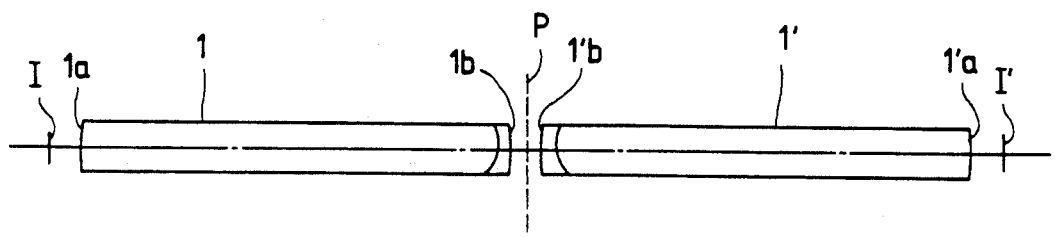
FIG. 1 through FIG. 3 show sectional views illustrating the compositions of the conventional image transmission optical systems.
Figure 2:
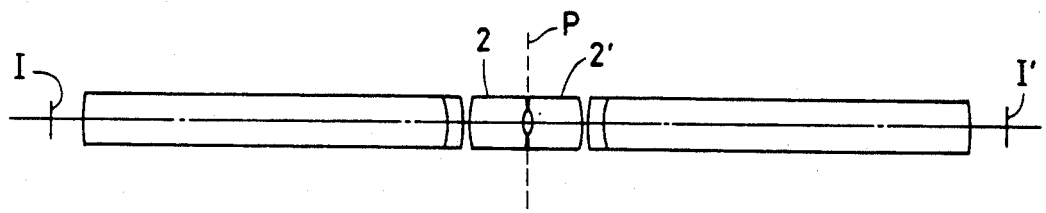
Figure 3:
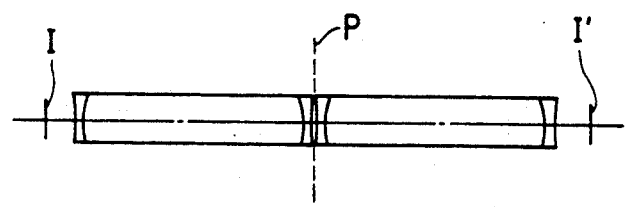
Figure 4:
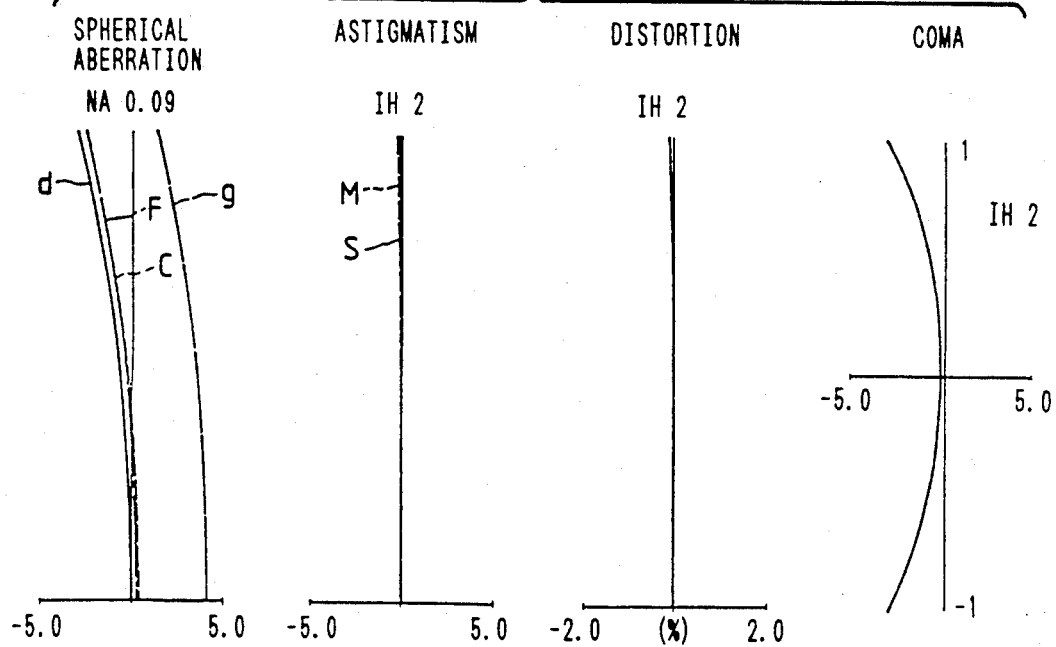
FIG. 4 shows curves illustrating the aberration characteristics of the conventional optical system shown in FIG. 3.
Figure 5:
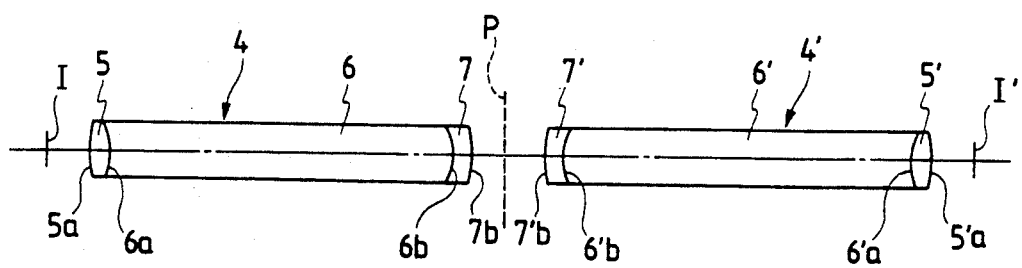
FIG. 5 shows a sectional view illustrating composition of a first type of the image transmission optical system according to the present invention.
Figure 6:
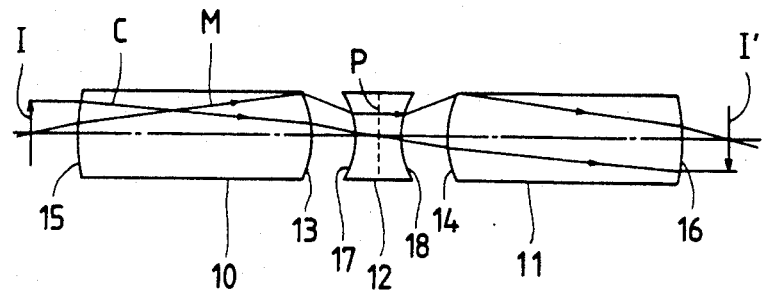
FIG. 6 shows a sectional view illustrating composition of a second type of the image transmission optical system according to the present invention.

Now, the image transmission optical system according to the present invention will be described more detailedly with reference to the preferred embodiments illustrated in the accompanying drawings and given in the form of the following numerical data:

Embodiment 1

OB = −5.0, Entrance pupil ∞, NA0.09, Image height 2
$r_1 = 32.8827$
  $d_1 = 2.0000$   $n_1 = 1.71700$   $v_1 = 47.94$
$r_2 = -7.8637$
  $d_2 = 37.0000$  $n_2 = 1.62004$   $v_2 = 36.25$
$r_3 = -5.5621$
  $d_3 = 2.0000$   $n_3 = 1.75520$   $v_3 = 27.51$
$r_4 = -14.0228$
  $d_4 = 8.0000$
$r_5 = 14.0228$
  $d_5 = 2.0000$   $n_4 = 1.75520$   $v_4 = 27.51$
$r_6 = 5.5621$
  $d_6 = 37.0000$  $n_5 = 1.62004$   $v_5 = 36.25$
$r_7 = 7.8637$
  $d_7 = 2.0000$   $n_6 = 1.71700$   $v_6 = 47.94$
$r_8 = -32.8827$
$P_F = 0.6447$, $P_B = 1.7347$
$\Delta S = 0$, $\Delta A = 0$

Embodiment 2

OB = −5.0, Entrance pupil ∞, NA0.08, Image height 2
$r_1 = 12.4116$
  $d_1 = 4.6252$   $n_1 = 1.80100$   $v_1 = 34.97$
$r_2 = 6.9768$
  $d_2 = 30.7495$  $n_2 = 1.51633$   $v_2 = 64.15$
$r_3 = -6.9768$
  $d_3 = 4.6252$   $n_3 = 1.80100$   $v_3 = 34.97$
$r_4 = -12.4116$
  $d_4 = 10.0000$
$r_5 = 12.4116$
  $d_5 = 4.6252$   $n_4 = 1.80100$   $v_4 = 34.97$
$r_6 = 6.9768$
  $d_6 = 30.7495$  $n_5 = 1.51633$   $v_5 = 64.15$
$r_7 = -6.9768$
  $d_7 = 4.6252$   $n_6 = 1.80100$   $v_6 = 34.97$
$r_8 = -12.4116$
$P_F = 2.1162$, $P_B = 2.1162$
$\Delta S = 0$, $\Delta A = 0$

Embodiment 3

OB = −5.0, Entrance pupil ∞, NA0.10, Image height 2
$r_1 = 49.0332$
  $d_1 = 2.0000$   $n_1 = 1.78800$   $v_1 = 47.38$
$r_2 = -9.6556$
  $d_2 = 36.0000$  $n_2 = 1.62004$   $v_2 = 36.25$
$r_3 = 9.6556$
  $d_3 = 2.0000$   $n_3 = 1.78800$   $v_3 = 47.38$
$r_4 = -49.0332$
  $d_4 = 10.0000$
$r_5 = 49.0332$
  $d_5 = 2.0000$   $n_4 = 1.78800$   $v_4 = 47.38$
$r_6 = -9.6556$
  $d_6 = 36.0000$  $n_5 = 1.62004$   $v_5 = 36.25$
$r_7 = 9.6556$
  $d_7 = 2.0000$   $n_6 = 1.78800$   $v_6 = 47.38$
$r_8 = -49.0332$
$P_F = 0.4847$, $P_B = 0.4847$
$\Delta S = 0$, $\Delta A = 0$

Embodiment 4

OB = −5.0, Entrance pupil ∞, NA0.09, Image height 2
$r_1 = 10.7137$
  $d_1 = 1.0000$   $n_1 = 1.74400$   $v_1 = 44.73$
$r_2 = 5.4749$
  $d_2 = 39.0000$  $n_2 = 1.53172$   $v_2 = 48.90$
$r_3 = -9.7683$
  $d_3 = 1.0000$   $n_3 = 1.78472$   $v_3 = 25.71$
$r_4 = -14.1004$ (Aspherical Surface)
  $d_4 = 8.0000$
$r_5 = 14.1004$ (Aspherical Surface)
  $d_5 = 1.0000$   $n_4 = 1.78472$   $v_4 = 25.71$
$r_6 = 9.7683$
  $d_6 = 39.0000$  $n_5 = 1.53172$   $v_5 = 48.90$
$r_7 = -5.4749$
  $d_7 = 1.0000$   $n_6 = 1.74400$   $v_6 = 44.73$
$r_8 = -10.7137$
Aspherical coefficient
  $E_4 = 0.48719 \times 10^{-5}$
  $E_5 = 0.48719 \times 10^{-5}$
$P_F = 2.1557$, $P_B = 1.8211$
$\Delta S = -1$, $\Delta A = -0.078$

Embodiment 5

OB = −5.0, Entrance pupil ∞, NA0.10, Image height 2
$r_1 = 85.1575$
  $d_1 = 2.0000$   $n_1 = 1.80610$   $v_1 = 40.95$
$r_2 = -8.8552$
  $d_2 = 36.0000$  $n_2 = 1.59551$   $v_2 = 39.21$
$r_3 = 9.8502$
  $d_3 = 3.0000$   $n_3 = 1.69680$   $v_3 = 55.52$
$r_4 = -31.5356$ (Aspherical Surface)
  $d_4 = 8.0000$
$r_5 = 31.5356$ (Aspherical Surface)
  $d_5 = 3.0000$   $n_4 = 1.69680$   $v_4 = 55.52$
$r_6 = -9.8502$
  $d_6 = 36.0000$  $n_5 = 1.59551$   $v_5 = 39.21$
$r_7 = 8.8552$
  $d_7 = 2.0000$   $n_6 = 1.80610$   $v_6 = 40.95$
$r_8 = -85.1575$
Aspherical coefficient
  $E_4 = 0.34782 \times 10^{-4}$
  $E_5 = -0.34782 \times 10^{-4}$
$P_F = 0.2869$, $P_B = 0.6910$
$\Delta S = -1.061$, $\Delta A = -0.954$

Embodiment 6

OB = −5.0, Entrance pupil ∞, NA0.09, Image height 2
$r_1 = 32.8453$
  $d_1 = 2.0000$   $n_1 = 1.71700$   $v_1 = 47.94$
$r_2 = -7.8618$
  $d_2 = 37.0000$  $n_2 = 1.62004$   $v_2 = 36.25$
$r_3 = -5.1547$
  $d_3 = 2.0000$   $n_3 = 1.75520$   $v_3 = 27.51$
$r_4 = -13.5968$ (Aspherical Surface)
  $d_4 = 8.0000$
$r_5 = 13.5968$ (Aspherical Surface)
  $d_5 = 2.0000$   $n_4 = 1.75520$   $v_4 = 27.51$
$r_6 = 5.1547$
  $d_6 = 37.0000$  $n_5 = 1.62004$   $v_5 = 36.25$
$r_7 = 7.8618$
  $d_7 = 2.0000$   $n_6 = 1.71700$   $v_6 = 47.94$
$r_8 = -32.8453$
Aspherical coefficient
  $E_4 = -0.48644 \times 10^{-4}$
  $F_4 = -0.10653 \times 10^{-5}$
  $F_5 = 0.10653 \times 10^{-5}$
  $E_5 = 0.48644 \times 10^{-4}$
$P_F = 0.6449$, $P_B = 1.7928$
$\Delta S = -0.988$, $\Delta A = -1.059$

Embodiment 7

OB = −5.0, Entrance pupil ∞, NA0.09, Image height 2
$r_1 = 10.3824$ (Aspherical Surface)
  $d_1 = 1.0000$   $n_1 = 1.78590$   $v_1 = 44.18$
$r_2 = 5.7377$

-continued
Embodiment 7

| | $d_2 = 38.0000$ | $n_2 = 1.51633$ | $v_2 = 64.15$ |
|---|---|---|---|

$r_3 = -5.7377$

| | $d_3 = 1.0000$ | $n_3 = 1.78590$ | $v_3 = 44.18$ |
|---|---|---|---|

$r_4 = -10.3824$ (Aspherical Surface)

| | $d_4 = 10.0000$ | | |
|---|---|---|---|

$r_5 = 10.3824$ (Aspherical Surface)

| | $d_5 = 1.0000$ | $n_4 = 1.78590$ | $v_4 = 44.18$ |
|---|---|---|---|

$r_6 = 5.7377$

| | $d_6 = 38.0000$ | $n_5 = 1.51633$ | $v_5 = 64.15$ |
|---|---|---|---|

$r_7 = -5.7377$

| | $d_7 = 1.0000$ | $n_6 = 1.78590$ | $v_6 = 44.18$ |
|---|---|---|---|

$r_8 = -10.3824$ (Aspherical Surface)

Aspherical coefficient $E_1 = 0.50749 \times 10^{-4}$
$E_4 = -0.50749 \times 10^{-4}$
$E_5 = 0.50749 \times 10^{-4}$
$E_8 = -0.50749 \times 10^{-4}$ $P_F = 2.4544$, $P_B = 2.4544$
$\Delta S = 1.202$, $\Delta A = -1.406$

Embodiment 8

$OB = -5.0$, Entrance pupil $\infty$, NA0.10, Image height 2
$r_1 = 13.8819$ (Aspherical Surface)

| | $d_1 = 1.0000$ | $n_1 = 1.72825$ | $v_1 = 28.46$ |
|---|---|---|---|

$r_2 = 5.2539$

| | $d_2 = 38.0000$ | $n_2 = 1.62004$ | $v_2 = 36.25$ |
|---|---|---|---|

$r_3 = -5.2539$

| | $d_3 = 1.0000$ | $n_3 = 1.72825$ | $v_3 = 28.46$ |
|---|---|---|---|

$r_4 = -13.8819$ (Aspherical Surface)

| | $d_4 = 10.0000$ | | |
|---|---|---|---|

$r_5 = 13.8819$ (Aspherical Surface)

| | $d_5 = 1.0000$ | $n_4 = 1.72825$ | $v_4 = 28.46$ |
|---|---|---|---|

$r_6 = 5.2539$

| | $d_6 = 38.0000$ | $n_5 = 1.62004$ | $v_5 = 36.25$ |
|---|---|---|---|

$r_7 = -5.2539$

| | $d_7 = 1.0000$ | $n_6 = 1.72825$ | $v_6 = 28.46$ |
|---|---|---|---|

$r_8 = -13.8819$ (Aspherical Surface)

Aspherical coefficient $E_1 = 0.43361 \times 10^{-4}$   $F_1 = 0.10512 \times 10^{-5}$
$E_4 = -0.43361 \times 10^{-4}$   $F_4 = -0.10512 \times 10^{-5}$
$E_5 = 0.43361 \times 10^{-4}$   $F_5 = 0.10512 \times 10^{-5}$
$E_8 = -0.43361 \times 10^{-4}$   $F_8 = -0.10512 \times 10^{-5}$ $P_F = 1.6147$, $P_B = 1.6147$
$\Delta S = -0.986$, $\Delta A = -1.327$

Embodiment 9

$OB = -5.0$, Entrance pupil $\infty$, NA0.10, Image height 2
$r_1 = 31.2010$ (Aspherical Surface)

| | $d_1 = 2.0000$ | $n_1 = 1.71700$ | $v_1 = 47.94$ |
|---|---|---|---|

$r_2 = -9.4751$

| | $d_2 = 36.0000$ | $n_2 = 1.62004$ | $v_2 = 36.25$ |
|---|---|---|---|

$r_3 = 9.4751$

| | $d_3 = 2.0000$ | $n_3 = 1.71700$ | $v_3 = 47.94$ |
|---|---|---|---|

$r_4 = -31.2010$ (Aspherical Surface)

| | $d_4 = 10.0000$ | | |
|---|---|---|---|

$r_5 = 31.2010$ (Aspherical Surface)

| | $d_5 = 2.0000$ | $n_4 = 1.71700$ | $v_4 = 47.94$ |
|---|---|---|---|

$r_6 = -9.4751$

| | $d_6 = 36.0000$ | $n_5 = 1.62004$ | $v_5 = 36.25$ |
|---|---|---|---|

$r_7 = 9.4751$

| | $d_7 = 2.0000$ | $n_6 = 1.71700$ | $v_6 = 47.94$ |
|---|---|---|---|

$r_8 = -31.2010$ (Aspherical Surface)

Aspherical coefficient $E_1 = -0.37857 \times 10^{-4}$
$E_4 = 0.37857 \times 10^{-4}$
$E_5 = -0.37857 \times 10^{-4}$
$E_8 = 0.37857 \times 10^{-4}$ $P_F = 0.6976$, $P_B = 0.6976$

-continued
Embodiment 9

$\Delta S = -1.066$, $\Delta A = -0.982$

Embodiment 10

$OB = -5.0$, Entrance pupil $\infty$, NA0.10, Image height 2
$r_1 = 37.2335$ (Aspherical Surface)

| | $d_1 = 2.0000$ | $n_1 = 1.78590$ | $v_1 = 44.18$ |
|---|---|---|---|

$r_2 = -10.9252$

| | $d_2 = 36.0000$ | $n_2 = 1.64769$ | $v_2 = 33.80$ |
|---|---|---|---|

$r_3 = 10.9252$

| | $d_3 = 2.0000$ | $n_3 = 1.78590$ | $v_3 = 44.18$ |
|---|---|---|---|

$r_4 = -37.2335$ (Aspherical Surface)

| | $d_4 = 10.0000$ | | |
|---|---|---|---|

$r_5 = 37.2335$ (Aspherical Surface)

| | $d_5 = 2.0000$ | $n_4 = 1.78590$ | $v_4 = 44.18$ |
|---|---|---|---|

$r_6 = -10.9252$

| | $d_6 = 36.0000$ | $n_5 = 1.64769$ | $v_5 = 33.80$ |
|---|---|---|---|

$r_7 = 10.9252$

| | $d_7 = 2.0000$ | $n_6 = 1.78590$ | $v_6 = 44.18$ |
|---|---|---|---|

$r_8 = -37.2335$ (Aspherical Surface)

Aspherical coefficient $F_1 = -0.35507 \times 10^{-5}$
$F_4 = 0.35507 \times 10^{-5}$
$F_5 = -0.35507 \times 10^{-5}$
$F_8 = 0.35507 \times 10^{-5}$ $P_F = 0.6308$, $P_B = 0.6308$
$\Delta S = 0$, $\Delta A = 0$

Embodiment 11

$OB = -5.0$, Entrance pupil $\infty$, NA0.10, Image height 2
$r_1 = 34.4267$ (Aspherical Surface)

| | $d_1 = 2.0000$ | $n_1 = 1.75700$ | $v_1 = 47.87$ |
|---|---|---|---|

$r_2 = -12.1166$

| | $d_2 = 36.0000$ | $n_2 = 1.62004$ | $v_2 = 36.25$ |
|---|---|---|---|

$r_3 = 12.1166$

| | $d_3 = 2.0000$ | $n_3 = 1.75700$ | $v_3 = 47.87$ |
|---|---|---|---|

$r_4 = -34.4267$ (Aspherical Surface)

| | $d_4 = 10.0000$ | | |
|---|---|---|---|

$r_5 = 34.4267$ (Aspherical Surface)

| | $d_5 = 2.0000$ | $n_4 = 1.75700$ | $v_4 = 47.87$ |
|---|---|---|---|

$r_6 = -12.1166$

| | $d_6 = 36.0000$ | $n_5 = 1.62004$ | $v_5 = 36.25$ |
|---|---|---|---|

$r_7 = 12.1166$

| | $d_7 = 2.0000$ | $n_6 = 1.75700$ | $v_6 = 47.87$ |
|---|---|---|---|

$r_8 = -34.4267$ (Aspherical Surface)

Aspherical coefficient $E_1 = -0.26369 \times 10^{-4}$   $F_1 = -0.11817 \times 10^{-6}$
$E_4 = 0.26369 \times 10^{-4}$   $F_4 = 0.11817 \times 10^{-6}$
$E_5 = -0.26369 \times 10^{-4}$   $F_5 = -0.11817 \times 10^{-6}$
$E_8 = 0.26369 \times 10^{-4}$   $F_8 = 0.11817 \times 10^{-6}$ $P_F = 0.6661$, $P_B = 0.6661$
$\Delta S = -0.999$, $\Delta A = -0.955$

Embodiment 12

$OB = -8.0$, Entrance pupil $\infty$, NA0.11, Image height 2
$r_1 = 29.4007$ (Aspherical Surface)

| | $d_1 = 2.0000$ | $n_1 = 1.69680$ | $v_1 = 55.52$ |
|---|---|---|---|

$r_2 = -11.6063$

| | $d_2 = 30.0000$ | $n_2 = 1.60342$ | $v_2 = 38.01$ |
|---|---|---|---|

$r_3 = 11.6063$

| | $d_3 = 2.0000$ | $n_3 = 1.69680$ | $v_3 = 55.52$ |
|---|---|---|---|

$r_4 = -29.4007$ (Aspherical Surface)

| | $d_4 = 16.0000$ | | |
|---|---|---|---|

$r_5 = 29.4007$ (Aspherical Surface)

| | $d_5 = 2.0000$ | $n_4 = 1.69680$ | $v_4 = 55.52$ |
|---|---|---|---|

$r_6 = -11.6063$

| | $d_6 = 30.0000$ | $n_5 = 1.60342$ | $v_5 = 38.01$ |
|---|---|---|---|

$r_7 = 11.6063$

| | $d_7 = 2.0000$ | $n_6 = 1.69680$ | $v_6 = 55.52$ |
|---|---|---|---|

Embodiment 12

$r_8 = -29.4007$ (Aspherical Surface)
Aspherical coefficient
$E_1 = -0.27293 \times 10^{-4}$
$E_4 = 0.27293 \times 10^{-4}$
$E_5 = -0.27293 \times 10^{-4}$
$E_8 = 0.27293 \times 10^{-4}$
$P_F = 0.7519$, $P_B = 0.7519$
$\Delta S = -1.042$, $\Delta A = -0.996$

Embodiment 13

OB = $-10.0$, Entrance pupil $\infty$, NA0.10, Image height 2
$r_1 = 13.9086$ (Aspherical Surface)
$d_1 = 1.0000$  $n_1 = 1.72825$  $v_1 = 28.46$
$r_2 = 6.4145$
$d_2 = 28.0000$  $n_2 = 1.58144$  $v_2 = 40.75$
$r_3 = -6.4145$
$d_3 = 1.0000$  $n_3 = 1.72825$  $v_3 = 28.46$
$r_4 = -13.9086$ (Aspherical Surface)
$d_4 = 20.0000$
$r_5 = 13.9086$ (Aspherical Surface)
$d_5 = 1.0000$  $n_4 = 1.72825$  $v_4 = 28.46$
$r_6 = 6.4145$
$d_6 = 28.0000$  $n_5 = 1.58144$  $v_5 = 40.75$
$r_7 = -6.4145$
$d_7 = 1.0000$  $n_6 = 1.72825$  $v_6 = 28.46$
$r_8 = -13.9086$ (Aspherical Surface)
Aspherical coefficient
$E_1 = 0.17165 \cdot 10^{-4}$  $F_1 = 0.40402 \cdot 10^{-6}$
$E_4 = -0.17165 \cdot 10^{-4}$  $F_4 = -0.40402 \cdot 10^{-6}$
$E_5 = 0.17165 \cdot 10^{-4}$  $F_5 = 0.40402 \cdot 10^{-6}$
$E_8 = -0.17165 \cdot 10^{-4}$  $F_8 = -0.40402 \cdot 10^{-6}$
$P_F = 1.7357$, $P_B = 1.7357$
$\Delta S = -0.990$, $\Delta A = -1.201$

Embodiment 14

OB = $-12.0000$, Entrance pupil $\infty$, NA0.11, Image height 2
$r_1 = 26.8327$ (Aspherical Surface)
$d_1 = 2.0000$  $n_1 = 1.69680$  $v_1 = 55.52$
$r_2 = -17.3056$
$d_2 = 22.0000$  $n_2 = 1.63980$  $v_2 = 34.48$
$r_3 = 17.3056$
$d_3 = 2.0000$  $n_3 = 1.69680$  $v_3 = 55.52$
$r_4 = -26.8327$ (Aspherical Surface)
$d_4 = 24.0000$
$r_5 = 26.8327$ (Aspherical Surface)
$d_5 = 2.0000$  $n_4 = 1.69680$  $v_4 = 55.52$
$r_6 = -17.3056$
$d_6 = 22.0000$  $n_5 = 1.63980$  $v_5 = 34.48$
$r_7 = 17.3056$
$d_7 = 2.0000$  $n_6 = 1.69680$  $v_6 = 55.52$
$r_8 = -26.8327$ (Aspherical Surface)
Aspherical coefficient
$E_1 = -0.19835 \times 10^{-4}$
$E_4 = 0.19835 \times 10^{-4}$
$E_5 = -0.19835 \times 10^{-4}$
$E_8 = 0.19835 \times 10^{-4}$
$P_F = 0.8905$, $P_B = 0.8905$
$\Delta S = -1.020$, $\Delta A = -0.998$

Embodiment 15

OB = $-14.0$, Entrance pupil $\infty$, NA0.11, Image height 2
$r_1 = 13.3113$
(Aspherical Surface)
$d_1 = 1.0000$  $n_1 = 1.80100$  $v_1 = 34.97$
$r_2 = 8.3827$
$d_2 = 20.0000$  $n_2 = 1.51633$  $v_2 = 64.15$
$r_3 = -8.3827$
$d_3 = 1.0000$  $n_3 = 1.80100$  $v_3 = 34.97$
$r_4 = -13.3113$
(Aspherical Surface)
$d_4 = 28.0000$
$r_5 = 13.3113$
(Aspherical Surface)
$d_5 = 1.0000$  $n_4 = 1.80100$  $v_4 = 34.97$
$r_6 = 8.3827$
$d_6 = 20.0000$  $n_5 = 1.51633$  $v_5 = 64.15$
$r_7 = -8.3827$
$d_7 = 1.0000$  $n_6 = 1.80100$  $v_6 = 34.97$
$r_8 = -13.3113$
(Aspherical Surface)
Aspherical coefficient
$E_1 = -0.56803 \times 10^{-5}$
$E_4 = 0.56803 \cdot 10^{-5}$
$E_5 = -0.56803 \times 10^{-5}$
$E_8 = 0.56803 \times 10^{-5}$
$P_F = 2.2002$, $P_B = 2.2002$
$\Delta S = -0.912$, $\Delta A = -0.786$

Embodiment 16

OB = $-5.0$, Entrance pupil $\infty$, NA0.10, Image height 2
$r_1 = 33.1919$
(Aspherical Surface)
$d_1 = 5.0000$  $n_1 = 1.71700$  $v_1 = 47.94$
$r_2 = -7.7025$
$d_2 = 30.0000$  $n_2 = 1.62004$  $v_2 = 36.25$
$r_3 = 7.7025$
$d_3 = 5.0000$  $n_3 = 1.71700$  $v_3 = 47.94$
$r_4 = -33.1919$
(Aspherical Surface)
$d_4 = 10.0000$
$r_5 = 33.1919$
(Aspherical Surface)
$d_5 = 5.0000$  $n_4 = 1.71700$  $v_4 = 47.94$
$r_6 = -7.7025$
$d_6 = 30.0000$  $n_5 = 1.62004$  $v_5 = 36.25$
$r_7 = 7.7025$
$d_7 = 5.0000$  $n_6 = 1.71700$  $v_6 = 47.94$
$r_8 = -33.1919$
(Aspherical Surface)
Aspherical coefficient
$E_1 = -0.55235 \cdot 10^{-4}$
$E_4 = 0.55235 \cdot 10^{-4}$
$E_5 = -0.55235 \cdot 10^{-4}$
$E_8 = 0.55235 \cdot 10^{-4}$
$P_F = 0.6468$, $P_B = 0.6468$
$\Delta S = -1.096$, $\Delta A = -1.005$

Embodiment 17

OB = $-5.0$, Entrance pupil $\infty$, NA0.12, Image height 2
$r_1 = 43.4506$
(Aspherical Surface)
$d_1 = 10.0000$  $n_1 = 1.78800$  $v_1 = 47.38$
$r_2 = -11.0064$
$d_2 = 20.0000$  $n_2 = 1.59270$  $v_2 = 35.29$
$r_3 = 11.0064$
$d_3 = 10.0000$  $n_3 = 1.78800$  $v_3 = 47.38$
$r_4 = -43.4506$
(Aspherical Surface)
$d_4 = 10.0000$
$r_5 = 43.4506$
(Aspherical Surface)
$d_5 = 10.0000$  $n_4 = 1.78800$  $v_4 = 47.38$
$r_6 = -11.0064$
$d_6 = 20.0000$  $n_5 = 1.59270$  $v_5 = 35.29$
$r_7 = 11.0064$
$d_7 = 10.0000$  $n_6 = 1.78800$  $v_6 = 47.38$
$r_8 = -43.4506$
(Aspherical Surface)

-continued

Embodiment 17

Aspherical coefficient $E_1 = -0.41470 \cdot 10^{-4}$, $F_1 = 0.68457 \cdot 10^{-6}$
$E_4 = 0.41470 \cdot 10^{-4}$, $F_4 = -0.68457 \cdot 10^{-6}$
$E_5 = -0.41470 \cdot 10^{-4}$, $F_5 = 0.68457 \cdot 10^{-6}$
$E_8 = 0.41470 \cdot 10^{-4}$, $F_4 = -0.68457 \cdot 10^{-6}$ $P_F = 0.5321$, $P_B = 0.5321$
$\Delta S = -1.238$, $\Delta A = -1.117$

Embodiment 18

OB = -5.0, Entrance pupil ∞, NA0.09, Image height 2

$r_1 = 10.0930$
  $d_1 = 1.0000$  $n_1 = 1.80100$  $v_1 = 34.97$
$r_2 = 5.6520$
  $d_2 = 38.0000$  $n_2 = 1.51633$  $v_2 = 64.15$
$r_3 = -8.2834$
  $d_3 = 1.0000$  $n_3 = 1.80100$  $v_3 = 34.97$
$r_4 = -12.5010$
  $d_4 = 10.0000$
$r_5 = 12.5010$
  $d_5 = 1.0000$  $n_4 = 1.80100$  $v_4 = 34.97$
$r_6 = 8.2834$
  $d_6 = 38.0000$  $n_5 = 1.51633$  $v_5 = 64.15$
$r_7 = -5.6520$
  $d_7 = 1.0000$  $n_6 = 1.80100$  $v_6 = 34.97$
$r_8 = -10.0930$
$P_F = 2.5424$, $P_B = 2.0715$
$\Delta S = 0$, $\Delta A = 0$

Embodiment 19

OB = -5.0, Entrance pupil ∞, NA0.09, Image height 2

$r_1 = 11.2015$
  $d_1 = 1.0000$  $n_1 = 1.67003$  $v_1 = 47.25$
$r_2 = 5.2091$
  $d_2 = 38.0000$  $n_2 = 1.51633$  $v_2 = 64.15$
$r_3 = -7.9404$
  $d_3 = 1.0000$  $n_3 = 1.66998$  $v_3 = 39.27$
$r_4 = -13.4760$
  $d_4 = 10.0000$
$r_5 = 13.4760$
  $d_5 = 1.0000$  $n_4 = 1.66998$  $v_4 = 39.27$
$r_6 = 7.9404$
  $d_6 = 38.0000$  $n_5 = 1.51633$  $v_5 = 64.15$
$r_7 = -5.2091$
  $d_7 = 1.0000$  $n_6 = 1.67003$  $v_6 = 47.25$
$r_8 = -11.2015$
$P_F = 1.9070$, $P_B = 1.6068$
$\Delta S = 0$, $\Delta A = 0$

Embodiment 20

OB = -5.0, Entrance pupil ∞, NA0.09, Image height 2

$r_1 = 12.0529$
(Aspherical surface)
  $d_1 = 1.0000$  $n_1 = 1.62374$  $v_1 = 47.10$
$r_2 = 4.9686$
  $d_2 = 38.0000$  $n_2 = 1.51633$  $v_2 = 64.15$
$r_3 = -4.9686$
  $d_3 = 1.0000$  $n_3 = 1.62374$  $v_3 = 47.10$
$r_4 = -12.0529$
(Aspherical surface)
  $d_4 = 10.0000$
$r_5 = 12.0529$
(Aspherical surface)
  $d_5 = 1.0000$  $n_4 = 1.62374$  $v_4 = 47.10$
$r_6 = 4.9686$
  $d_6 = 38.0000$  $n_5 = 1.51633$  $v_5 = 64.15$
$r_7 = -4.9686$
  $d_7 = 1.0000$  $n_6 = 1.62374$  $v_6 = 47.10$
$r_8 = -12.0529$
(Aspherical surface)

Embodiment 20 (continued)

Aspherical coefficient $E_1 = 0.54950 \cdot 10^{-4}$, $F_1 = 0.16656 \cdot 10^{-5}$
$E_4 = -0.54950 \cdot 10^{-4}$, $F_4 = -0.16656 \cdot 10^{-5}$
$E_5 = 0.54950 \cdot 10^{-4}$, $F_5 = 0.16656 \cdot 10^{-5}$
$E_8 = -0.54950 \cdot 10^{-4}$, $F_8 = -0.16656 \cdot 10^{-5}$ $P_F = 1.6790$, $P_B = 1.6790$
$\Delta S = -0.979$, $\Delta A = -1.407$

Embodiment 21

OB = -5.0, Entrance pupil ∞, NA0.09, Image height 2

$r_1 = 10.1639$
  $d_1 = 1.0000$  $n_1 = 1.78590$  $v_1 = 44.18$
$r_2 = 5.5302$
(Aspherical surface)
  $d_2 = 38.0000$  $n_2 = 1.51633$  $v_2 = 64.15$
$r_3 = -5.5302$
(Aspherical surface)
  $d_3 = 1.0000$  $n_3 = 1.78590$  $v_3 = 44.18$
$r_4 = -10.1639$
  $d_4 = 10.0000$
$r_5 = 10.1639$
  $d_5 = 1.0000$  $n_4 = 1.78590$  $v_4 = 44.18$
$r_6 = 5.5302$
(Aspherical surface)
  $d_6 = 38.0000$  $n_5 = 1.51633$  $v_5 = 64.15$
$r_7 = -5.5302$
(Aspherical surface)
  $d_7 = 1.0000$  $n_6 = 1.78590$  $v_6 = 44.18$
$r_8 = -10.1639$ Aspherical coefficient $E_2 = -0.16990 \times 10^{-3}$, $F_2 = -0.79126 \times 10^{-5}$
$E_3 = 0.16990 \cdot 10^{-3}$, $F_3 = -0.79126 \times 10^{-5}$
$E_6 = -0.16990 \cdot 10^{-3}$, $F_6 = -0.79126 \times 10^{-5}$
$E_7 = 0.16990 \times 10^{-3}$, $F_7 = -0.79126 \times 10^{-5}$ $P_F = 2.5196$, $P_B = 2.5196$
$\Delta S = -0.963$, $\Delta A = -1.075$

Embodiment 22

OB = -14.0, Entrance pupil ∞, NA0.11, Image height 2

$r_1 = 13.4528$
  $d_1 = 1.0000$  $n_1 = 1.80100$  $v_1 = 34.97$
$r_2 = 8.5495$
(Aspherical surface)
  $d_2 = 20.0000$  $n_2 = 1.51633$  $v_2 = 64.15$
$r_3 = 8.5495$
(Aspherical surface)
  $d_3 = 1.0000$  $n_3 = 1.80100$  $v_3 = 34.97$
$r_4 = -13.4528$
  $d_4 = 28.0000$
$r_5 = 13.4528$
  $d_5 = 1.0000$  $n_4 = 1.80100$  $v_4 = 34.97$
$r_6 = 8.5495$
(Aspherical surface)
  $d_6 = 20.0000$  $n_5 = 1.51633$  $v_5 = 64.15$
$r_7 = -8.5495$
(Aspherical surface)
  $d_7 = 1.0000$  $n_6 = 1.80100$  $v_6 = 34.97$
$r_8 = -13.4528$ Aspherical coefficient $E_2 = 0.23051 \times 10^{-4}$
$E_3 = -0.23051 \times 10^{-4}$
$E_6 = 0.23051 \times 10^{-4}$
$E_7 = -0.23051 \times 10^{-4}$ $P_F = 2.1774$, $P_B = 2.1774$
$\Delta S = 0.977$, $\Delta A = -0.868$

Embodiment 23

OB = -5.0, Entrance pupil ∞, NA0.10, Image height 2

| Embodiment 23 | | | |
|---|---|---|---|
| $r_1 = 29.8488$ | | | |
| | $d_1 = 2.0000$ | $n_1 = 1.71700$ | $\nu_1 = 47.94$ |
| $r_2 = -10.5911$ (Aspherical surface) | | | |
| | $d_2 = 36.0000$ | $n_2 = 1.62004$ | $\nu_2 = 36.25$ |
| $r_3 = 10.5911$ (Aspherical surface) | | | |
| | $d_3 = 2.0000$ | $n_3 = 1.71700$ | $\nu_3 = 47.94$ |
| $r_4 = -29.8488$ | | | |
| | $d_4 = 10.0000$ | | |
| $r_5 = 29.8488$ | | | |
| | $d_5 = 2.0000$ | $n_4 = 1.71700$ | $\nu_4 = 47.94$ |
| $r_6 = -10.5911$ (Aspherical surface) | | | |
| | $d_6 = 36.0000$ | $n_5 = 1.62004$ | $\nu_5 = 36.25$ |
| $r_7 = 10.5911$ (Aspherical surface) | | | |
| | $d_7 = 2.0000$ | $n_6 = 1.71700$ | $\nu_6 = 47.94$ |
| $r_8 = -29.8488$ | | | |

Aspherical coefficient
$E_2 = 0.23353 \times 10^{-3}$
$E_3 = -0.23353 \times 10^{-4}$
$E_6 = 0.23353 \times 10^{-4}$
$E_7 = -0.23353 \times 10^{-4}$
$P_F = 0.7297$, $P_B = 0.7297$
$\Delta S = -1.001$, $\Delta A = -1.040$

| Embodiment 24 | | | |
|---|---|---|---|
| Object distance = $-6.5574$. Entrance pupil = $\infty$. | | | |
| Entrance NA = 0.0962, IH = 1.5 | | | |
| $r_1 = 31.7782$ | | | |
| | $d_1 = 32.7869$ | $n_1 = 1.69680$ | $\nu_1 = 55.52$ |
| $r_2 = -10.9029$ (Aspherical surface) | | | |
| | $d_2 = 8.1967$ | | |
| $r_3 = -15.0000$ | | | |
| | $d_3 = 4.9180$ | $n_2 = 1.51633$ | $\nu_2 = 64.15$ |
| $r_4 = 15.0000$ | | | |
| | $d_4 = 8.1967$ | | |
| $r_5 = 10.9029$ (Aspherical surface) | | | |
| | $d_5 = 32.7869$ | $n_3 = 1.69680$ | $\nu_3 = 55.52$ |
| $r_6 = -31.7782$ | | | |

Aspherical coefficient
(2nd surface)
$E = 0.25228 \times 10^{-3}$, $F = -0.30961 \times 10^{-4}$
(5th surface)
$E = -0.25228 \times 10^{-3}$, $F = 0.30961 \times 10^{-4}$
$\Phi_{rA} = 0.02193$, $\Phi_{rB} = 0.06391$, $\Phi_2 = -0.07268$
$\Phi_{rB}/\Phi_2 = -0.87933$, $D_A/D_B = 4.00001$
$\Phi_{rA}/\Phi_{rB} = 0.34314$

| Embodiment 25 | | | |
|---|---|---|---|
| Object distance = $-6.5574$. Entrance pupil = $\infty$. | | | |
| Entrance NA = 0.0959, IH = 1.5 | | | |
| $r_1 = 49.8741$ | | | |
| | $d_1 = 32.7869$ | $n_1 = 1.88300$ | $\nu_1 = 40.78$ |
| $r_2 = -11.5347$ (Aspherical surface) | | | |
| | $d_2 = 8.1967$ | | |
| $r_3 = -10.0000$ | | | |
| | $d_3 = 4.9180$ | $n_2 = 1.51633$ | $\nu_2 = 64.15$ |
| $r_4 = 10.0000$ | | | |
| | $d_4 = 8.1967$ | | |
| $r_5 = 11.5347$ (Aspherical surface) | | | |
| | $d_5 = 32.7869$ | $n_3 = 1.88300$ | $\nu_3 = 40.78$ |
| $r_6 = -49.8741$ | | | |

Aspherical coefficient
(2nd surface)
$E = 0.20875 \times 10^{-3}$, $F = -0.52721 \times 10^{-5}$
(5th surface)
$E = -0.20875 \times 10^{-3}$, $F = 0.52721 \times 10^{-5}$
$\Phi_{rA} = 0.0177$, $\Phi_{rB} = 0.07655$, $\Phi_2 = -0.11191$

| Embodiment 25 | | | |
|---|---|---|---|
$\Phi_{rB}/\Phi_2 = -0.68403$, $D_A/D_B = 4.00001$
$\Phi_{rA}/\Phi_{rB} = 0.23122$

| Embodiment 26 | | | |
|---|---|---|---|
| Object distance = $-6.5574$. Entrance pupil = $\infty$. | | | |
| Entrance NA = 0.1016, IH = 1.8 | | | |
| $r_1 = 47.3315$ | | | |
| | $d_1 = 32.7869$ | $n_1 = 1.64000$ | $\nu_1 = 60.09$ |
| $r_2 = -7.6560$ (Aspherical surface) | | | |
| | $d_2 = 8.1967$ | | |
| $r_3 = -7.0000$ (Aspherical surface) | | | |
| | $d_3 = 4.9180$ | $n_2 = 1.53172$ | $\nu_2 = 48.90$ |
| $r_4 = 7.0000$ (Aspherical surface) | | | |
| | $d_4 = 8.1967$ | | |
| $r_5 = 7.6560$ (Aspherical surface) | | | |
| | $d_5 = 32.7869$ | $n_3 = 1.64000$ | $\nu_3 = 60.09$ |
| $r_6 = -47.3315$ | | | |

Aspherical coefficient
(2nd surface)
$E = 0.57420 \times 10^{-3}$, $F = 0.14420 \times 10^{-6}$
(3rd surface)
$E = 0.25083 \times 10^{-2}$, $F = -0.75766 \times 10^{-4}$
(4th surface)
$E = -0.25083 \times 10^{-2}$, $F = 0.75766 \times 10^{-4}$
(5th surface)
$E = -0.57420 \times 10^{-3}$, $F = -0.14420 \times 10^{-6}$
$\Phi_{rA} = 0.01352$, $\Phi_{rB} = 0.08359$, $\Phi_2 = -0.17045$
$\Phi_{rB}/\Phi_2 = -0.49041$, $D_A/D_B = 4.00001$
$\Phi_{rA}/\Phi_{rB} = 0.16174$

| Embodiment 27 | | | |
|---|---|---|---|
| Object distance = $-6.5574$. Entrance pupil = $\infty$. | | | |
| Entrance NA = 0.0968, IH = 1.5 | | | |
| $r_1 = -23.0136$ | | | |
| | $d_1 = 27.0000$ | $n_1 = 1.64000$ | $\nu_1 = 60.09$ |
| $r_2 = -7.7793$ (Aspherical surface) | | | |
| | $d_2 = 13.9836$ | | |
| $r_3 = -7.0000$ (Aspherical surface) | | | |
| | $d_3 = 4.9180$ | $n_2 = 1.53172$ | $\nu_2 = 48.90$ |
| $r_4 = 7.0000$ (Aspherical surface) | | | |
| | $d_4 = 13.9836$ | | |
| $r_5 = 7.7793$ (Aspherical surface) | | | |
| | $d_5 = 27.0000$ | $n_3 = 1.64000$ | $\nu_3 = 60.09$ |
| $r_6 = 23.0136$ | | | |

Aspherical coefficient
(2nd surface)
$E = 0.36493 \times 10^{-3}$, $F = 0.23550 \times 10^{-5}$
(3rd surface)
$E = 0.25458 \times 10^{-2}$, $F = -0.42112 \times 10^{-4}$
(4th surface)
$E = -0.25458 \times 10^{-2}$, $F = 0.42112 \times 10^{-4}$
(5th surface)
$E = -0.36493 \times 10^{-3}$, $F = -0.23550 \times 10^{-5}$
$\Phi_{rA} = -0.02781$, $\Phi_{rB} = 0.08227$, $\Phi_2 = -0.17045$
$\Phi_{rB}/\Phi_2 = -0.48266$, $D_A/D_B = 1.93083$
$\Phi_{rA}/\Phi_{rB} = -0.33803$

| Embodiment 28 | | | |
|---|---|---|---|
| Object distance = $-6.5574$. Entrance pupil = $\infty$. | | | |
| Entrance NA = 0.1017, IH = 1.5 | | | |
| $r_1 = 34.4726$ | | | |
| | $d_1 = 34.0000$ | $n_1 = 1.64000$ | $\nu_1 = 60.09$ |

-continued

Embodiment 28

$r_2 = -7.3122$
(Aspherical surface)
$\quad d_2 = 6.9836$
$r_3 = -6.5000$
(Aspherical surface)
$\quad d_3 = 4.9180 \quad n_2 = 1.53172 \quad \nu_2 = 48.90$
$r_4 = 6.5000$
(Aspherical surface)
$\quad d_4 = 6.9836$
$r_5 = 7.3122$
(Aspherical surface)
$\quad d_5 = 34.0000 \quad n_3 = 1.64000 \quad \nu_3 = 60.09$
$r_6 = -34.4726$
Aspherical coefficient
(2nd surface)
$\quad E = 0.72462 \times 10^{-3}, \quad F = -0.10994 \times 10^{-5}$
(3rd surface)
$\quad E = 0.29986 \times 10^{-2}, \quad F = -0.97092 \times 10^{-4}$
(4th surface)
$\quad E = -0.29986 \times 10^{-2}, \quad F = 0.97092 \times 10^{-4}$
(5th surface)
$\quad E = -0.72462 \times 10^{-3}, \quad F = -0.10994 \times 10^{-5}$
$\Phi_{rA} = -0.01857, \Phi_{rB} = 0.08752, \Phi_2 = -0.18509$
$\Phi_{rB}/\Phi_2 = -0.47285, D_A/D_B = 4.86855$
$\Phi_{rA}/\Phi_{rB} = 0.21218$

Embodiment 29

Object distance = $-6.5574$. Entrance pupil = $\infty$.
Entrance NA = 0.1009, IH = 1.5
$r_1 = 26.1909$
$\quad d_1 = 36.0000 \quad n_1 = 1.64000 \quad \nu_1 = 60.09$
$r_2 = -6.2070$
(Aspherical surface)
$\quad d_2 = 4.9836$
$r_3 = -5.0000$
(Aspherical surface)
$\quad d_3 = 4.9180 \quad n_2 = 1.53172 \quad \nu_2 = 48.90$
$r_4 = 5.0000$
(Aspherical surface)
$\quad d_4 = 4.9836$
$r_5 = 6.2070$
(Aspherical surface)
$\quad d_5 = 36.0000 \quad n_3 = 1.64000 \quad \nu_3 = 60.09$
$r_6 = -26.1909$
Aspherical coefficient
(2nd surface)
$\quad E = 0.13594 \times 10^{-2}, \quad F = -0.67302 \times 10^{-5}$
(3rd surface)
$\quad E = 0.55702 \times 10^{-2}, \quad F = -0.22417 \times 10^{-3}$
(4th surface)
$\quad E = -0.55702 \times 10^{-2}, \quad F = 0.22417 \times 10^{-3}$
(5th surface)
$\quad E = -0.13594 \times 10^{-2}, \quad F = -0.67302 \times 10^{-5}$
$\Phi_{rA} = 0.2444, \Phi_{rB} = 0.10311, \Phi_2 = -0.24900$
$\Phi_{rB}/\Phi_2 = -0.41410, D_A/D_B = 7.22369$
$\Phi_{rA}/\Phi_{rB} = 0.23703$

Embodiment 30

Object distance = $-6.5574$. Entrance pupil = $\infty$.
Entrance NA = 0.1050, IH = 1.8
$r_1 = 45.9770$
$\quad d_1 = 32.7869 \quad n_1 = 1.69680 \quad \nu_1 = 55.52$
$r_2 = -8.6390$
(Aspherical surface)
$\quad d_2 = 8.1967$
$r_3 = -8.0000$
(Aspherical surface)
$\quad d_3 = 4.9180 \quad n_2 = 1.53256 \quad \nu_2 = 45.91$
$r_4 = 8.0000$
(Aspherical surface)
$\quad d_4 = 8.1967$
$r_5 = 8.6390$
(Aspherical surface)
$\quad d_5 = 32.7869 \quad n_3 = 1.69680 \quad \nu_3 = 55.52$
$r_6 = -45.9770$
Aspherical coefficient
(2nd surface)
$\quad E = 0.42326 \times 10^{-3}, \quad F = -0.80779 \times 10^{-6}$
(3rd surface)
$\quad E = 0.18017 \times 10^{-2}, \quad F = -0.52174 \times 10^{-4}$
(4th surface)
$\quad E = -0.18017 \times 10^{-2}, \quad F = 0.52174 \times 10^{-4}$
(5th surface)
$\quad E = -0.42326 \times 10^{-3}, \quad F = 0.80779 \times 10^{-6}$
$\Phi_{rA} = 0.01516, \Phi_{rB} = 0.08066, \Phi_2 = -0.14736$
$\Phi_{rB}/\Phi_2 = -0.54737, D_A/D_B = 4.00001$
$\Phi_{rA}/\Phi_{rB} = 0.18795$

Embodiment 31

Object distance = $-6.5574$. Entrance pupil = $\infty$.
Entrance NA = 0.1006, IH = 1.5
$r_1 = 21.0304$
$\quad d_1 = 38.0000 \quad n_1 = 1.64000 \quad \nu_1 = 60.09$
$r_2 = -5.0368$
(Aspherical surface)
$\quad d_2 = 2.9836$
$r_3 = -4.0000$
(Aspherical surface)
$\quad d_3 = 4.9180 \quad n_2 = 1.53172 \quad \nu_2 = 48.90$
$r_4 = 4.0000$
(Aspherical surface)
$\quad d_4 = 2.9836$
$r_5 = 5.0368$
(Aspherical surface)
$\quad d_5 = 38.0000 \quad n_3 = 1.64000 \quad \nu_3 = 60.09$
$r_6 = -21.0304$
Aspherical coefficient
(2nd surface)
$\quad E = 0.30191 \times 10^{-2}, \quad F = -0.38991 \times 10^{-4}$
(3rd surface)
$\quad E = 0.97360 \times 10^{-2}, \quad F = -0.43883 \times 10^{-3}$
(4th surface)
$\quad E = -0.97360 \times 10^{-2}, \quad F = 0.43883 \times 10^{-3}$
(5th surface)
$\quad E = -0.30191 \times 10^{-2}, \quad F = 0.38991 \times 10^{-4}$
$\Phi_{rA} = 0.03043, \Phi_{rB} = 0.12706, \Phi_2 = -0.32260$
$\Phi_{rB}/\Phi_2 = -0.39386, D_A/D_B = 12.7363$
$\Phi_{rA}/\Phi_{rB} = 0.23949$

Embodiment 32

Object distance = $-6.5574$. Entrance pupil = $\infty$.
Entrance NA = 0.1039, IH = 1.8
$r_1 = 53.2395$
$\quad d_1 = 32.7869 \quad n_1 = 1.69680 \quad \nu_1 = 55.52$
$r_2 = -8.2364$
(Aspherical surface)
$\quad d_2 = 8.1967$
$r_3 = -7.0000$
(Aspherical surface)
$\quad d_3 = 4.9180 \quad n_2 = 1.53256 \quad \nu_2 = 45.91$
$r_4 = 7.0000$
(Aspherical surface)
$\quad d_4 = 8.1967$
$r_5 = 8.2364$
(Aspherical surface)
$\quad d_5 = 32.7869 \quad n_3 = 1.69680 \quad \nu_3 = 55.52$
$r_6 = 53.2395$
Aspherical coefficient
(2nd surface)
$\quad E = 0.47642 \times 10^{-3}, \quad F = -0.25342 \times 10^{-6}$
(3rd surface)
$\quad E = 0.23794 \times 10^{-2}, \quad F = -0.68530 \times 10^{-4}$
(4th surface)
$\quad E = -0.23794 \times 10^{-2}, \quad F = 0.68530 \times 10^{-4}$
(5th surface)
$\quad E = -0.47642 \times 10^{-3}, \quad F = 0.25342 \times 10^{-6}$
$\Phi_{rA} = 0.01309, \Phi_{rB} = 0.08460, \Phi_2 = -0.17073$
$\Phi_{rB}/\Phi_2 = -0.49552, D_A/D_B = 4.00001$ -continued

Embodiment 32

$\Phi_{rA}/\Phi_{rB} = 0.15473$

Embodiment 33

Object distance = −6.5574. Entrance pupil = ∞.
Entrance NA = 0.0997, IH = 1.5
$r_1 = 41.7891$
   $d_1 = 32.7869$  $n_1 = 1.58913$  $v_1 = 60.97$
$r_2 = -7.1228$
(Aspherical surface)
   $d_2 = 8.1967$
$r_3 = -7.0000$
(Aspherical surface)
   $d_3 = 4.9180$  $n_2 = 1.53172$  $v_2 = 48.90$
$r_4 = 7.0000$
(Aspherical surface)
   $d_4 = 8.1967$
$r_5 = 7.1228$
(Aspherical surface)
   $d_5 = 32.7869$  $n_3 = 1.58913$  $v_3 = 60.97$
$r_6 = -41.7891$
Aspherical coefficient
(2nd surface)
   $E = 0.69355 \cdot 10^{-3}$,  $F = 0.49487 \cdot 10^{-6}$
(3rd surface)
   $E = 0.26566 \cdot 10^{-2}$,  $F = -0.85679 \cdot 10^{-4}$
(4th surface)
   $E = -0.26566 \cdot 10^{-2}$,  $F = 0.85679 \cdot 10^{-4}$
(5th surface)
   $E = -0.69355 \cdot 10^{-3}$,  $F = -0.49487 \cdot 10^{-6}$
$\Phi_{rA} = 0.0141$, $\Phi_{rB} = 0.08271$, $\Phi_2 = -0.17045$
$\Phi_{rB}/\Phi_2 = -0.48524$, $D_A/D_B = 4.00001$
$\Phi_{rA}/\Phi_{rB} = 0.17048$

Embodiment 34

Object distance = −6.5574. Entrance pupil = ∞.
Entrance NA = 0.1024, IH = 1.5
$r_1 = 42.7948$
   $d_1 = 32.7869$  $n_1 = 1.64000$  $v_1 = 60.09$
$r_2 = -7.8114$
(Aspherical surface)
   $d_2 = 8.1967$
$r_3 = -11.4754$
   $d_3 = 1.6393$  $n_2 = 1.69895$  $v_2 = 30.12$
$r_4 = 16.3934$
   $d_4 = 1.6393$  $n_3 = 1.51633$  $v_3 = 64.15$
$r_5 = -16.3934$
   $d_5 = 1.6393$  $n_4 = 1.69895$  $v_4 = 30.12$
$r_6 = 11.4754$
(Aspherical surface)
   $d_6 = 8.1967$
$r_7 = 7.8114$
(Aspherical surface)
   $d_7 = 32.7869$  $n_5 = 1.64000$  $v_5 = 60.09$
$r_8 = -42.7948$
Aspherical coefficient
(2nd surface)
   $E = 0.56374 \cdot 10^{-3}$,  $F = -0.13021 \times 10^{-5}$
(3rd surface)
   $E = 0.15567 \times 10^{-2}$,  $F = -0.58930 \cdot 10^{-4}$
(6th surface)
   $E = -0.15567 \times 10^{-2}$,  $F = 0.58930 \times 10^{-4}$
(7th surface)
   $E = -0.56374 \times 10^{-3}$,  $F = -0.13021 \times 10^{-5}$
$\Phi_{rA} = 0.01496$, $\Phi_{rB} = 0.08193$, $\Phi_2 = -0.15967$
$\Phi_{rB}/\Phi_2 = -0.51312$, $D_A/D_B = 4.00001$
$\Phi_{rA}/\Phi_{rB} = 0.18259$

Embodiment 35

Object distance = −6.5600. Entrance pupil = ∞.
Entrance NA = 0.1024, IH = 1.5
$r_1 = 42.6779$
   $d_1 = 32.7900$  $n_1 = 1.64000$  $v_1 = 60.09$
$r_2 = -7.8130$
(Aspherical surface)
   $d_2 = 8.2000$
$r_3 = -11.4754$
(Aspherical surface)
   $d_3 = 1.6300$  $n_2 = 1.69895$  $v_2 = 30.12$
$r_4 = 16.3934$
   $d_4 = 1.6400$  $n_3 = 1.51633$  $v_3 = 64.15$
$r_5 = -16.3934$
   $d_5 = 1.6300$  $n_4 = 1.69895$  $v_4 = 30.12$
$r_6 = 11.4754$
(Aspherical surface)
   $d_6 = 8.2000$
$r_7 = 7.8130$
(Aspherical surface)
   $d_7 = 32.7900$  $n_5 = 1.64000$  $v_5 = 60.09$
$r_8 = -42.6779$
Aspherical coefficient
(2nd surface)
   $E = 0.58448 \cdot 10^{-3}$,  $F = -0.28638 \cdot 10^{-5}$
(3rd surface)
   $E = 0.16680 \cdot 10^{-2}$,  $F = -0.79214 \cdot 10^{-4}$
(6th surface)
   $E = -0.16680 \cdot 10^{-2}$,  $F = 0.79214 \cdot 10^{-4}$
(7th surface)
   $E = -0.58448 \cdot 10^{-3}$,  $F = -0.28638 \cdot 10^{-5}$
$\Phi_{rA} = 0.015$, $\Phi_{rB} = 0.08191$, $\Phi_2 = -0.15961$
$\Phi_{rB}/\Phi_2 = -0.51312$, $D_A/D_B = 3.99878$
$\Phi_{rA}/\Phi_{rB} = 0.18313$

Embodiment 36

Object distance = −6.6600. Entrance pupil = ∞.
Entrance NA = 0.1043, IH = 1.5
$r_1 = 24.3953$
   $d_1 = 36.6700$  $n_1 = 1.69680$  $v_1 = 55.52$
$r_2 = -6.5914$
(Aspherical Surface)
   $d_2 = 4.1700$
$r_3 = -6.1802$
(Aspherical surface)
   $d_3 = 2.5000$  $n_2 = 1.62041$  $v_2 = 60.27$
$r_4 = -3.3000$
   $d_4 = 2.5000$  $n_3 = 1.63980$  $v_3 = 34.48$
$r_5 = 6.3755$
(Aspherical surface)
   $d_5 = 4.1700$
$r_6 = 6.5914$
(Aspherical surface)
   $d_6 = 36.6700$  $n_4 = 1.69680$  $v_4 = 55.52$
$r_7 = -24.3953$
Aspherical coefficient
(2nd surface)
   $E = 0.13571 \times 10^{-2}$,  $F = -0.14768 \times 10^{-4}$
(3rd surface)
   $E = 0.42995 \times 10^{-2}$,  $F = -0.18236 \times 10^{-3}$
(5th surface)
   $E = -0.39558 \times 10^{-2}$,  $F = 0.18236 \times 10^{-3}$
(6th surface)
   $E = -0.13571 \times 10^{-2}$,  $F = 0.14768 \times 10^{-4}$
$\Phi_{rA} = 0.02856$, $\Phi_{rB} = 0.10571$, $\Phi_2 = -0.23946$
$\Phi_{rB}/\Phi_2 = -0.44145$, $D_A/D_B = 8.7938$
$\Phi_{rA}/\Phi_{rB} = 0.27017$

Embodiment 37

Object distance = −6.6600. Entrance pupil = ∞.
Entrance NA = 0.1043, IH = 1.5
$r_1 = 24.3953$
   $d_1 = 36.6700$  $n_1 = 1.69680$  $v_1 = 55.52$
$r_2 = -6.5914$
(Aspherical surface)
   $d_2 = 4.1700$

Embodiment 37

$r_1 = -6.3755$
(Aspherical surface)
$\quad d_3 = 2.5000 \quad n_2 = 1.63980 \quad v_2 = 34.48$
$r_4 = 3.3000$
$\quad d_4 = 2.5000 \quad n_3 = 1.62041 \quad v_3 = 60.27$
$r_5 = 6.1802$
(Aspherical surface)
$\quad d_5 = 4.1700$
$r_6 = 6.5914$
(Aspherical surface)
$\quad d_6 = 36.6700 \quad n_4 = 1.69680 \quad v_4 = 55.52$
$r_7 = -24.3953$
Aspherical coefficient
(2nd surface)
$\quad E = 0.13571 \times 10^{-2}, \quad F = -0.14769 \times 10^{-4}$
(3rd surface)
$\quad E = 0.39559 \times 10^{-2}, \quad F = -0.18236 \times 10^{-3}$
(5th surface)
$\quad E = -0.42995 \times 10^{-2}, \quad F = 0.18236 \times 10^{-3}$
(6th surface)
$\quad E = -0.13571 \times 10^{-2}, \quad F = 0.14769 \times 10^{-4}$
$\Phi_{rA} = 0.02856, \Phi_{rB} = 0.10571, \Phi_2 = -0.23946$
$\Phi_{rB}/\Phi_2 = -0.44145, D_A/D_B = 3.7938$
$\Phi_{rA}/\Phi_{rB} = 0.27017$

Embodiment 38

Object distance = $-6.5574$, Entrance pupil = $\infty$.
Entrance NA = 0.1045, IH = 1.5
$r_1 = 48.1941$
$\quad d_1 = 31.0000 \quad n_1 = 1.69680 \quad v_1 = 55.52$
$r_2 = -5.2000$
$\quad d_2 = 1.7869 \quad n_2 = 1.69895 \quad v_2 = 30.12$
$r_3 = -8.4304$
(Aspherical surface)
$\quad d_3 = 8.1967$
$r_4 = -7.5000$
(Aspherical surface)
$\quad d_4 = 4.9180 \quad n_3 = 1.53256 \quad v_3 = 45.91$
$r_5 = 7.5000$
(Aspherical surface)
$\quad d_5 = 8.1967$
$r_6 = 8.4304$
(Aspherical surface)
$\quad d_6 = 1.7869 \quad n_4 = 1.69895 \quad v_4 = 30.12$
$r_7 = 5.2000$
$\quad d_7 = 31.0000 \quad n_5 = 1.69680 \quad v_5 = 55.52$
$r_8 = -48.1941$
Aspherical coefficient
(3rd surface)
$\quad E = 0.44601 \times 10^{-3}, \quad F = -0.39168 \times 10^{-6}$
(4th surface)
$\quad E = 0.20557 \times 10^{-2}, \quad F = -0.56870 \times 10^{-4}$
(5th surface)
$\quad E = -0.20557 \times 10^{-2}, \quad F = 0.56870 \times 10^{-4}$
(6th surface)
$\quad E = -0.44601 \times 10^{-3}, \quad F = 0.39168 \times 10^{-6}$
$\Phi_{rA} = 0.01446, \Phi_{rB} = 0.08291, \Phi_2 = -0.15820$
$\Phi_{rB}/\Phi_2 = -0.52408, D_A/D_B = 4.00001$
$\Phi_{rA}/\Phi_{rB} = 0.17441$

Embodiment 1

| K | Spherical surface term | Aspherical surface term | Total |
|---|---|---|---|
| Spherical aberration SA3 | | | |
| 1 | −0.00037 | 0 | −0.00037 |
| 2 | 0.00000 | 0 | 0.00000 |
| 3 | 0.01178 | 0 | 0.01178 |
| 4 | −0.00336 | 0 | −0.00336 |
| 5 | −0.00336 | 0 | −0.00336 |
| 6 | 0.01178 | 0 | 0.01178 |
| 7 | 0.00000 | 0 | 0.00000 |
| 8 | −0.00037 | 0 | −0.00037 |
| Total | 0.01611 | 0 | 0.01611 |

Embodiment 1 (continued)

| K | Spherical surface term | Aspherical surface term | Total |
|---|---|---|---|
| Total | −0.08544 | 0 | −0.08544 |
| Astigmatism AST3 | | | |
| 1 | −0.00011 | 0 | −0.00011 |
| 2 | 0.00011 | 0 | 0.00011 |
| 3 | 0.00112 | 0 | 0.00112 |
| 4 | −0.00108 | 0 | −0.00108 |
| 5 | −0.00098 | 0 | −0.00098 |
| 6 | 0.00093 | 0 | 0.00093 |
| 7 | 0.00010 | 0 | 0.00010 |
| 8 | −0.00010 | 0 | −0.00010 |
| Total | −0.00001 | 0 | −0.00001 |
| Total | 0.00007 | 0 | 0.00007 |

Embodiment 2

| K | Spherical surface term | Aspherical surface term | Total |
|---|---|---|---|
| Spherical aberration SA3 | | | |
| 1 | −0.00032 | 0 | −0.00032 |
| 2 | 0.00033 | 0 | 0.00033 |
| 3 | 0.00493 | 0 | 0.00493 |
| 4 | −0.00506 | 0 | −0.00506 |
| 5 | −0.00506 | 0 | −0.00506 |
| 6 | 0.00493 | 0 | 0.00493 |
| 7 | 0.00033 | 0 | 0.00033 |
| 8 | −0.00032 | 0 | −0.00032 |
| Total | −0.00023 | 0 | −0.00023 |
| Total | 0.00145 | 0 | 0.00145 |
| Astigmatism AST3 | | | |
| 1 | −0.00066 | 0 | −0.00066 |
| 2 | 0.00081 | 0 | 0.00081 |
| 3 | 0.00083 | 0 | 0.00083 |
| 4 | −0.00101 | 0 | −0.00101 |
| 5 | −0.00101 | 0 | −0.00101 |
| 6 | 0.00083 | 0 | 0.00083 |
| 7 | 0.00081 | 0 | 0.00081 |
| 8 | −0.00066 | 0 | −0.00066 |
| Total | −0.00005 | 0 | −0.00005 |
| Total | 0.00033 | 0 | 0.00033 |

Embodiment 3

| K | Spherical surface term | Aspherical surface term | Total |
|---|---|---|---|
| Spherical aberration SA3 | | | |
| 1 | −0.00046 | 0 | −0.00046 |
| 2 | 0.00000 | 0 | 0.00000 |
| 3 | −0.01128 | 0 | −0.01128 |
| 4 | −0.00008 | 0 | −0.00008 |
| 5 | −0.00008 | 0 | −0.00008 |
| 6 | −0.01128 | 0 | −0.01128 |
| 7 | 0.00000 | 0 | 0.00000 |
| 8 | −0.00046 | 0 | −0.00046 |
| Total | −0.02362 | 0 | −0.02362 |
| Total | 0.11651 | 0 | 0.11651 |
| Astigmatism AST3 | | | |
| 1 | −0.00006 | 0 | −0.00006 |
| 2 | 0.00022 | 0 | 0.00022 |
| 3 | −0.00001 | 0 | −0.00001 |
| 4 | −0.00025 | 0 | −0.00025 |
| 5 | −0.00025 | 0 | −0.00025 |
| 6 | −0.00001 | 0 | −0.00001 |
| 7 | 0.00022 | 0 | 0.00022 |
| 8 | −0.00006 | 0 | −0.00006 |
| Total | −0.00021 | 0 | −0.00021 |
| Total | 0.00101 | 0 | 0.00101 |

| | Embodiment 4 | | |
|---|---|---|---|
| K | Spherical surface term | Aspherical surface term | Total |
| Spherical aberration SA3 | | | |
| 1 | −0.00053 | 0 | −0.00053 |
| 2 | 0.00029 | 0 | 0.00029 |
| 3 | 0.00250 | 0 | 0.00250 |
| 4 | −0.00346 | 0.00121 | −0.00226 |
| 5 | −0.00346 | 0.00121 | −0.00226 |
| 6 | 0.00250 | 0 | 0.00250 |
| 7 | 0.00029 | 0 | 0.00029 |
| 8 | −0.00053 | 0 | −0.00053 |
| Total | −0.00241 | 0.00241 | 0.00000 |
| Total | 0.01355 | −0.01356 | −0.00001 |
| Astigmatism AST3 | | | |
| 1 | −0.00108 | 0 | −0.00108 |
| 2 | 0.00145 | 0 | 0.00145 |
| 3 | 0.00032 | 0 | 0.00032 |
| 4 | −0.00086 | 0.00001 | −0.00085 |
| 5 | −0.00096 | 0.00002 | −0.00094 |
| 6 | 0.00037 | 0 | 0.00037 |
| 7 | 0.00149 | 0 | 0.00149 |
| 8 | −0.00113 | 0 | −0.00113 |
| Total | −0.00041 | 0.00003 | −0.00038 |
| Total | 0.00230 | −0.00018 | 0.00212 |

| | Embodiment 5 | | |
|---|---|---|---|
| K | Spherical surface term | Aspherical surface term | Total |
| Spherical aberration SA3 | | | |
| 1 | −0.00038 | 0 | −0.00038 |
| 2 | 0.00000 | 0 | 0.00000 |
| 3 | −0.00642 | 0 | −0.00642 |
| 4 | −0.00030 | 0.00753 | 0.00723 |
| 5 | −0.00030 | 0.00753 | 0.00723 |
| 6 | −0.00642 | 0 | −0.00642 |
| 7 | 0.00000 | 0 | 0.00000 |
| 8 | −0.00038 | 0 | −0.00038 |
| Total | −0.01420 | 0.01507 | 0.00087 |
| Total | 0.07192 | −0.07632 | −0.00440 |
| Astigmatism AST3 | | | |
| 1 | −0.00002 | 0 | −0.00002 |
| 2 | 0.00027 | 0 | 0.00027 |
| 3 | −0.00001 | 0 | −0.00001 |
| 4 | −0.00039 | 0.00016 | −0.00023 |
| 5 | −0.00037 | 0.00009 | −0.00028 |
| 6 | 0.00000 | 0 | 0.00000 |
| 7 | 0.00027 | 0 | 0.00027 |
| 8 | −0.00001 | 0 | −0.00001 |
| Total | −0.00026 | 0.00025 | −0.00001 |
| Total | 0.00131 | −0.00125 | 0.00006 |

| | Embodiment 6 | | |
|---|---|---|---|
| K | Spherical surface term | Aspherical surface term | Total |
| Spherical aberration SA3 | | | |
| 1 | −0.00037 | 0 | −0.00037 |
| 2 | 0.00000 | 0 | 0.00000 |
| 3 | 0.01563 | 0 | 0.01563 |
| 4 | −0.00377 | −0.01135 | −0.01512 |
| 5 | −0.00377 | −0.01135 | −0.01512 |
| 6 | 0.01563 | 0 | 0.01563 |
| 7 | 0.00000 | 0 | 0.00000 |
| 8 | −0.00037 | 0 | −0.00037 |
| Total | 0.02298 | −0.02270 | 0.00028 |
| Total | −0.12144 | 0.11999 | −0.00145 |
| Astigmatism AST3 | | | |
| 1 | −0.00012 | 0 | −0.00012 |
| 2 | 0.00011 | 0 | 0.00011 |
| 3 | 0.00137 | 0 | 0.00137 |
| 4 | −0.00114 | −0.00021 | −0.00135 |
| 5 | −0.00103 | −0.00013 | −0.00116 |

-continued

| | Embodiment 6 | | |
|---|---|---|---|
| K | Spherical surface term | Aspherical surface term | Total |
| 6 | 0.00113 | 0 | 0.00113 |
| 7 | 0.00011 | 0 | 0.00011 |
| 8 | −0.00010 | 0 | −0.00010 |
| Total | 0.00032 | −0.00034 | −0.00002 |
| Total | −0.00170 | 0.00180 | 0.00010 |

| | Embodiment 7 | | |
|---|---|---|---|
| K | Spherical surface term | Aspherical surface term | Total |
| Spherical aberration SA3 | | | |
| 1 | −0.00053 | −0.00001 | −0.00054 |
| 2 | 0.00031 | 0 | 0.00031 |
| 3 | 0.01912 | 0 | 0.01912 |
| 4 | −0.00856 | −0.01241 | −0.02097 |
| 5 | −0.00856 | −0.01241 | −0.02097 |
| 6 | 0.01912 | 0 | 0.01912 |
| 7 | 0.00031 | 0 | 0.00031 |
| 8 | −0.00053 | −0.00001 | −0.00054 |
| Total | 0.02067 | −0.02485 | −0.00418 |
| Total | −0.11762 | 0.14140 | 0.02377 |
| Astigmatism AST3 | | | |
| 1 | −0.00115 | −0.00025 | −0.00140 |
| 2 | 0.00151 | 0 | 0.00151 |
| 3 | 0.00160 | 0 | 0.00160 |
| 4 | −0.00161 | −0.00025 | −0.00185 |
| 5 | −0.00161 | −0.00025 | −0.00185 |
| 6 | 0.00160 | 0 | 0.00160 |
| 7 | 0.00151 | 0 | 0.00151 |
| 8 | −0.00115 | −0.00025 | −0.00140 |
| Total | 0.00070 | −0.00099 | −0.00028 |
| Total | −0.00399 | 0.00561 | 0.00162 |

| | Embodiment 8 | | |
|---|---|---|---|
| K | Spherical surface term | Aspherical surface term | Total |
| Spherical aberration SA3 | | | |
| 1 | −0.00001 | −0.00001 | −0.00059 |
| 2 | 0.00022 | 0 | 0.00022 |
| 3 | 0.01388 | 0 | 0.01388 |
| 4 | −0.00354 | −0.00982 | −0.01336 |
| 5 | −0.00354 | −0.00982 | −0.01336 |
| 6 | 0.01388 | 0 | 0.01388 |
| 7 | 0.00022 | 0 | 0.00022 |
| 8 | −0.00058 | −0.00001 | −0.00059 |
| Total | 0.01995 | −0.01967 | 0.00029 |
| Total | −0.10447 | 0.10296 | −0.00151 |
| Astigmatism AST3 | | | |
| 1 | −0.00071 | −0.00023 | −0.00094 |
| 2 | 0.00108 | 0 | 0.00108 |
| 3 | 0.00117 | 0 | 0.00117 |
| 4 | −0.00119 | −0.00023 | −0.00142 |
| 5 | −0.00119 | −0.00023 | −0.00142 |
| 6 | 0.00117 | 0 | 0.00117 |
| 7 | 0.00108 | 0 | 0.00108 |
| 8 | −0.00071 | −0.00023 | −0.00094 |
| Total | 0.00069 | −0.00092 | −0.00023 |
| Total | −0.00364 | 0.00483 | 0.00119 |

| | Embodiment 9 | | |
|---|---|---|---|
| K | Spherical surface term | Aspherical surface term | Total |
| Spherical aberration SA3 | | | |
| 1 | −0.00047 | 0.00001 | −0.00046 |
| 2 | 0.00000 | 0 | 0.00000 |
| 3 | −0.00714 | 0 | −0.00714 |
| 4 | −0.00031 | 0.00844 | 0.00812 |

-continued

Embodiment 9

| K | Spherical surface term | Aspherical surface term | Total |
|---|---|---|---|
| 5 | −0.00031 | 0.00844 | 0.00812 |
| 6 | −0.00714 | 0 | −0.00714 |
| 7 | 0.00000 | 0 | 0.00000 |
| 8 | −0.00047 | 0.00001 | −0.00046 |
| Total | −0.01585 | 0.01690 | 0.00105 |
| Total | 0.07934 | −0.08460 | −0.00526 |
| Astigmatism AST3 | | | |
| 1 | −0.00014 | 0.00022 | 0.00007 |
| 2 | 0.00013 | 0 | 0.00013 |
| 3 | −0.00001 | 0 | −0.00001 |
| 4 | −0.00042 | 0.00022 | −0.00020 |
| 5 | −0.00042 | 0.00022 | −0.00020 |
| 6 | −0.00001 | 0 | −0.00001 |
| 7 | 0.00013 | 0 | 0.00013 |
| 8 | −0.00014 | 0.00022 | 0.00007 |
| Total | −0.00088 | 0.00087 | −0.00002 |
| Total | 0.00442 | −0.00434 | 0.00008 |

Embodiment 10

| K | Spherical surface term | Aspherical surface term | Total |
|---|---|---|---|
| Spherical aberration SA3 | | | |
| 1 | −0.00050 | 0.00000 | −0.00050 |
| 2 | 0.00000 | 0 | 0.00000 |
| 3 | −0.00705 | 0 | −0.00705 |
| 4 | −0.00019 | 0.00000 | −0.00019 |
| 5 | −0.00019 | 0.00000 | −0.00019 |
| 6 | −0.00705 | 0 | −0.00705 |
| 7 | 0.00000 | 0 | 0.00000 |
| 8 | −0.00050 | 0.00000 | −0.00050 |
| Total | −0.01548 | 0.00000 | −0.01548 |
| Total | 0.07589 | 0.00000 | 0.07589 |
| Astigmatism AST3 | | | |
| 1 | −0.00011 | 0.00000 | −0.00011 |
| 2 | 0.00017 | 0 | 0.00017 |
| 3 | 0.00000 | 0 | 0.00000 |
| 4 | −0.00035 | 0.00000 | −0.00035 |
| 5 | −0.00035 | 0.00000 | −0.00035 |
| 6 | 0.00000 | 0 | 0.00000 |
| 7 | 0.00017 | 0 | 0.00017 |
| 8 | −0.00011 | 0.00000 | −0.00011 |
| Total | −0.00058 | 0.00000 | −0.00058 |
| Total | 0.00287 | 0.00000 | 0.00287 |

Embodiment 11

| K | Spherical surface term | Aspherical surface term | Total |
|---|---|---|---|
| Spherical aberration SA3 | | | |
| 1 | −0.00047 | 0.00001 | −0.00046 |
| 2 | 0.00000 | 0 | 0.00000 |
| 3 | −0.00551 | 0 | −0.00551 |
| 4 | −0.00023 | 0.00620 | 0.00597 |
| 5 | −0.00023 | 0.00620 | 0.00597 |
| 6 | −0.00551 | 0 | −0.00551 |
| 7 | 0.00000 | 0 | 0.00000 |
| 8 | −0.00047 | 0.00001 | −0.00046 |
| Total | −0.01243 | 0.01242 | −0.00001 |
| Total | 0.06202 | −0.06198 | 0.00004 |
| Astigmatism AST3 | | | |
| 1 | −0.00012 | 0.00016 | 0.00004 |
| 2 | 0.00016 | 0 | 0.00016 |
| 3 | 0.00000 | 0 | 0.00000 |
| 4 | −0.00038 | 0.00016 | −0.00022 |
| 5 | −0.00038 | 0.00016 | −0.00022 |
| 6 | 0.00000 | 0 | 0.00000 |
| 7 | 0.00016 | 0 | 0.00016 |
| 8 | −0.00012 | 0.00016 | 0.00004 |
| Total | −0.00067 | 0.00064 | −0.00003 |

-continued

Embodiment 11

| K | Spherical surface term | Aspherical surface term | Total |
|---|---|---|---|
| Total | 0.00335 | −0.00320 | 0.00015 |

Embodiment 12

| K | Spherical surface term | Aspherical surface term | Total |
|---|---|---|---|
| Spherical aberration SA3 | | | |
| 1 | −0.00120 | 0.00008 | −0.00112 |
| 2 | 0.00000 | 0 | 0.00000 |
| 3 | −0.00420 | 0 | −0.00420 |
| 4 | −0.00037 | 0.00593 | 0.00556 |
| 5 | −0.00037 | 0.00593 | 0.00556 |
| 6 | −0.00420 | 0 | −0.00420 |
| 7 | 0.00000 | 0 | 0.00000 |
| 8 | −0.00120 | 0.00008 | −0.00112 |
| Total | −0.01154 | 0.01202 | 0.00048 |
| Total | 0.05408 | −0.05633 | −0.00225 |
| Astigmatism AST3 | | | |
| 1 | −0.00030 | 0.00044 | 0.00014 |
| 2 | 0.00006 | 0 | 0.00006 |
| 3 | −0.00004 | 0 | −0.00004 |
| 4 | −0.00061 | 0.00044 | −0.00016 |
| 5 | −0.00061 | 0.00044 | −0.00016 |
| 6 | −0.00004 | 0 | −0.00004 |
| 7 | 0.00006 | 0 | 0.00006 |
| 8 | −0.00030 | 0.00044 | 0.00014 |
| Total | −0.00178 | 0.00177 | −0.00001 |
| Total | 0.00834 | −0.00831 | 0.00003 |

Embodiment 13

| K | Spherical surface term | Aspherical surface term | Total |
|---|---|---|---|
| Spherical aberration SA3 | | | |
| 1 | −0.00313 | −0.00013 | −0.00326 |
| 2 | 0.00171 | 0 | 0.00171 |
| 3 | 0.00903 | 0 | 0.00903 |
| 4 | −0.00354 | −0.00390 | −0.00744 |
| 5 | −0.00354 | −0.00390 | −0.00744 |
| 6 | 0.00903 | 0 | 0.00903 |
| 7 | 0.00171 | 0 | 0.00171 |
| 8 | −0.00313 | −0.00013 | −0.00326 |
| Total | 0.00814 | −0.00806 | 0.00008 |
| Total | −0.03842 | 0.03803 | −0.00039 |
| Astigmatism AST3 | | | |
| 1 | −0.00195 | −0.00045 | −0.00240 |
| 2 | 0.00252 | 0 | 0.00252 |
| 3 | 0.00251 | 0 | 0.00251 |
| 4 | −0.00233 | −0.00045 | −0.00278 |
| 5 | −0.00233 | −0.00045 | −0.00278 |
| 6 | 0.00251 | 0 | 0.00251 |
| 7 | 0.00252 | 0 | 0.00252 |
| 8 | −0.00195 | −0.00045 | −0.00240 |
| Total | 0.00150 | −0.00180 | −0.00030 |
| Total | −0.00706 | 0.00848 | 0.00142 |

Embodiment 14

| K | Spherical surface term | Aspherical surface term | Total |
|---|---|---|---|
| Spherical aberration SA3 | | | |
| 1 | −0.00309 | 0.00037 | −0.00272 |
| 2 | 0.00000 | 0 | 0.00000 |
| 3 | −0.00101 | 0 | −0.00101 |
| 4 | −0.00049 | 0.00431 | 0.00382 |
| 5 | −0.00049 | 0.00431 | 0.00382 |
| 6 | −0.00101 | 0 | −0.00101 |
| 7 | 0.00000 | 0 | 0.00000 |
| 8 | −0.00309 | 0.00037 | −0.00272 |

-continued

Embodiment 14

| K | Spherical surface term | Aspherical surface term | Total |
|---|---|---|---|
| Total | −0.00919 | 0.00937 | 0.00018 |
| Total | 0.04072 | −0.04153 | −0.00081 |
| Astigmatism AST3 | | | |
| 1 | −0.00065 | 0.00081 | 0.00016 |
| 2 | 0.00001 | 0 | 0.00001 |
| 3 | −0.00003 | 0 | −0.00003 |
| 4 | −0.00096 | 0.00081 | −0.00015 |
| 5 | −0.00096 | 0.00081 | −0.00015 |
| 6 | −0.00003 | 0 | −0.00003 |
| 7 | 0.00001 | 0 | 0.00001 |
| 8 | −0.00065 | 0.00081 | 0.00016 |
| Total | −0.00325 | 0.00324 | −0.00001 |
| Total | 0.01440 | −0.01437 | 0.00003 |

Embodiment 15

| K | Spherical surface term | Aspherical surface term | Total |
|---|---|---|---|
| Spherical aberration SA3 | | | |
| 1 | −0.00749 | 0.00019 | −0.00731 |
| 2 | 0.00435 | 0 | 0.00435 |
| 3 | 0.00547 | 0 | 0.00547 |
| 4 | −0.00409 | 0.00142 | −0.00267 |
| 5 | −0.00409 | 0.00142 | −0.00267 |
| 6 | 0.00547 | 0 | 0.00547 |
| 7 | 0.00435 | 0 | 0.00435 |
| 8 | −0.00749 | 0.00019 | −0.00731 |
| Total | −0.00353 | 0.00322 | −0.00031 |
| Total | 0.01640 | −0.01496 | 0.00143 |
| Astigmatism AST3 | | | |
| 1 | −0.00348 | 0.00033 | −0.00315 |
| 2 | 0.00323 | 0 | 0.00323 |
| 3 | 0.00302 | 0 | 0.00302 |
| 4 | −0.00361 | 0.00033 | −0.00328 |
| 5 | −0.00361 | 0.00033 | −0.00328 |
| 6 | 0.00302 | 0 | 0.00302 |
| 7 | 0.00323 | 0 | 0.00323 |
| 8 | −0.00348 | 0.00033 | −0.00315 |
| Total | −0.00168 | 0.00132 | −0.00036 |
| Total | 0.00781 | −0.00614 | 0.00167 |

Embodiment 16

| K | Spherical surface term | Aspherical surface term | Total |
|---|---|---|---|
| Spherical aberration SA3 | | | |
| 1 | −0.00056 | 0.00002 | −0.00053 |
| 2 | 0.00000 | 0 | 0.00000 |
| 3 | 0.01049 | 0 | 0.01049 |
| 4 | −0.00026 | 0.01236 | 0.01210 |
| 5 | −0.00026 | 0.01236 | 0.01210 |
| 6 | −0.01049 | 0 | −0.01049 |
| 7 | 0.00000 | 0 | 0.00000 |
| 8 | −0.00056 | 0.00002 | −0.00053 |
| Total | −0.02260 | 0.02477 | 0.00217 |
| Total | 0.10783 | −0.11817 | 0.01034 |
| Astigmatism AST3 | | | |
| 1 | −0.00014 | 0.00035 | 0.00021 |
| 2 | 0.00002 | 0 | 0.00002 |
| 3 | −0.00014 | 0 | −0.00014 |
| 4 | −0.00043 | 0.00035 | −0.00008 |
| 5 | −0.00043 | 0.00035 | −0.00008 |
| 6 | −0.00014 | 0 | −0.00014 |
| 7 | 0.00002 | 0 | 0.00002 |
| 8 | −0.00014 | 0.00035 | 0.00021 |
| Total | −0.00139 | 0.00139 | 0.00001 |
| Total | 0.00661 | −0.00664 | −0.00003 |

Embodiment 17

| K | Spherical surface term | Aspherical surface term | Total |
|---|---|---|---|
| Spherical aberration SA3 | | | |
| 1 | −0.00082 | 0.00003 | −0.00079 |
| 2 | 0.00000 | 0 | 0.00000 |
| 3 | −0.00734 | 0 | −0.00734 |
| 4 | −0.00012 | 0.01021 | 0.01010 |
| 5 | −0.00012 | 0.01021 | 0.01010 |
| 6 | −0.00734 | 0 | −0.00734 |
| 7 | 0.00000 | 0 | 0.00000 |
| 8 | −0.00082 | 0.00003 | −0.00079 |
| Total | −0.01655 | 0.02049 | 0.00393 |
| Total | 0.07095 | −0.08781 | −0.01686 |
| Astigmatism AST3 | | | |
| 1 | −0.00010 | 0.00036 | 0.00025 |
| 2 | 0.00005 | 0 | 0.00005 |
| 3 | −0.00020 | 0 | −0.00020 |
| 4 | −0.00038 | 0.00036 | −0.00003 |
| 5 | −0.00038 | 0.00036 | −0.00003 |
| 6 | −0.00020 | 0 | −0.00020 |
| 7 | 0.00005 | 0 | 0.00005 |
| 8 | −0.00010 | 0.00036 | 0.00025 |
| Total | −0.00127 | 0.00142 | 0.00015 |
| Total | 0.00546 | −0.00610 | −0.00064 |

Embodiment 18

| K | Spherical surface term | Aspherical surface term | Total |
|---|---|---|---|
| Spherical aberration SA3 | | | |
| 1 | −0.00057 | 0 | −0.00057 |
| 2 | 0.00034 | 0 | 0.00034 |
| 3 | 0.00507 | 0 | 0.00507 |
| 4 | −0.00498 | 0 | −0.00498 |
| 5 | −0.00498 | 0 | −0.00498 |
| 6 | 0.00507 | 0 | 0.00507 |
| 7 | 0.00034 | 0 | 0.00034 |
| 8 | −0.00057 | 0 | −0.00057 |
| Total | −0.00026 | 0 | −0.00026 |
| Total | 0.00147 | 0 | 0.00147 |
| Astigmatism AST3 | | | |
| 1 | −0.00126 | 0 | −0.00126 |
| 2 | 0.00165 | 0 | 0.00165 |
| 3 | 0.00061 | 0 | 0.00061 |
| 4 | −0.00115 | 0 | −0.00115 |
| 5 | −0.00129 | 0 | −0.00129 |
| 6 | 0.00071 | 0 | 0.00071 |
| 7 | 0.00169 | 0 | 0.00169 |
| 8 | −0.00131 | 0 | −0.00131 |
| Total | −0.00036 | 0 | −0.00036 |
| Total | 0.00202 | 0 | 0.00202 |

Embodiment 19

| K | Spherical surface term | Aspherical surface term | Total |
|---|---|---|---|
| Spherical aberration SA3 | | | |
| 1 | −0.00051 | 0 | −0.00051 |
| 2 | 0.00026 | 0 | 0.00026 |
| 3 | 0.00398 | 0 | 0.00398 |
| 4 | −0.00386 | 0 | −0.00386 |
| 5 | −0.00386 | 0 | −0.00386 |
| 6 | 0.00398 | 0 | 0.00398 |
| 7 | 0.00026 | 0 | 0.00026 |
| 8 | −0.00051 | 0 | −0.00051 |
| Total | −0.00029 | 0 | −0.00029 |
| Total | 0.00159 | 0 | 0.00159 |
| Astigmatism AST3 | | | |
| 1 | −0.00097 | 0 | −0.00097 |
| 2 | 0.00134 | 0 | 0.00134 |
| 3 | 0.00045 | 0 | 0.00045 |
| 4 | −0.00103 | 0 | −0.00103 |
| 5 | −0.00115 | 0 | −0.00115 |

-continued

Embodiment 19

| K | Spherical surface term | Aspherical surface term | Total |
|---|---|---|---|
| 6 | 0.00054 | 0 | 0.00054 |
| 7 | 0.00138 | 0 | 0.00138 |
| 8 | −0.00101 | 0 | −0.00101 |
| Total | −0.00044 | 0 | −0.00044 |
| Total | 0.00242 | 0 | 0.00242 |

Embodiment 20

| K | Spherical surface term | Aspherical surface term | Total |
|---|---|---|---|
| Spherical aberration SA3 | | | |
| 1 | −0.00046 | −0.00001 | −0.00047 |
| 2 | 0.00021 | 0 | 0.00021 |
| 3 | 0.01640 | 0 | 0.01640 |
| 4 | −0.00525 | −0.01066 | −0.01591 |
| 5 | −0.00525 | −0.01066 | −0.01591 |
| 6 | 0.01640 | 0 | 0.01640 |
| 7 | 0.00021 | 0 | 0.00021 |
| 8 | −0.00046 | −0.00001 | −0.00047 |
| Total | 0.02179 | −0.02134 | 0.00045 |
| Total | −0.12161 | 0.11911 | −0.00250 |
| Astigmatism AST3 | | | |
| 1 | −0.00079 | −0.00022 | −0.00101 |
| 2 | 0.00113 | 0 | 0.00113 |
| 3 | 0.00123 | 0 | 0.00123 |
| 4 | −0.00126 | −0.00022 | −0.00148 |
| 5 | −0.00126 | −0.00022 | −0.00148 |
| 6 | 0.00123 | 0 | 0.00123 |
| 7 | 0.00113 | 0 | 0.00113 |
| 8 | −0.00079 | −0.00022 | −0.00101 |
| Total | 0.00062 | −0.00088 | −0.00026 |
| Total | −0.00349 | 0.00491 | 0.00143 |

Embodiment 21

| K | Spherical surface term | Aspherical surface term | Total |
|---|---|---|---|
| Spherical aberration SA3 | | | |
| 1 | −0.00053 | 0 | −0.00053 |
| 2 | 0.00032 | −0.00002 | 0.00031 |
| 3 | 0.02177 | −0.01195 | 0.00982 |
| 4 | −0.00914 | 0 | −0.00914 |
| 5 | −0.00914 | 0 | −0.00914 |
| 6 | 0.02177 | −0.01195 | 0.00982 |
| 7 | 0.00032 | −0.00002 | 0.00031 |
| 8 | −0.00053 | 0 | −0.00053 |
| Total | −0.02486 | −0.02393 | 0.00093 |
| Total | −0.14171 | 0.13642 | −0.00529 |
| Astigmatism AST3 | | | |
| 1 | −0.00120 | 0 | −0.00120 |
| 2 | 0.00166 | −0.00029 | 0.00136 |
| 3 | 0.00176 | −0.00029 | 0.00146 |
| 4 | −0.00166 | 0 | −0.00166 |
| 5 | −0.00166 | 0 | −0.00166 |
| 6 | 0.00176 | −0.00029 | 0.00146 |
| 7 | 0.00166 | −0.00029 | 0.00136 |
| 8 | −0.00120 | 0 | −0.00120 |
| Total | 0.00110 | −0.00118 | −0.00008 |
| Total | −0.00625 | 0.00672 | 0.00047 |

Embodiment 22

| K | Spherical surface term | Aspherical surface term | Total |
|---|---|---|---|
| Spherical aberration SA3 | | | |
| 1 | −0.00740 | 0 | −0.00740 |
| 2 | 0.00417 | 0.00028 | 0.00445 |
| 3 | 0.00507 | 0.00179 | 0.00687 |
| 4 | −0.00396 | 0 | −0.00396 |
| 5 | −0.00396 | 0 | −0.00396 |
| 6 | 0.00507 | 0.00179 | 0.00687 |
| 7 | 0.00417 | 0.00028 | 0.00445 |
| 8 | −0.00740 | 0 | −0.00740 |
| Total | −0.00423 | 0.00414 | −0.00010 |
| Total | 0.01969 | −0.01924 | 0.00044 |
| Astigmatism AST3 | | | |
| 1 | −0.00340 | 0 | −0.00340 |
| 2 | 0.00305 | 0.00045 | 0.00350 |
| 3 | 0.00284 | 0.00045 | 0.00329 |
| 4 | −0.00354 | 0 | −0.00354 |
| 5 | −0.00354 | 0 | −0.00354 |
| 6 | 0.00284 | 0.00045 | 0.00329 |
| 7 | 0.00305 | 0.00045 | 0.00350 |
| 8 | −0.00340 | 0 | −0.00340 |
| Total | −0.00208 | 0.00180 | −0.00028 |
| Total | 0.00967 | −0.00839 | 0.00128 |

Embodiment 23

| K | Spherical surface term | Aspherical surface term | Total |
|---|---|---|---|
| Spherical aberration SA3 | | | |
| 1 | −0.00047 | 0 | −0.00047 |
| 2 | 0.00000 | 0.00002 | 0.00002 |
| 3 | −0.00547 | 0.00628 | 0.00081 |
| 4 | −0.00036 | 0 | −0.00036 |
| 5 | −0.00036 | 0 | −0.00036 |
| 6 | −0.00547 | 0.00628 | 0.00081 |
| 7 | 0.00000 | 0.00002 | 0.00002 |
| 8 | −0.00047 | 0 | −0.00047 |
| Total | −0.01260 | 0.01261 | 0.00001 |
| Total | 0.06321 | −0.06326 | −0.00005 |
| Astigmatism AST3 | | | |
| 1 | −0.00016 | 0 | −0.00016 |
| 2 | 0.00012 | 0.00025 | 0.00037 |
| 3 | 0.00000 | 0.00025 | 0.00025 |
| 4 | −0.00044 | 0 | −0.00044 |
| 5 | −0.00044 | 0 | −0.00044 |
| 6 | 0.00000 | 0.00025 | 0.00025 |
| 7 | 0.00012 | 0.00025 | 0.00037 |
| 8 | −0.00016 | 0 | −0.00016 |
| Total | −0.00095 | 0.00099 | 0.00004 |
| Total | 0.00476 | −0.00495 | −0.00019 |

Embodiment 24

| K | Spherical surface term | Aspherical surface term | Total |
|---|---|---|---|
| Spherical aberration SA3 | | | |
| 1 | −0.00057 | 0 | −0.00057 |
| 2 | −0.01359 | 0.03424 | 0.02064 |
| 3 | 0.00317 | 0 | 0.00317 |
| 4 | 0.00317 | 0 | 0.00317 |
| 5 | −0.01359 | 0.03424 | 0.02064 |
| 6 | −0.00057 | 0 | −0.00057 |
| Total | −0.02200 | 0.06848 | 0.04648 |
| Total | −0.11439 | 0.35609 | 0.24171 |
| Astigmatism AST3 | | | |
| 1 | −0.00010 | 0 | −0.00010 |
| 2 | −0.00555 | 0.00524 | −0.00031 |
| 3 | 0.00100 | 0 | 0.00100 |
| 4 | 0.00097 | 0 | 0.00097 |
| 5 | −0.00541 | 0.00503 | −0.00039 |
| 6 | −0.00009 | 0 | −0.00009 |
| Total | −0.00919 | 0.01027 | 0.00107 |
| Total | −0.04781 | 0.05340 | 0.00559 |

| | Embodiment 25 | | |
|---|---|---|---|
| K | Spherical surface term | Aspherical surface term | Total |
| Spherical aberration SA3 | | | |
| 1 | −0.00053 | 0 | −0.00053 |
| 2 | −0.01416 | 0.02899 | 0.01483 |
| 3 | 0.00569 | 0 | 0.00569 |
| 4 | 0.00569 | 0 | 0.00569 |
| 5 | −0.01416 | 0.02899 | 0.01483 |
| 6 | −0.00053 | 0 | −0.00053 |
| Total | −0.01801 | 0.05797 | 0.03996 |
| Total | −0.09388 | 0.30213 | 0.20825 |
| Astigmatism AST3 | | | |
| 1 | −0.00004 | 0 | −0.00004 |
| 2 | −0.00820 | 0.00712 | −0.00108 |
| 3 | 0.00172 | 0 | 0.00172 |
| 4 | 0.00163 | 0 | 0.00163 |
| 5 | −0.00788 | 0.00669 | −0.00119 |
| 6 | −0.00004 | 0 | −0.00004 |
| Total | −0.01279 | 0.01380 | 0.00101 |
| Total | −0.06668 | 0.07194 | 0.00526 |

| | Embodiment 26 | | |
|---|---|---|---|
| K | Spherical surface term | Aspherical surface term | Total |
| Spherical aberration SA3 | | | |
| 1 | −0.00060 | 0 | −0.00060 |
| 2 | −0.07650 | 0.11811 | 0.04161 |
| 3 | 0.02108 | −0.06184 | −0.04076 |
| 4 | 0.02108 | −0.06184 | −0.04076 |
| 5 | −0.07651 | 0.11811 | 0.04161 |
| 6 | −0.00060 | 0 | −0.00060 |
| Total | −0.11205 | 0.11255 | 0.00050 |
| Total | −0.55137 | 0.55383 | 0.00246 |
| Astigmatism AST3 | | | |
| 1 | −0.00006 | 0 | −0.00006 |
| 2 | −0.03386 | 0.03038 | −0.00348 |
| 3 | 0.00469 | −0.00111 | 0.00358 |
| 4 | 0.00409 | −0.00066 | 0.00344 |
| 5 | −0.03079 | 0.02679 | −0.00400 |
| 6 | −0.00005 | 0 | −0.00005 |
| Total | −0.05598 | 0.05540 | −0.00058 |
| Total | −0.27545 | 0.27262 | −0.00283 |

| | Embodiment 27 | | |
|---|---|---|---|
| K | Spherical surface term | Aspherical surface term | Total |
| Spherical aberration SA3 | | | |
| 1 | −0.00016 | 0 | −0.00016 |
| 2 | −0.05916 | 0.07522 | 0.01606 |
| 3 | 0.00810 | −0.02410 | −0.01601 |
| 4 | 0.00810 | −0.02411 | −0.01601 |
| 5 | −0.05916 | 0.07522 | 0.01606 |
| 6 | −0.00016 | 0 | −0.00016 |
| Total | −0.10245 | 0.10222 | −0.00023 |
| Total | −0.52921 | 0.52803 | 0.00118 |
| Astigmatism AST3 | | | |
| 1 | −0.00015 | 0 | −0.00015 |
| 2 | −0.06059 | 0.05731 | −0.00328 |
| 3 | 0.00349 | −0.00106 | 0.00243 |
| 4 | 0.00247 | −0.00026 | 0.00220 |
| 5 | −0.04871 | 0.04440 | −0.00431 |
| 6 | −0.00018 | 0 | −0.00018 |
| Total | −0.10367 | 0.10038 | −0.00328 |
| Total | −0.53550 | 0.51855 | −0.01696 |

| | Embodiment 28 | | |
|---|---|---|---|
| K | Spherical surface term | Aspherical surface term | Total |
| Spherical aberration SA3 | | | |
| 1 | −0.00067 | 0 | −0.00067 |
| 2 | −0.09362 | 0.14931 | 0.05569 |
| 3 | 0.02999 | −0.08421 | −0.05422 |
| 4 | 0.02999 | −0.08421 | −0.05422 |
| 5 | −0.09362 | 0.14931 | 0.05569 |
| 6 | −0.00067 | 0 | −0.00067 |
| Total | −0.12859 | 0.13019 | 0.00160 |
| Total | −0.63219 | 0.64006 | 0.00786 |
| Astigmatism AST3 | | | |
| 1 | −0.00009 | 0 | −0.00009 |
| 2 | −0.02307 | 0.02026 | −0.00281 |
| 3 | 0.00381 | −0.00089 | 0.00291 |
| 4 | 0.00351 | −0.00066 | 0.00285 |
| 5 | −0.02175 | 0.01871 | −0.00304 |
| 6 | −0.00008 | 0 | −0.00008 |
| Total | −0.03767 | 0.03741 | −0.00026 |
| Total | −0.18521 | 0.18392 | −0.00129 |

| | Embodiment 29 | | |
|---|---|---|---|
| K | Spherical surface term | Aspherical surface term | Total |
| Spherical aberration SA3 | | | |
| 1 | −0.00073 | 0 | −0.00073 |
| 2 | −0.17646 | 0.28163 | 0.10516 |
| 3 | 0.07370 | −0.17497 | −0.10127 |
| 4 | 0.07370 | −0.17497 | −0.10127 |
| 5 | −0.17646 | 0.28162 | 0.10516 |
| 6 | −0.00073 | 0 | −0.00073 |
| Total | −0.20699 | 0.21331 | 0.00632 |
| Total | −1.02552 | 1.05685 | 0.03133 |
| Astigmatism AST3 | | | |
| 1 | −0.00015 | 0 | −0.00015 |
| 2 | −0.02561 | 0.02164 | −0.00397 |
| 3 | 0.00568 | −0.00157 | 0.00411 |
| 4 | 0.00529 | −0.00127 | 0.00402 |
| 5 | −0.02432 | 0.02015 | −0.00417 |
| 6 | −0.00015 | 0 | −0.00015 |
| Total | −0.03926 | 0.03896 | −0.00031 |
| Total | −0.19453 | 0.19302 | −0.00151 |

| | Embodiment 30 | | |
|---|---|---|---|
| K | Spherical surface term | Aspherical surface term | Total |
| Spherical aberration SA3 | | | |
| 1 | −0.00071 | 0 | −0.00071 |
| 2 | −0.05661 | 0.09435 | 0.03774 |
| 3 | 0.01712 | −0.05378 | −0.03666 |
| 4 | 0.01712 | −0.05378 | −0.03666 |
| 5 | −0.05662 | 0.09435 | 0.03774 |
| 6 | −0.00071 | 0 | −0.00071 |
| Total | −0.08042 | 0.08114 | 0.00072 |
| Total | −0.38313 | 0.38655 | 0.00342 |
| Astigmatism AST3 | | | |
| 1 | −0.00007 | 0 | −0.00007 |
| 2 | −0.02579 | 0.02285 | −0.00294 |
| 3 | 0.00405 | −0.00083 | 0.00322 |
| 4 | 0.00363 | −0.00052 | 0.00311 |
| 5 | −0.02387 | 0.02053 | −0.00334 |
| 6 | −0.00006 | 0 | −0.00006 |
| Total | −0.04212 | 0.04203 | −0.00009 |
| Total | −0.20065 | 0.20024 | −0.00041 |

| Embodiment 31 | | | |
|---|---|---|---|
| K | Spherical surface term | Aspherical surface term | Total |
| Spherical aberration SA3 | | | |
| 1 | −0.00081 | 0 | −0.00081 |
| 2 | −0.37631 | 0.62995 | 0.25364 |
| 3 | 0.20880 | −0.44363 | −0.23483 |
| 4 | 0.20880 | −0.44363 | −0.23483 |
| 5 | −0.37633 | 0.62997 | 0.25364 |
| 6 | −0.00081 | 0 | −0.00081 |
| Total | −0.33667 | 0.37267 | 0.03600 |
| Total | −1.67256 | 1.85139 | 0.17883 |
| Astigmatism AST3 | | | |
| 1 | −0.00024 | 0 | −0.00024 |
| 2 | −0.02485 | 0.01952 | −0.00533 |
| 3 | 0.00819 | −0.00263 | 0.00556 |
| 4 | 0.00779 | −0.00230 | 0.00549 |
| 5 | −0.02390 | 0.01843 | −0.00547 |
| 6 | −0.00024 | 0 | −0.00024 |
| Total | −0.03325 | 0.03303 | −0.00022 |
| Total | −0.16518 | 0.16407 | −0.00111 |

| Embodiment 32 | | | |
|---|---|---|---|
| K | Spherical surface term | Aspherical surface term | Total |
| Spherical aberration SA3 | | | |
| 1 | −0.00066 | 0 | −0.00066 |
| 2 | −0.06799 | 0.10635 | 0.03835 |
| 3 | 0.02101 | −0.05842 | −0.03740 |
| 4 | 0.02102 | −0.05842 | −0.03740 |
| 5 | −0.06800 | 0.10635 | 0.03836 |
| 6 | −0.00066 | 0 | −0.00066 |
| Total | −0.09528 | 0.09586 | 0.00059 |
| Total | −0.45869 | 0.46152 | 0.00283 |
| Astigmatism AST3 | | | |
| 1 | −0.00005 | 0 | −0.00005 |
| 2 | −0.03241 | 0.02873 | −0.00368 |
| 3 | 0.00491 | −0.00110 | 0.00380 |
| 4 | 0.00428 | −0.00065 | 0.00363 |
| 5 | −0.02947 | 0.02529 | −0.00418 |
| 6 | −0.00004 | 0 | −0.00004 |
| Total | −0.05279 | 0.05226 | −0.00052 |
| Total | −0.25413 | 0.25162 | −0.00251 |

| Embodiment 33 | | | |
|---|---|---|---|
| K | Spherical surface term | Aspherical surface term | Total |
| Spherical aberration SA3 | | | |
| 1 | −0.00055 | 0 | −0.00055 |
| 2 | −0.08618 | 0.13171 | 0.04553 |
| 3 | 0.02114 | −0.06569 | −0.04455 |
| 4 | 0.02114 | −0.06569 | −0.04455 |
| 5 | −0.08618 | 0.13171 | 0.04553 |
| 6 | −0.00055 | 0 | −0.00055 |
| Total | −0.13119 | 0.13205 | 0.00086 |
| Total | −0.65824 | 0.66254 | 0.00430 |
| Astigmatism AST3 | | | |
| 1 | −0.00005 | 0 | −0.00005 |
| 2 | −0.02616 | 0.02373 | −0.00243 |
| 3 | 0.00329 | −0.00079 | 0.00250 |
| 4 | 0.00298 | −0.00054 | 0.00244 |
| 5 | −0.02439 | 0.02166 | −0.00273 |
| 6 | −0.00005 | 0 | −0.00005 |
| Total | −0.04438 | 0.04406 | −0.00032 |
| Total | −0.22269 | 0.22108 | −0.00161 |

| Embodiment 34 | | | |
|---|---|---|---|
| K | Spherical surface term | Aspherical surface term | Total |
| Spherical aberration SA3 | | | |
| 1 | −0.00064 | 0 | −0.00064 |
| 2 | −0.07097 | 0.11586 | 0.04490 |
| 3 | 0.01084 | −0.05473 | −0.04389 |
| 4 | 0.00020 | 0 | 0.00020 |
| 5 | 0.00020 | 0 | 0.00020 |
| 6 | 0.01084 | −0.05473 | −0.04389 |
| 7 | −0.07097 | 0.11586 | 0.04490 |
| 8 | −0.00064 | 0 | −0.00064 |
| Total | −0.12114 | 0.12227 | 0.00113 |
| Total | −0.59169 | 0.59723 | 0.00553 |
| Astigmatism AST3 | | | |
| 1 | −0.00006 | 0 | −0.00006 |
| 2 | −0.02231 | 0.02044 | −0.00187 |
| 3 | 0.00260 | −0.00058 | 0.00202 |
| 4 | 0.00008 | 0 | 0.00008 |
| 5 | 0.00009 | 0 | 0.00009 |
| 6 | 0.00242 | −0.00040 | 0.00202 |
| 7 | −0.02098 | 0.01882 | −0.00216 |
| 8 | −0.00005 | 0 | −0.00005 |
| Total | −0.03821 | 0.03829 | 0.00008 |
| Total | −0.18664 | 0.18702 | 0.00038 |

| Embodiment 35 | | | |
|---|---|---|---|
| K | Spherical surface term | Aspherical surface term | Total |
| Spherical aberration SA3 | | | |
| 1 | −0.00064 | 0 | −0.00064 |
| 2 | −0.07094 | 0.12014 | 0.04920 |
| 3 | 0.01083 | 0.05861 | −0.04778 |
| 4 | 0.00020 | 0 | 0.00020 |
| 5 | 0.00020 | 0 | 0.00020 |
| 6 | 0.01083 | −0.05861 | −0.04778 |
| 7 | −0.07094 | 0.12014 | 0.04920 |
| 8 | −0.00064 | 0 | −0.00064 |
| Total | −0.12110 | 0.12307 | 0.00197 |
| Total | −0.59142 | 0.60103 | 0.00961 |
| Astigmatism AST3 | | | |
| 1 | −0.00006 | 0 | −0.00006 |
| 2 | −0.02226 | 0.02114 | −0.00112 |
| 3 | 0.00259 | −0.00061 | 0.00198 |
| 4 | 0.00008 | 0 | 0.00008 |
| 5 | 0.00009 | 0 | 0.00009 |
| 6 | 0.00242 | −0.00043 | 0.00199 |
| 7 | −0.02100 | 0.01955 | −0.00145 |
| 8 | −0.00005 | 0 | −0.00005 |
| Total | −0.03819 | 0.03965 | 0.00147 |
| Total | −0.18650 | 0.19366 | 0.00716 |

| Embodiment 36 | | | |
|---|---|---|---|
| K | Spherical surface term | Aspherical surface term | Total |
| Spherical aberration SA3 | | | |
| 1 | −0.00092 | 0 | −0.00092 |
| 2 | −0.16964 | 0.30531 | 0.13567 |
| 3 | 0.06917 | −0.20554 | −0.13637 |
| 4 | 0.00510 | 0 | 0.00510 |
| 5 | 0.06662 | −0.19502 | −0.12840 |
| 6 | −0.16964 | 0.30531 | 0.13567 |
| 7 | −0.00092 | 0 | −0.00092 |
| Total | −0.20023 | 0.21007 | 0.00984 |
| Total | −0.95963 | 1.00680 | 0.04718 |
| Astigmatism AST3 | | | |
| 1 | −0.00020 | 0 | −0.00020 |
| 2 | −0.01957 | 0.01601 | −0.00355 |
| 3 | 0.00514 | −0.00136 | 0.00378 |
| 4 | 0.00006 | 0 | 0.00006 |
| 5 | 0.00485 | −0.00110 | 0.00376 |

-continued

Embodiment 36

| K | Spherical surface term | Aspherical surface term | Total |
|---|---|---|---|
| 6 | −0.01885 | 0.01515 | −0.00370 |
| 7 | −0.00019 | 0 | −0.00019 |
| Total | −0.02876 | 0.02871 | −0.00006 |
| Total | −0.13786 | 0.13758 | −0.00028 |

Embodiment 37

| K | Spherical surface term | Aspherical surface term | Total |
|---|---|---|---|
| Spherical aberration SA3 | | | |
| 1 | −0.00092 | 0 | −0.00092 |
| 2 | −0.16964 | 0.30531 | 0.13567 |
| 3 | 0.06662 | −0.19502 | −0.12840 |
| 4 | 0.00510 | 0 | 0.00510 |
| 5 | 0.06917 | −0.20554 | −0.13637 |
| 6 | −0.16964 | 0.30531 | 0.13567 |
| 7 | −0.00092 | 0 | −0.00092 |
| Total | −0.20023 | 0.21006 | 0.00984 |
| Total | −0.95963 | 1.00678 | 0.04715 |
| Astigmatism AST3 | | | |
| 1 | −0.00020 | 0 | −0.00020 |
| 2 | −0.01957 | 0.01601 | −0.00355 |
| 3 | 0.00508 | −0.00129 | 0.00379 |
| 4 | 0.00005 | 0 | 0.00005 |
| 5 | 0.00490 | −0.00116 | 0.00375 |
| 6 | −0.01885 | 0.01515 | −0.00370 |
| 7 | −0.00019 | 0 | −0.00019 |
| Total | −0.02878 | 0.02872 | −0.00006 |
| Total | −0.13792 | 0.13763 | −0.00029 |

Embodiment 38

| K | Spherical surface term | Aspherical surface term | Total |
|---|---|---|---|
| Spherical aberration SA3 | | | |
| 1 | −0.00069 | 0 | −0.00069 |
| 2 | 0.00030 | 0 | 0.00030 |
| 3 | −0.06209 | 0.09977 | 0.03768 |
| 4 | 0.01894 | −0.05593 | −0.03700 |
| 5 | 0.01894 | −0.05593 | −0.03700 |
| 6 | −0.06209 | 0.09977 | 0.03768 |
| 7 | 0.00030 | 0 | 0.00030 |
| 8 | −0.00069 | 0 | −0.00069 |
| Total | −0.08709 | 0.08768 | 0.00059 |
| Total | −0.41652 | 0.41934 | 0.00283 |
| Astigmatism AST3 | | | |
| 1 | −0.00005 | 0 | −0.00005 |
| 2 | 0.00009 | 0 | 0.00009 |
| 3 | −0.02124 | 0.01865 | −0.00259 |
| 4 | 0.00325 | −0.00067 | 0.00259 |
| 5 | 0.00298 | −0.00046 | 0.00251 |
| 6 | −0.01995 | 0.01713 | −0.00282 |
| 7 | 0.00009 | 0 | 0.00009 |
| 8 | −0.00004 | 0 | −0.00004 |
| Total | −0.03487 | 0.03465 | −0.00021 |
| Total | −0.16675 | 0.16573 | −0.00103 | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $\nu_1, \nu_2, \ldots$ represent Abbe's numbers of the respective lens elements.

Figure 7:
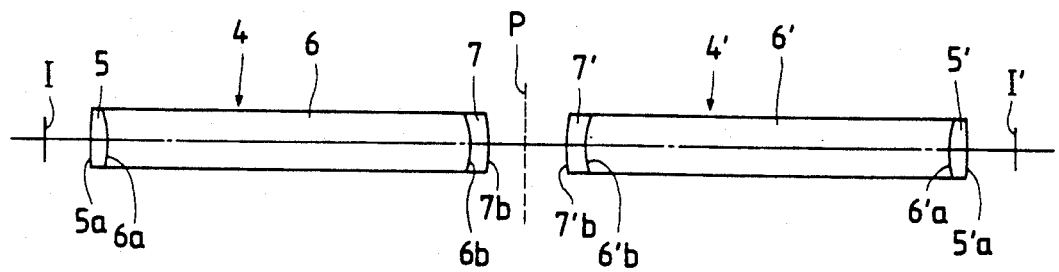
FIG. 7 through FIG. 11 show sectional views illustrating compositions of Embodiments 1 through 5 of the image transmission optical system according to the present invention.

The Embodiment 1 of the present invention has the composition illustrated in FIG. 7 wherein the relay lens unit consists of a bar-shaped cemented lens component 4 which comprises, in the order from the image I located on the object side through the pupil position P toward the image I' located on the observation side, a biconcave lens element 5, a bar-shaped lens element 6 and a meniscus lens element 7, and of a lens component 4' which is the same as the bar-shaped cemented lens component 4 arranged symmetrically with the lens component 4, and comprises lens elements 7', 6' and 5'.

In the Embodiment 1, the bar-shaped lens elements 6 and 6' are made of a material having a relatively low refractive index, whereas the lens elements 5 and 7 cemented to both the end surfaces of the bar-shaped lens element 6 as well as the lens elements 5' and 7' cemented to both the end surfaces of the lens element 6' are made of materials having relatively high refractive indices. Accordingly, it is relatively easy to vary refractive powers of the non-cemented surface 5a and the cemented surface 6a of the lens component 4 by adjusting bending of these surfaces as described above without changing total refractive power of the non-cemented surface 5a and the cemented surface 6a. It is possible to perform the similar adjustment of bending for each of three pairs of the cemented surface 6b-non-cemented surface 7b, the cemented surface 6'b-non-cemented surface 7'b, and the cemented surface 6'a-non-cemented surface 5'a.

Further, since the bar-shaped lens component has two cemented surfaces and two non-cemented surfaces, both astigmatic difference and spherical aberration can be corrected at the same time by correcting one type of aberration with a pair of the cemented surface and non-cemented surface, and by correcting the other type of aberration with the other pair of the cemented surface and the non-cemented surface.

Furthermore, since the bar-shaped lens element has a relatively low refractive index, it is easy to select a material which has high transmittance and low degree of coloring for the bar-shaped lens element so that an image will not be darkened or colors will not be out of good balance even when the image transmission optical system is to transmit an image for a plurality of relaying distances through a plurality of relay lens units.

Aberration characteristics of the Embodiment 1 are illustrated in FIG. 25.

Figure 8:
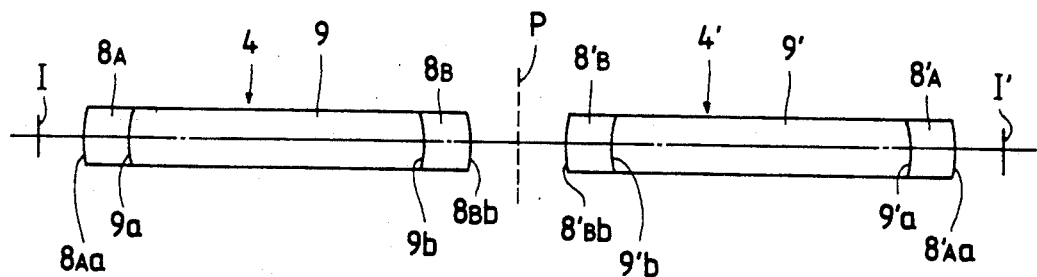

The Embodiment 2 has the composition shown in FIG. 8 wherein a bar-shaped cemented lens component 4 which consists, in the order form the image I located on the object side through the pupil position P toward the image I' located on the observation side, of a meniscus lens element 8A having negative refractive power, a bar-shaped lens element 9 and a negative meniscus lens element 8B, and a bar-shaped cemented lens component 4', which has the same composition as that of the lens component 4, arranged symmetrically with regard to the pupil position P. Each of these lens components has a composition which is symmetrical with regard to a plane passing through the center of the lens component and is perpendicular to the optical axis. Accordingly, the image transmission optical system preferred as the Embodiment 2 can be composed only of two types of lens elements, i.e., the bar-shaped lens elements and the negative meniscus lens elements, and permits enhancing productivity or reducing manufacturing cost.

Aberration characteristics of the Embodiment 2 are illustrated in FIG. 26.

Figure 9:
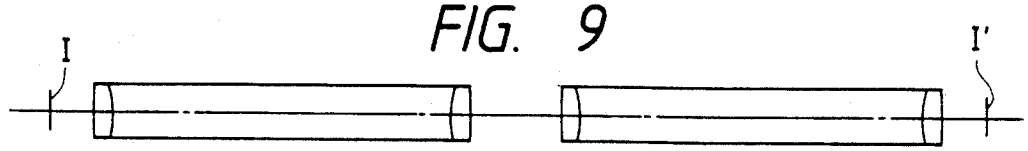

The Embodiment 3 has the composition shown in FIG. 9 wherein a relay lens unit consists of two bar-shaped cemented lens components each of which is symmetrical with regard to the center thereof as in the Embodiment 2. Accordingly, the Embodiment 3 has the merit similar to that of the Embodiment 2.

Aberration characteristics of the Embodiment 3 are visualized in FIG. 27.

Figure 10:
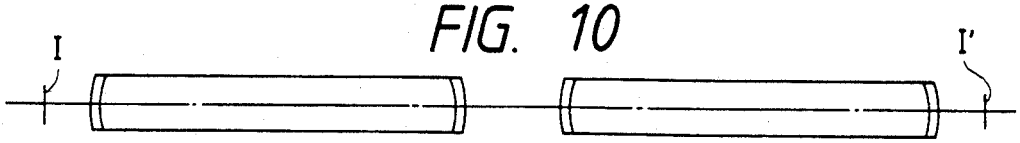

The Embodiment 4 has the composition shown in FIG. 10 wherein a relay lens unit is composed by arranging, symmetrically with regard to the pupil position P, two lens components each of which is asymmetrical with the center thereof as in the Embodiment 1. In the Embodiment 1, the fourth surface and the fifth surface are designed as aspherical surfaces.

The optical system preferred as the Embodiment 4 has a negative total sum of the spherical aberration coefficients and a negative total sum of the astigmatism coefficients. For this reason, aberrations are corrected more favorably by designing the above-mentioned surface (the fourth surface) as an aspherical surface having portions whose curvature is progressively lowered as the portions are farther from the optical axis toward the marginal portion.

Aberration characteristics of the Embodiment 5 are visualized in FIG. 28.

Figure 11:
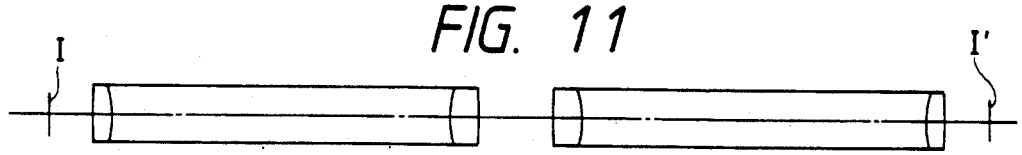

The Embodiment 5 of the present invention has the composition illustrated in FIG. 11 wherein the fourth surface and the fifth surface are designed as aspherical surfaces as in the Embodiment 4 for obtaining the effect which is same as that available by the Embodiment 4.

Aberration characteristics of the Embodiment 5 are visualized in FIG. 29.

The Embodiment 6 has the composition which is essentially similar to that of the Embodiment 1. In contrast to the Embodiment 1 in which all the lens surfaces are designed as spherical surfaces, however, the Embodiment 6 comprises the fourth surface and the fifth surface which are designed as aspherical surfaces having portions whose curvature is progressively enhanced as the portions are farther from the optical axis toward the marginal portion. Owing to these aspherical surfaces, the Embodiment 6 is capable of favorably correcting the positive aberrations which are produced due to the positive total sum of the spherical aberration coefficients and the positive total sum of the astigmatism coefficients.

Aberration characteristics of the Embodiment 6 are illustrated in FIG. 30.

Figure 12:
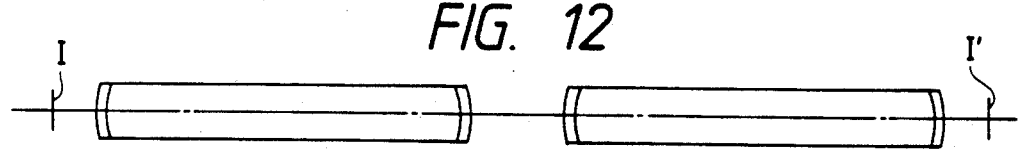
FIG. 12 shows a sectional view illustrating composition of Embodiment 7.
Figure 13:
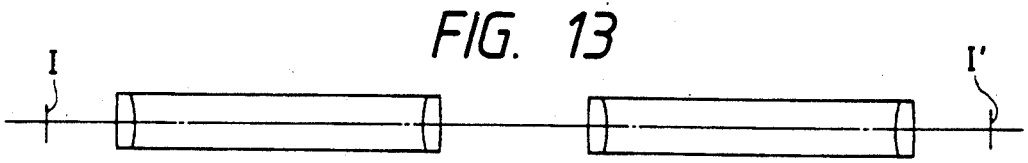
FIG. 13 through FIG. 18 show sectional views illustrating compositions of Embodiments 12 through 17 of the image transmission optical system according to the present invention.
Figure 14:
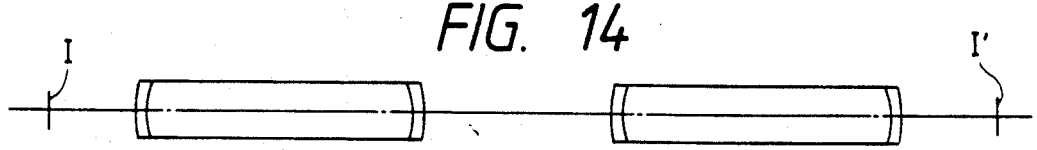
Figure 15:
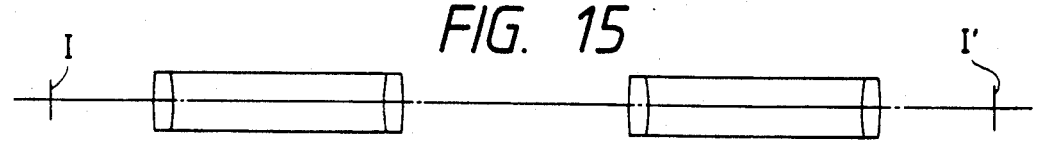
Figure 16:
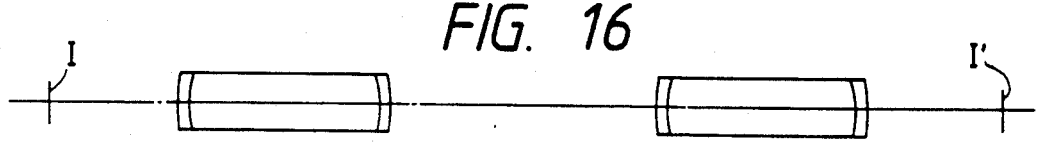
Figure 17:
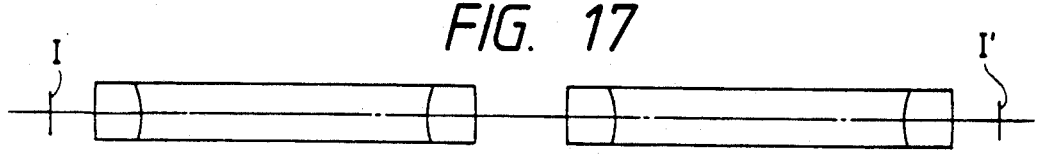
Figure 18:
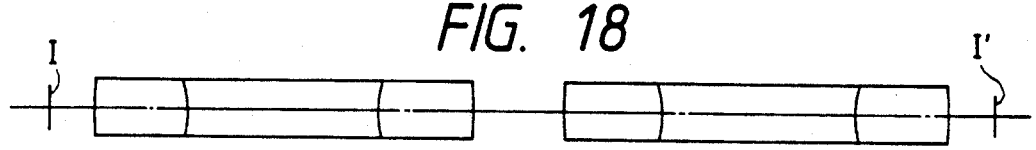

The Embodiment 7 has the composition shown in FIG. 12 wherein a relay lens unit is composed of two bar-shaped cemented lens components each of which is symmetrical with regard to the center thereof as in the Embodiment 2. In this embodiment, the first surface, fourth surface, fifth surface and eighth surface are designed as aspherical surfaces having portions whose curvature is progressively enhanced as the portions are farther from the optical axis toward the marginal portions. The Embodiment 7 has, like the Embodiment 2, the advantages to facilitate lens shaping, simplify lens assembly and enhance productivity as well as the merit of the Embodiment 6 to correct aberrations more favorably.

Figure 31:
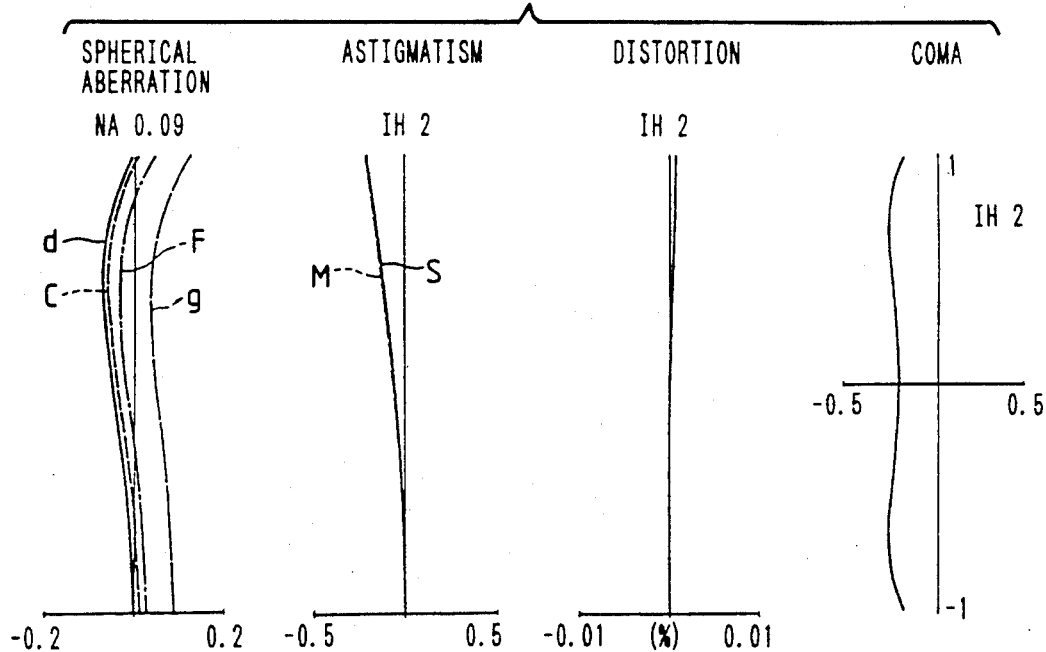

Aberration characteristics of the Embodiment 7 are visualized in FIG. 31.

The Embodiment 8 has a composition almost similar to that of the Embodiment 7 and the same advantages as those of the Embodiment 7.

Figure 32:
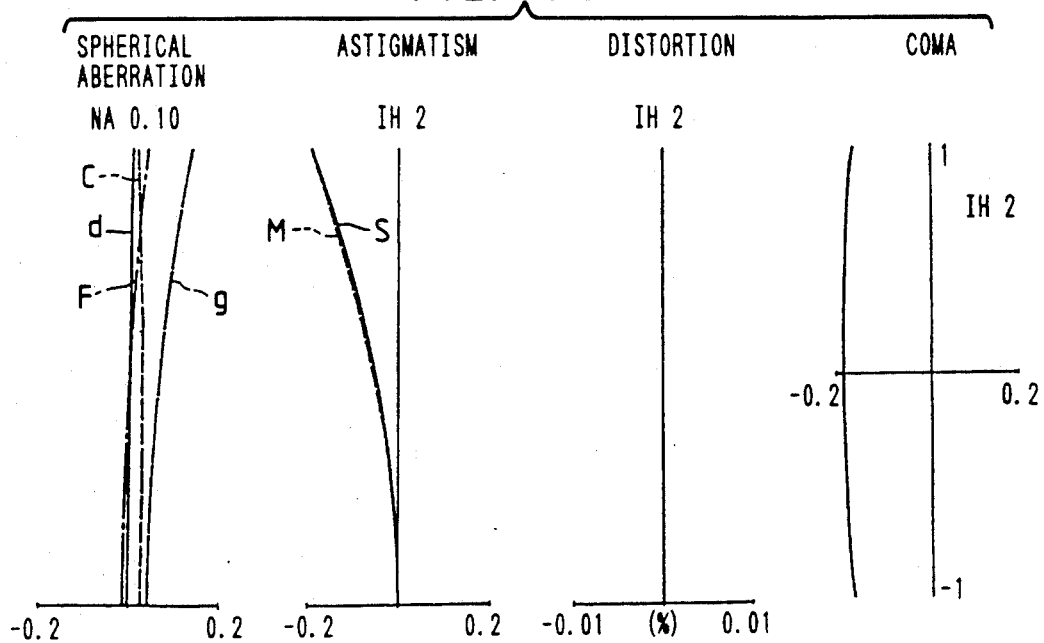
Figure 37:
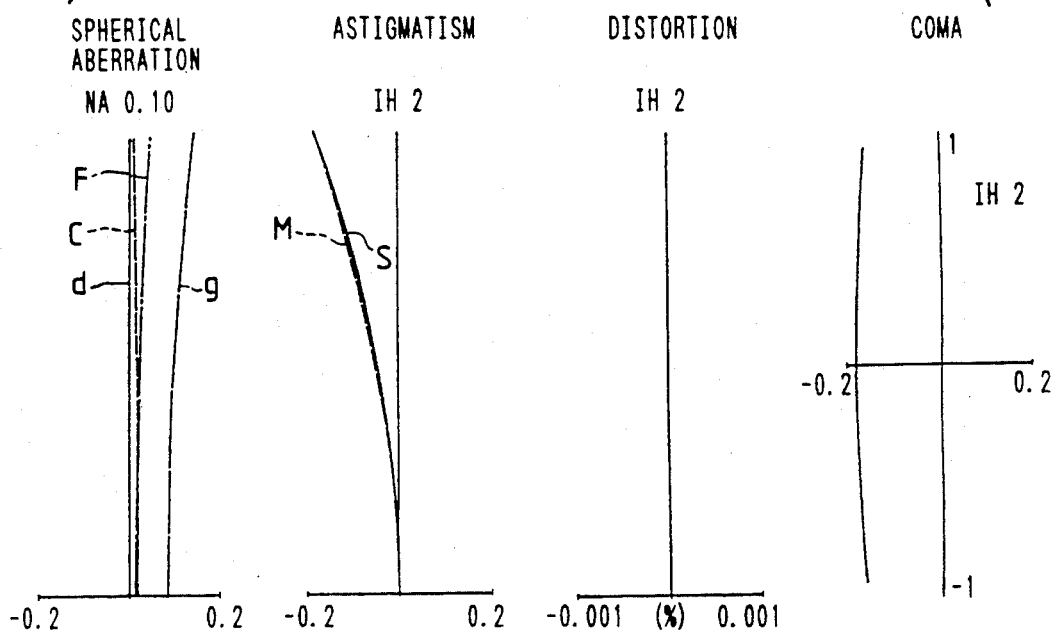
Figure 38:
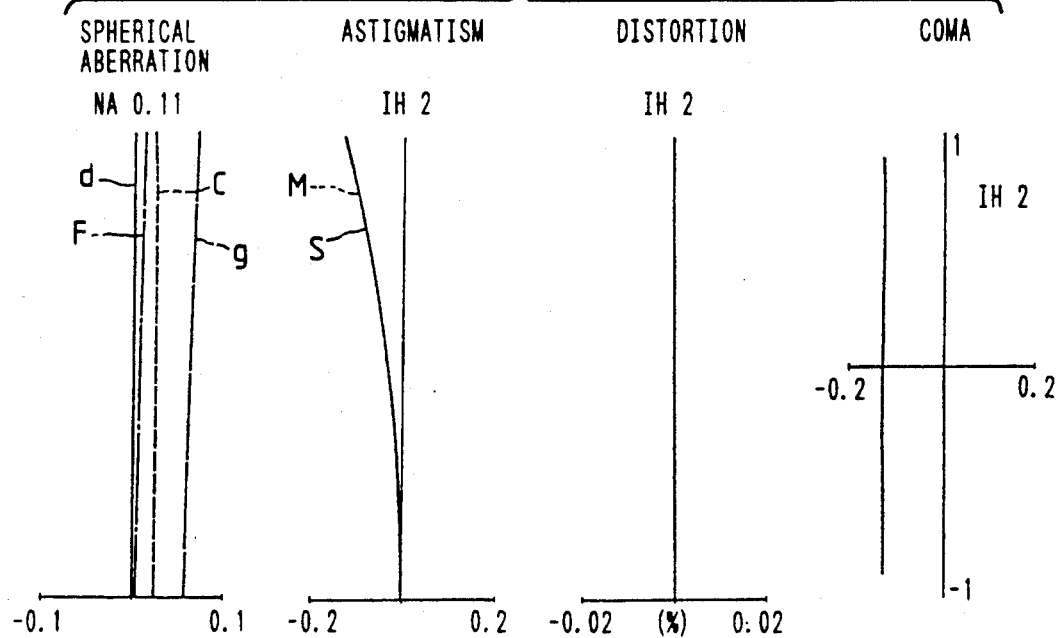
Figure 39:
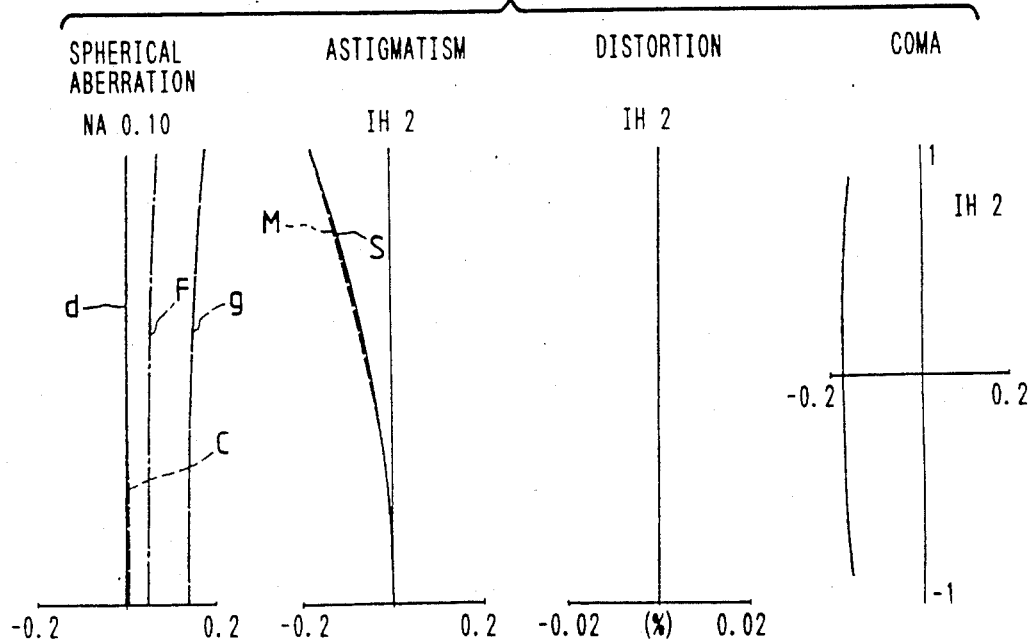
Figure 40:
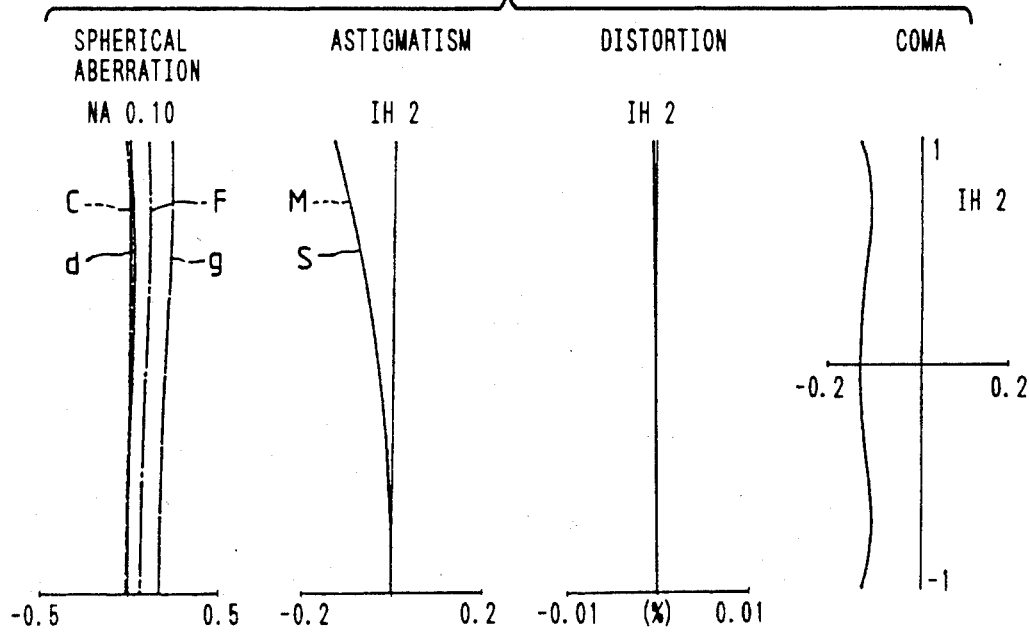
Figure 41:
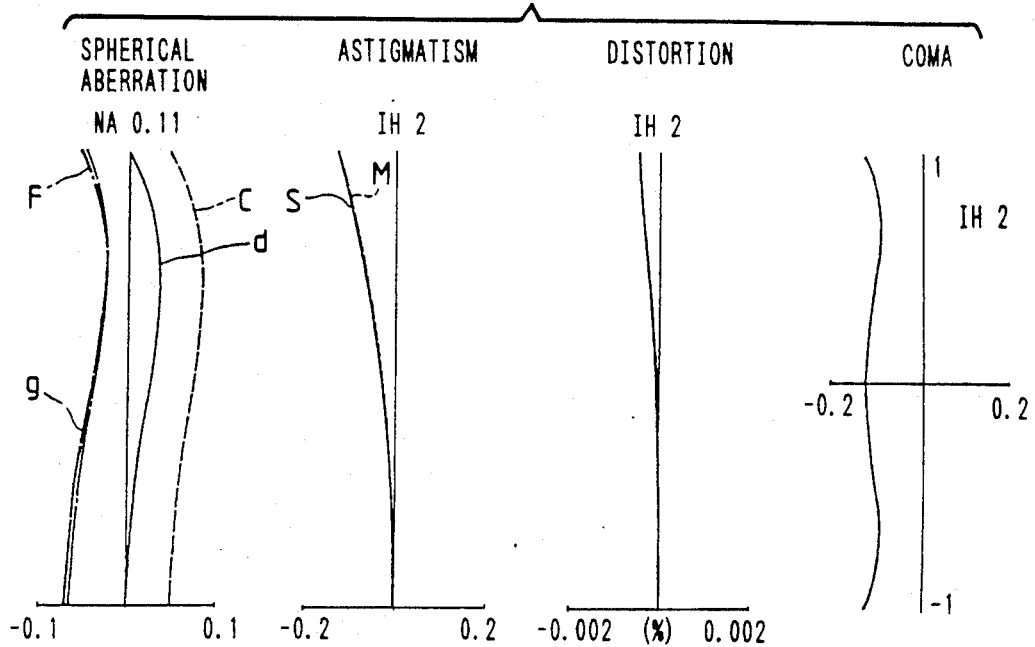

Aberration characteristics of the Embodiment 8 are illustrated in FIG. 32.

The Embodiments 9 through 11 have compositions each of which is essentially similar to that of the Embodiment 3. In contrast to the Embodiment 3 in which all the lens surfaces are designed as the spherical surfaces, each of the Embodiments 9 through 11 comprises the first surface, fourth surface, fifth surface and eighth surface which are designed as aspherical surface serving for correcting aberrations more favorably. Further, the Embodiments 9 through 11 are designed for simultaneously transmitting an image and a pupil and correcting aberrations of pupil at the same time.

Aberration characteristics of the Embodiments 9 through 11 are shown in FIG. 33 through FIG. 35 respectively.

The Embodiment 12 through 17 have the compositions illustrated in FIG. 13 through FIG. 18 respectively, and have the same merits as those of the Embodiment 9.

Aberration characteristics of the Embodiment 12 through 17 are visualized in FIG. 36 through FIG. 41 respectively.

Each of the Embodiments 18 and 19 has a composition quite similar to that of the Embodiment 4, but comprises no aspherical surface unlike the Embodiment 4 and has aberrations corrected as favorably as those in the Embodiment 4.

Figure 42:
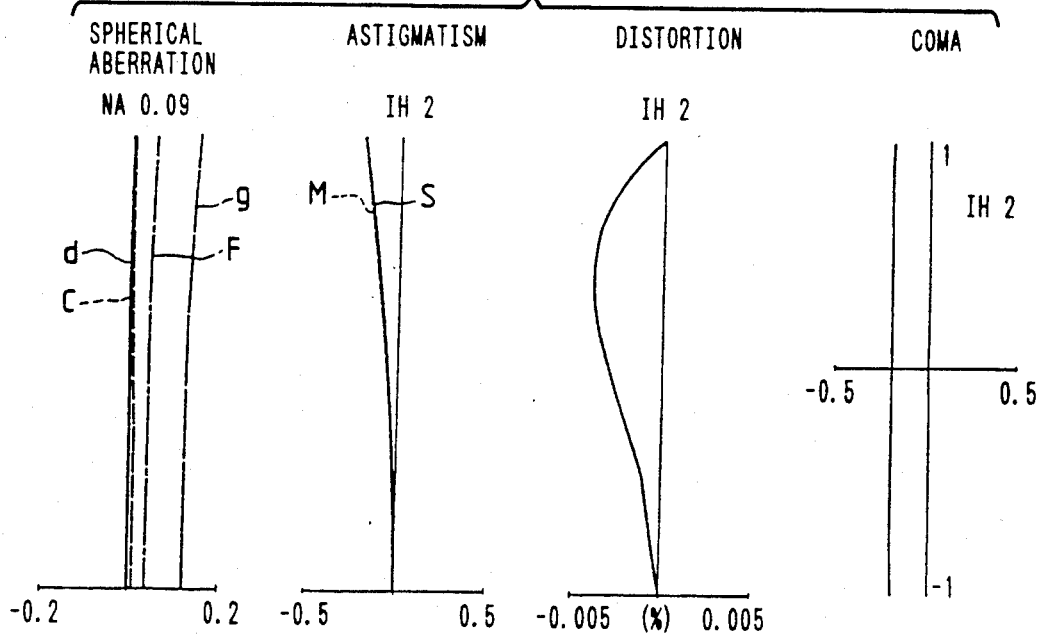

Aberration characteristics of the Embodiments 18 and 19 are illustrated in FIG. 42 and FIG. 43 respectively.

The Embodiment 20 has a composition which is essentially the same as that of the Embodiment 7 and has merits which are nearly the same as those of the Embodiment 7.

Aberration characteristics of the Embodiment 20 are visualized in FIG. 44.

The Embodiment 21 has a composition which is essentially the same as that of the Embodiment 7. However, in contrast to the Embodiment 7 which uses aspherical surfaces as the first surface, third surface, fourth surface and eighth surface having positive refractive powers, the Embodiment 21 adopts aspherical surfaces as the second surface, third surface, sixth surface and eighth surface having negative refractive powers.

The Embodiment 21 favorably corrects the aberrations which are produced when both the total sum of the spherical aberration coefficients and the total sum of the astigmatism coefficients have positive values by adopting the aspherical surfaces having portions whose curvature is progressively lowered as the portions are farther from the optical axis toward the marginal portions, and has the merits similar to those of the Embodiment 7.

Aberration characteristics of the Embodiment 21 are illustrated in FIG. 45.

The Embodiment 22 has a composition which is essentially the same as that of the Embodiment 15 but adopts aspherical surfaces unlike the Embodiment 15.

The Embodiment 22 favorably corrects the aberrations produced when both the total sum of the spherical surface coefficients and the total sum of the astigmatism coefficients have negative values by using the aspherical surfaces having portions whose curvature is progressively enhanced as the portions are farther from the optical axis toward the marginal portions, and the merits similar to those of the Embodiment 7.

Aberration characteristics of the Embodiment 22 are illustrated in FIG. 46.

The Embodiment 23 has a composition which is essentially the same as that of the Embodiment 3. In contrast to the Embodiment 3 in which all the lens surfaces are designed as the spherical surfaces, the Embodiment 23 adopts aspherical surfaces as the second surface, third surface, sixth surface and seventh surface for correcting aberrations favorably and obtaining the same merits as those of the Embodiment 3.

Figure 47:
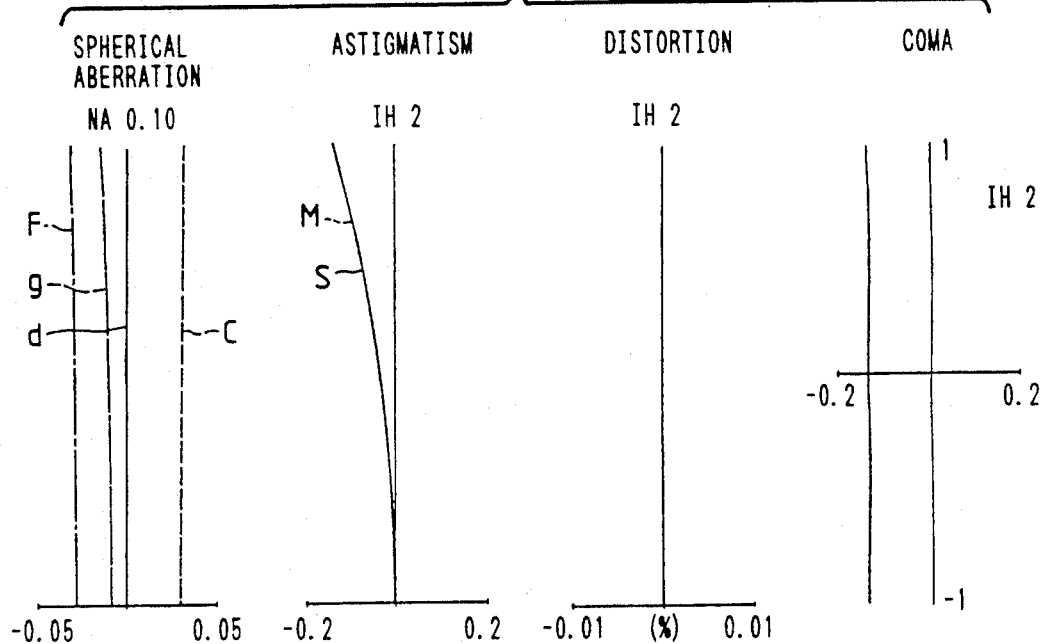

Aberration characteristics of the Embodiment 23 are illustrated in FIG. 47.

Figure 19:
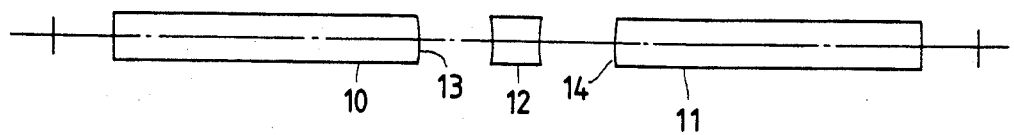
FIG. 19 shows a sectional view illustrating composition of Embodiments 24 and 25 of the image transmission optical system according to the present invention.

Each of the Embodiments 24 and 25 has the composition shown in FIG. 19. Speaking concretely, a relay lens unit consists of a pair of bar-shaped lens components 10 and 11, and a biconcave lens component 12 arranged therebetween, and aspherical surfaces are used as the surfaces 13 and 14 of the biconcave lens component 12 which are located on the sides opposite to the images I and I' respectively for favorably correcting curvature of field, spherical aberration and astigmatic difference in each of the Embodiments 24 and 25. In order to obtain symmetry of coma and favorably correcting lateral charomatic aberration, the lens unit is designed symmetrically with regard to the center line P of the biconcave lens component 12 in each of the Embodiments 24 and 25.

Figure 48:
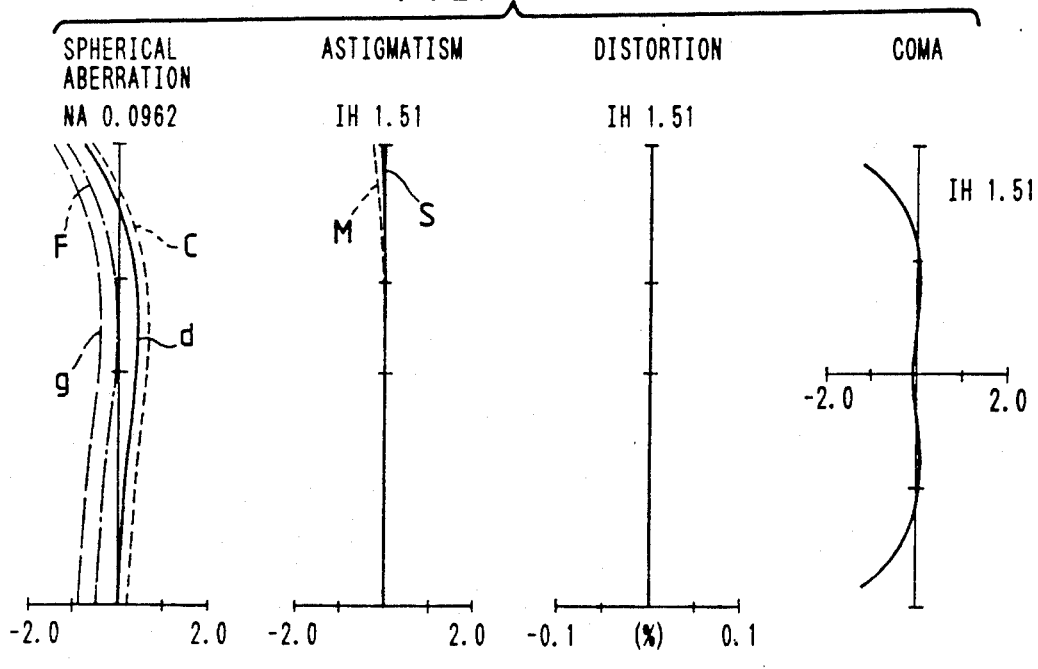
Figure 49:
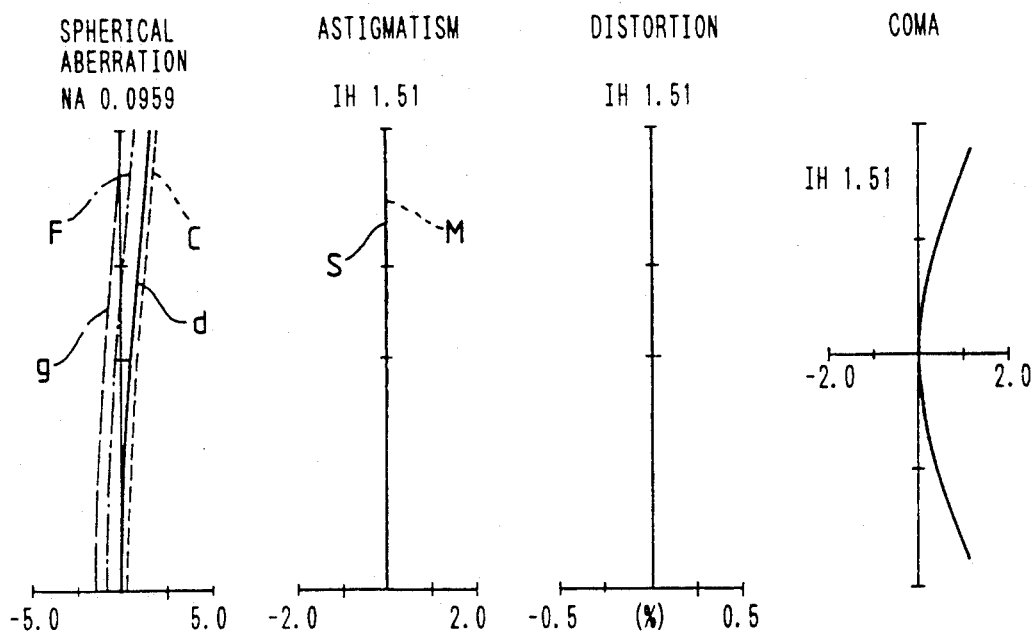
Figure 50:
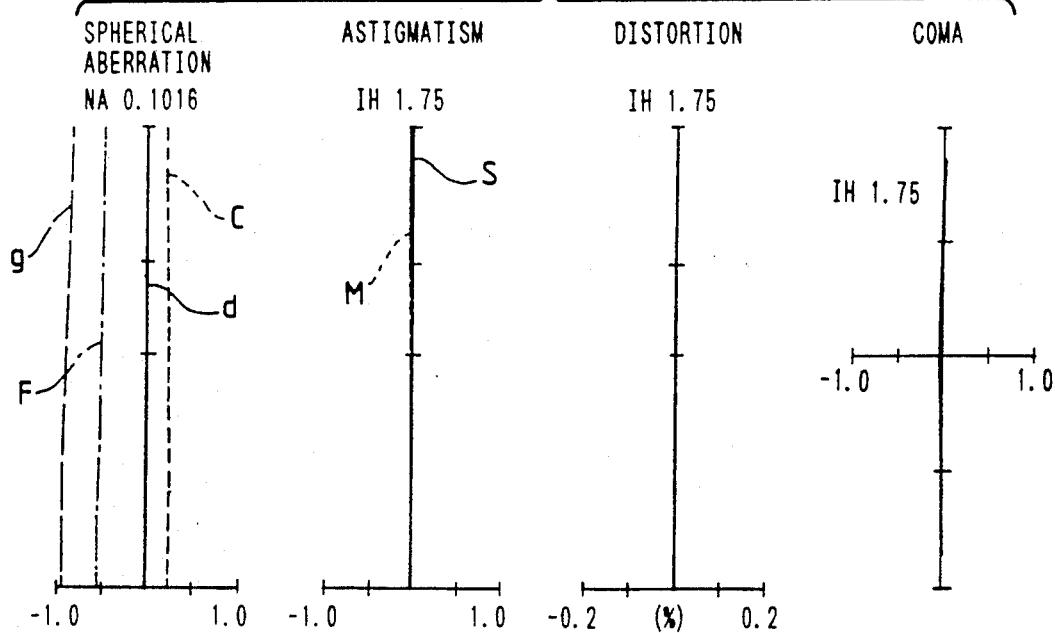
Figure 51:
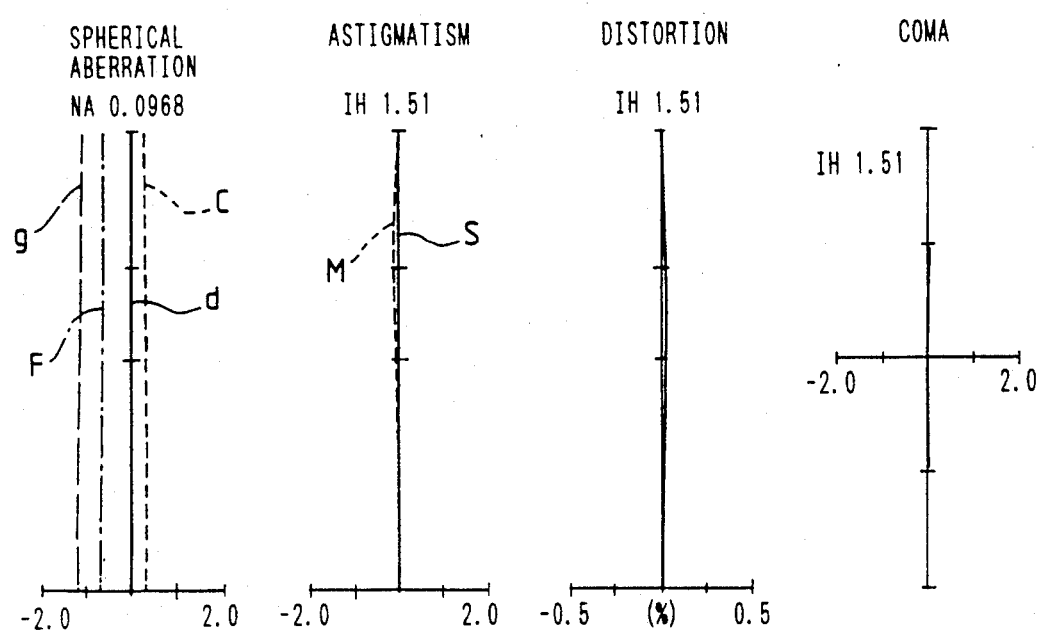
Figure 52:
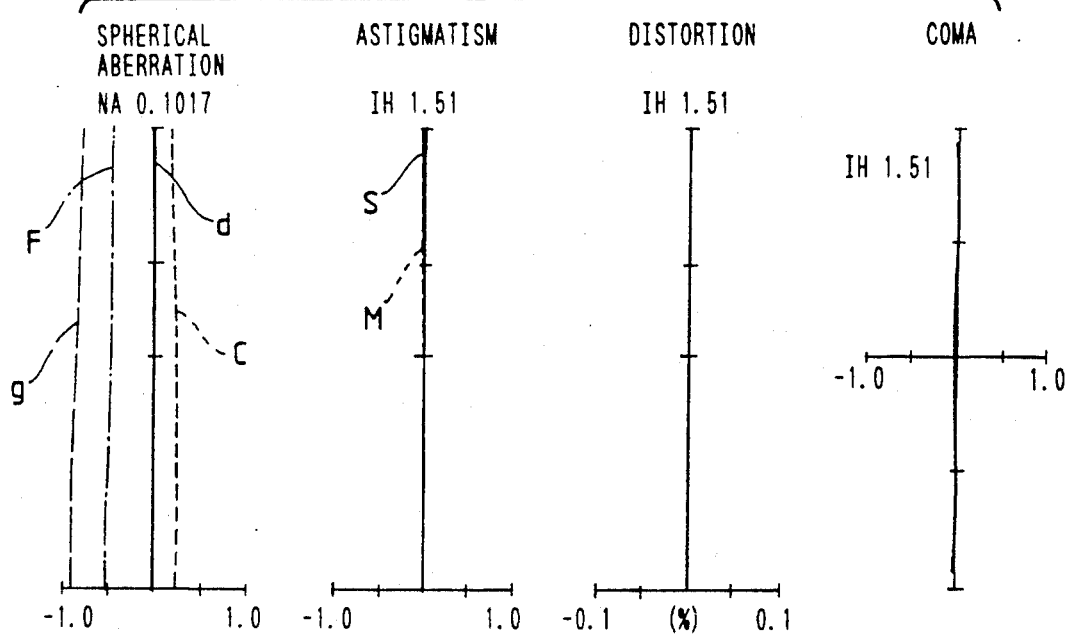
Figure 53:
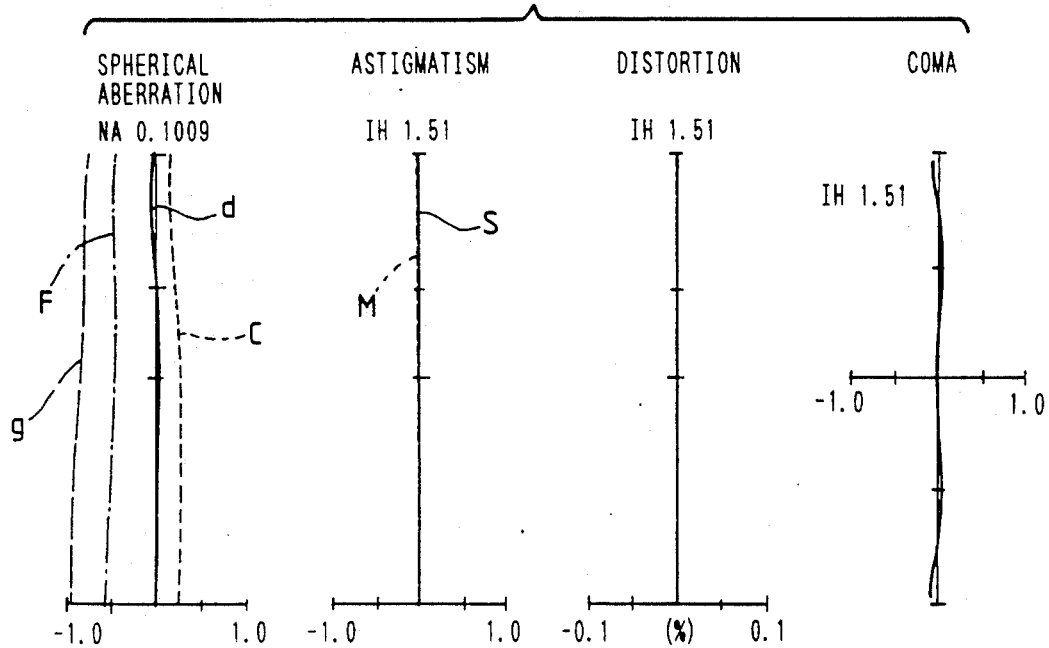
Figure 54:
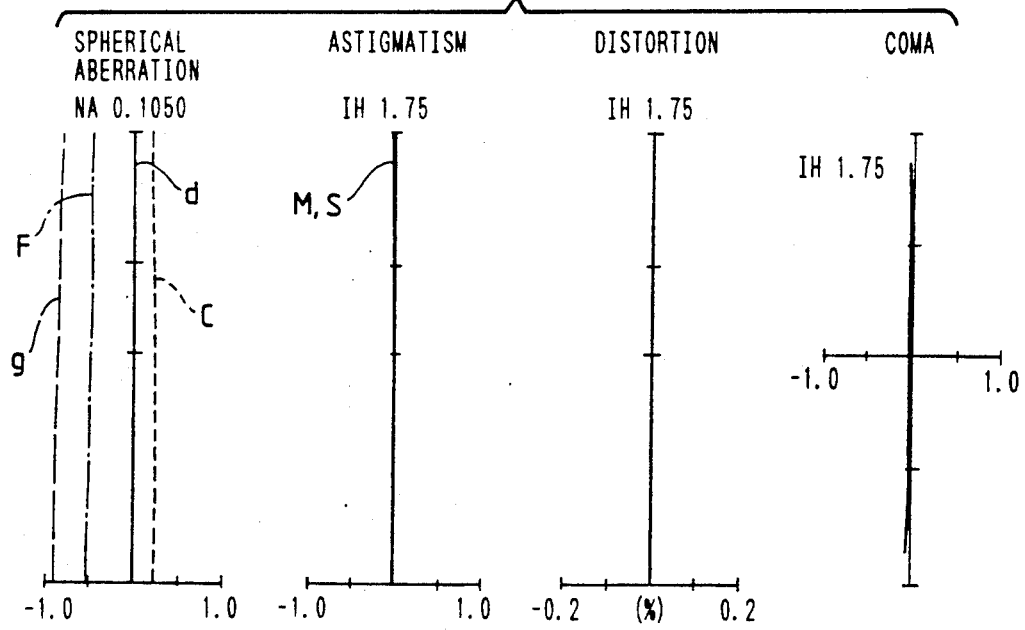
Figure 55:
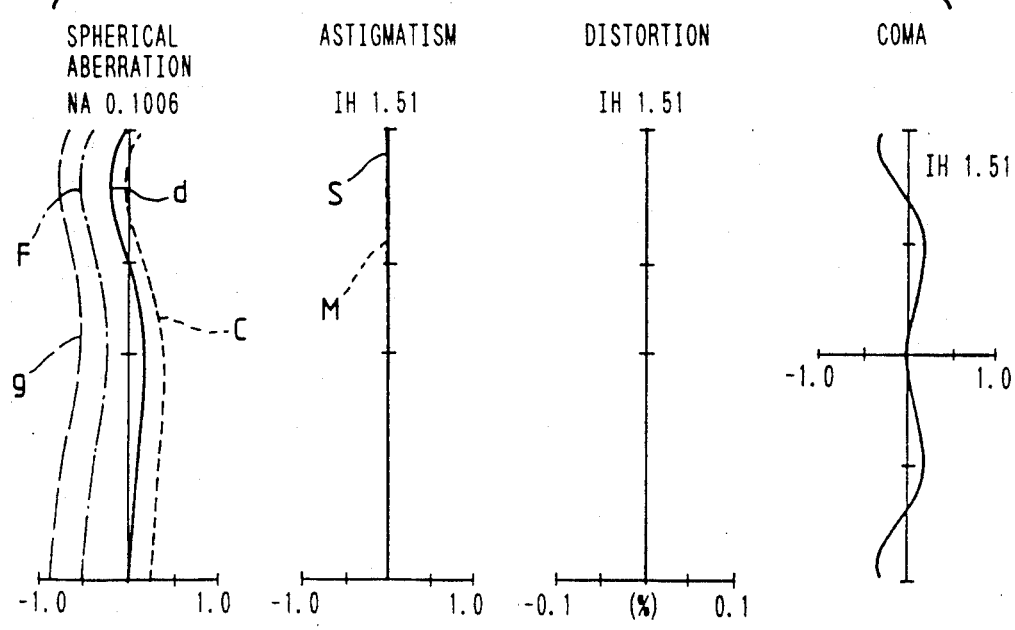
Figure 56:
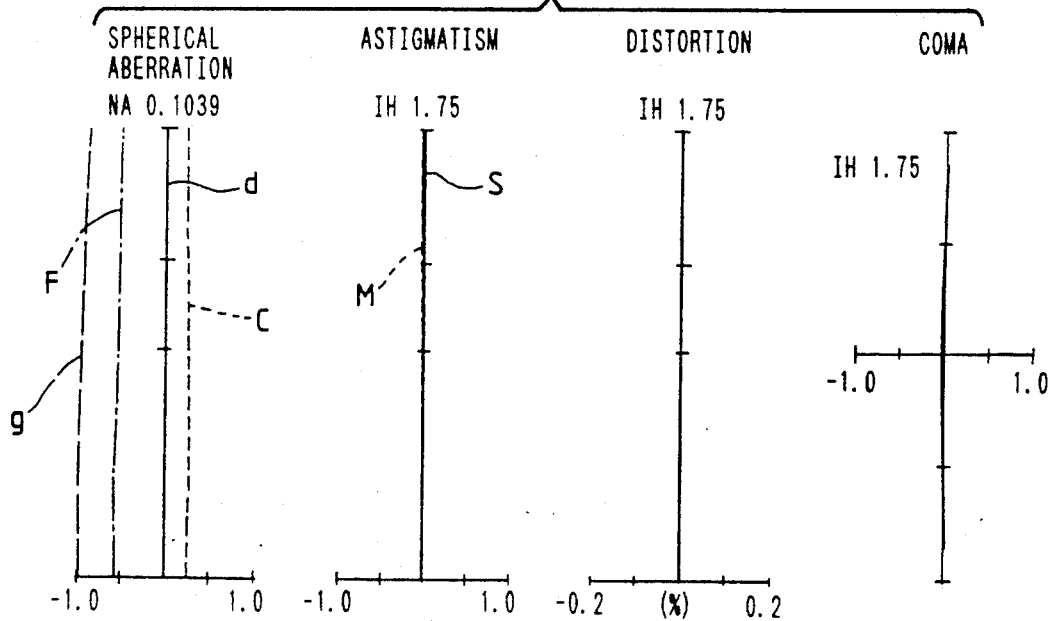
Figure 57:
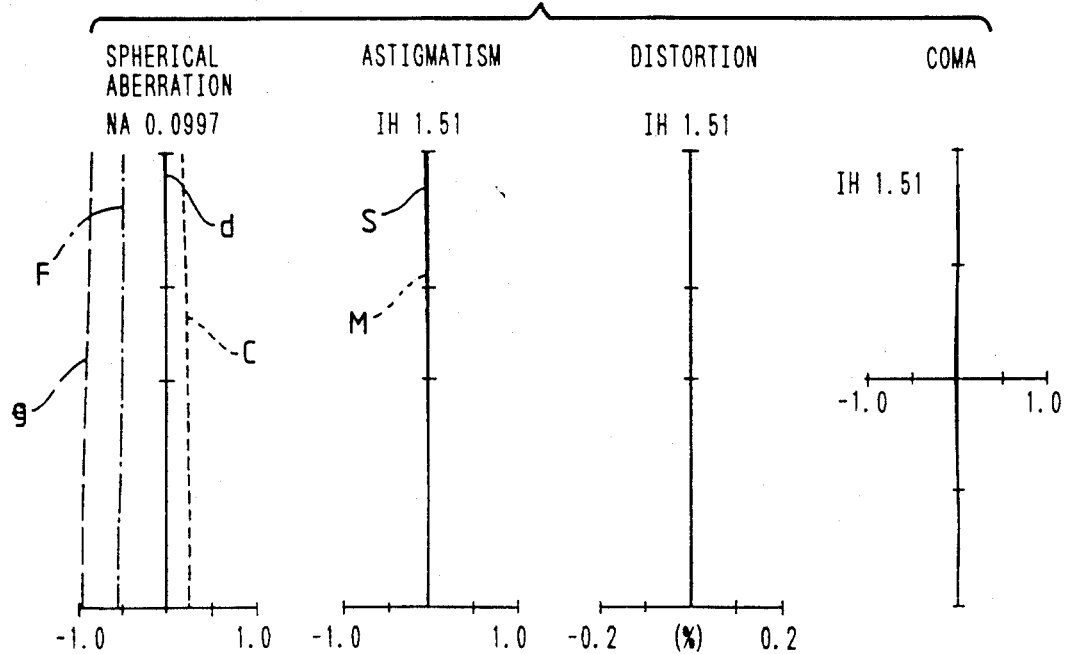

Aberration characteristics of the Embodiments 24 and 25 are visualized in FIG. 48 and FIG. 49 respectively.

Figure 20:
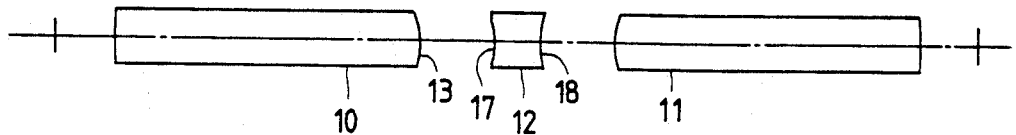
FIG. 20 shows a sectional view illustrating composition of Embodiments 26 through 33 of the image transmission optical system according to the present invention.

The Embodiments 26 through 33 have the composition shown in FIG. 20. In each of these embodiments, both the surfaces 17 and 18 of the biconcave lens component 12 are designed as aspherical surfaces in addition to the surfaces 13 and 14 for correcting spherical aberration, astigmatism and coma more favorably.

Aberration characteristics of the Embodiments 26 through 33 are presented in FIG. 50 through FIG. 57 respectively.

Figure 21:
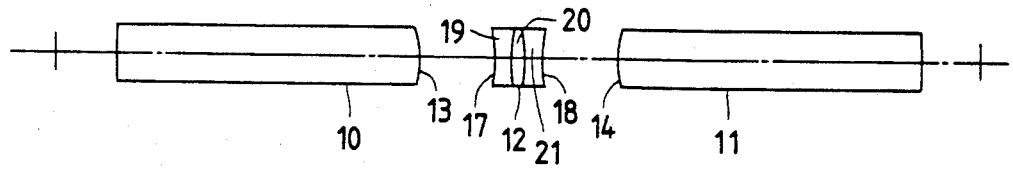
FIG. 21 shows a sectional view illustrating composition of Embodiments 34 and 35 of the image transmission optical system according to the present invention.

The Embodiments 34 and 35 have the composition shown in FIG. 21. These embodiments can be obtained by replacing, in the compositions similar to those of the Embodiments 3 through 10, the biconcave lens component 12 with a cemented triplet consisting of biconcave lens elements 19 and 20 a biconvex lens element 20. The biconcave lens component 12 is replaced with the cemented triplet for correcting the longitudinal chromatic aberration. The cemented triplet is to be designed to as to establish relationship of $\nu_n < \nu_p$ when Abbe's number of the biconcave lens element 19 or 21 is represented by $\nu_n$ and Abbe's number of the biconvex lens element is designated by $\nu_p$.

Figure 58:
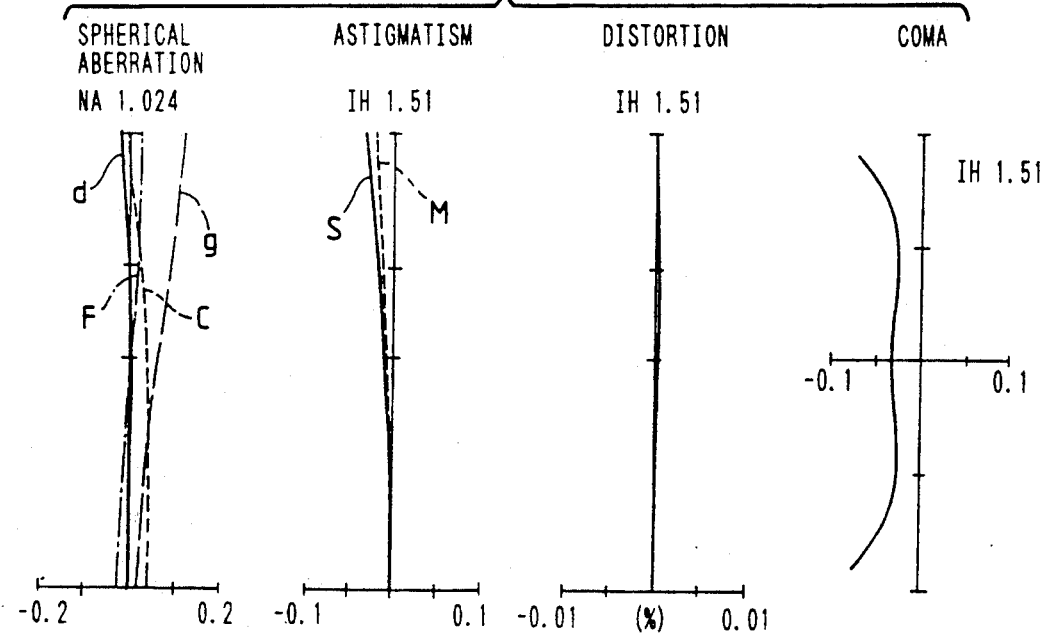
Figure 59:
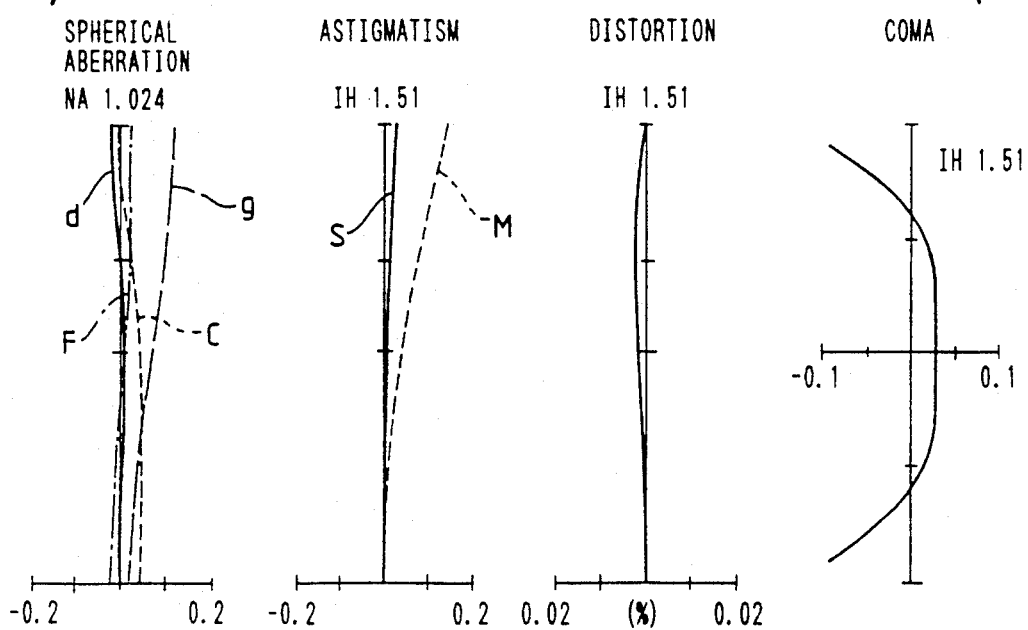

Aberration characteristics of the Embodiments 34 and 35 are illustrated in FIG. 58 and FIG. 59 respectively.

Figure 22:
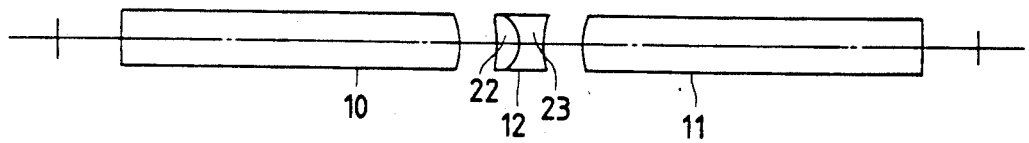
FIG. 22 through FIG. 24 show sectional views illustrating compositions of Embodiments 36 through 38 of the image transmission optical system according to the present invention.
Figure 23:
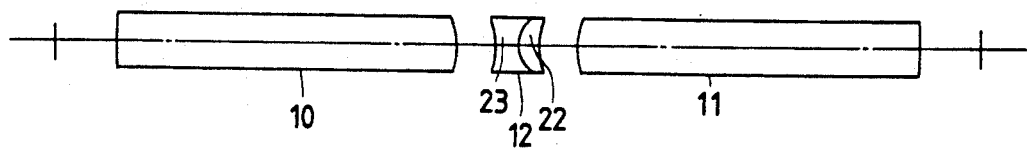

The Embodiments 36 and 37 have the compositions shown in FIG. 22 and FIG. 23 respectively. In either of these embodiments, the biconcave lens component 12 is replaced with a cemented doublet consisting of a biconcave lens element 23 and a convex lens 22 for correcting the longitudinal charomatic aberration. Abbe's numbers $\nu_n$ and $\nu_p$ of these lens elements are selected so as to establish relationship of $\nu_n < \nu_p$. Further, in order to correct coma and lateral chromatic aberration in each of these embodiments, the biconcave lens element 23 and the convex lens element 22 have refractive indices which are nearly equal to each other, and curvature is nearly the same on the air-contact surfaces of the biconcave lens component 12.

Figure 60:
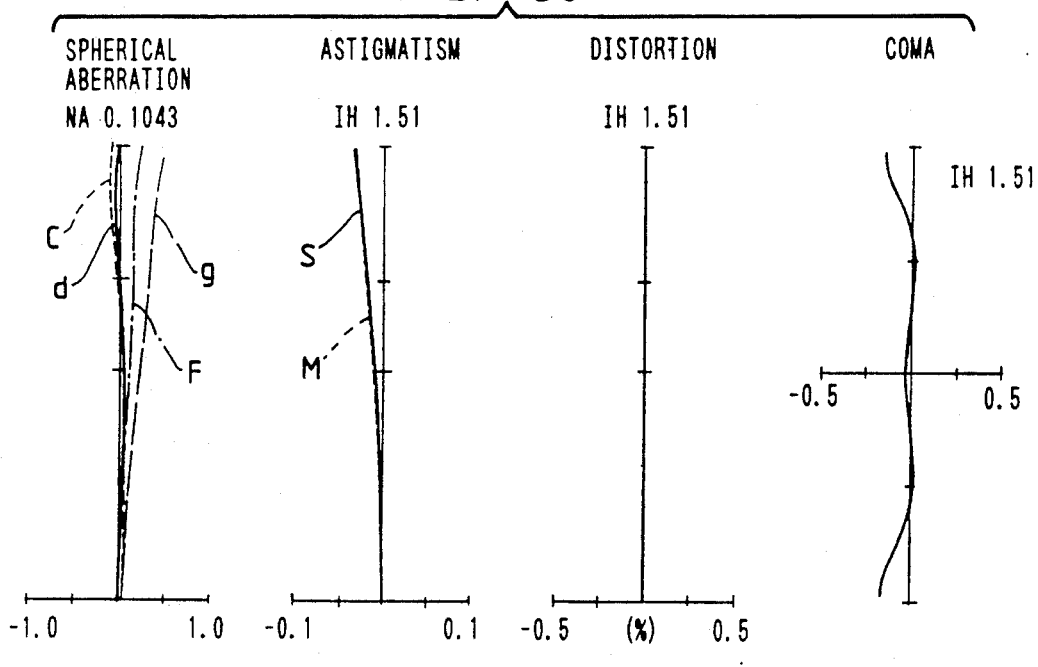
Figure 61:
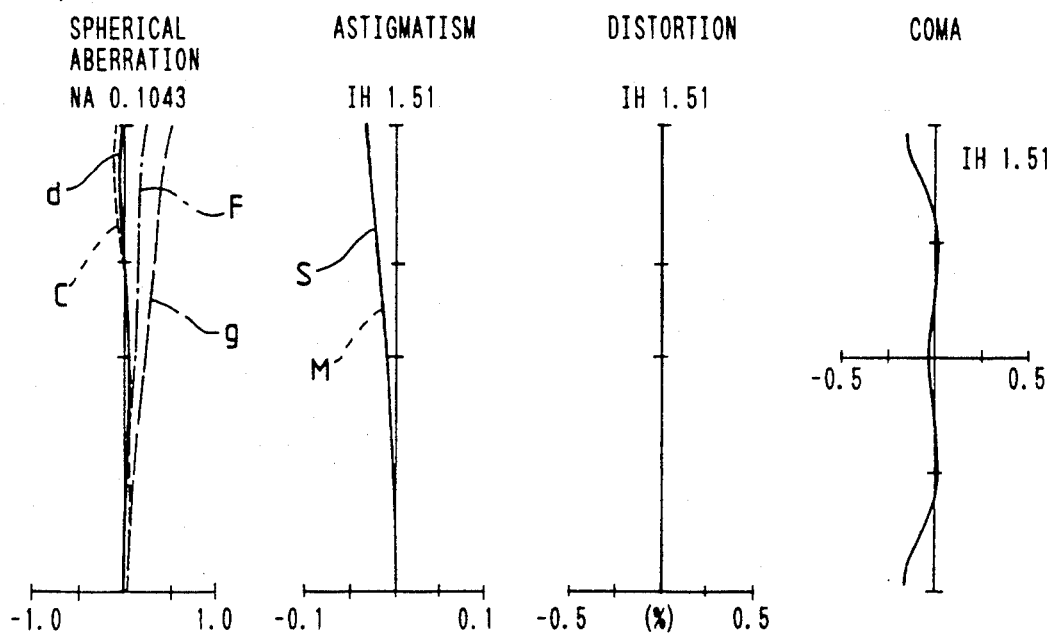

Aberration characteristics of the Embodiments 36 and 37 are illustrated in FIG. 60 and FIG. 61 respectively.

Figure 24:
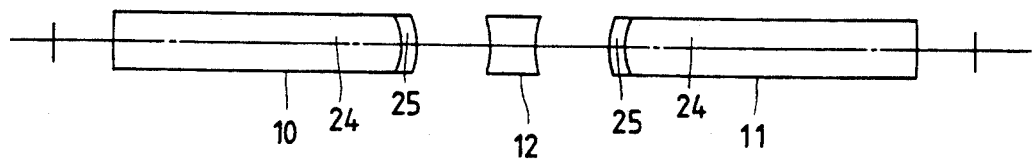
Figure 62:
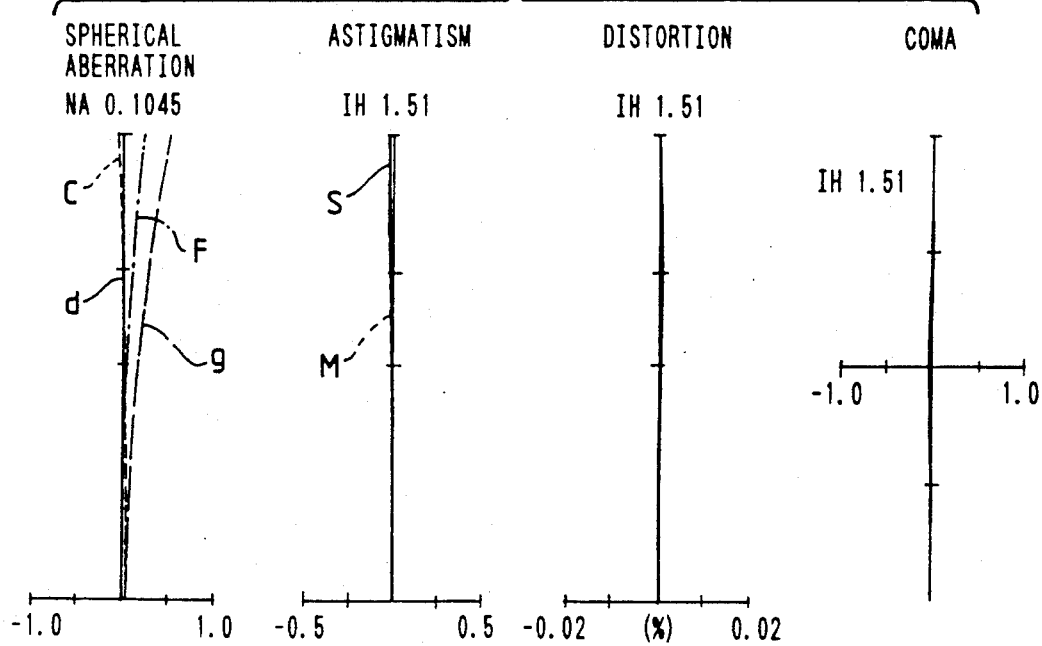

The Embodiment 38 is an optical system having the composition shown in FIG. 24. The Embodiment 38 is obtained by replacing, in the compositions of the Embodiment 26 through 32, each of the bar-shaped lens components 10 and 11 with a cemented doublet consisting of a biconvex lens element 24 and a concave lens element 25 for favorably correcting the longitudinal chromatic aberration, and selecting Abbe's numbers $\nu_p$ and $\nu_n$ of these lens element so as to satisfy a condition $\nu_n < \nu_p$. Aberration characteristics of the Embodiment 38 are shown in FIG. 62.

Figure 63:
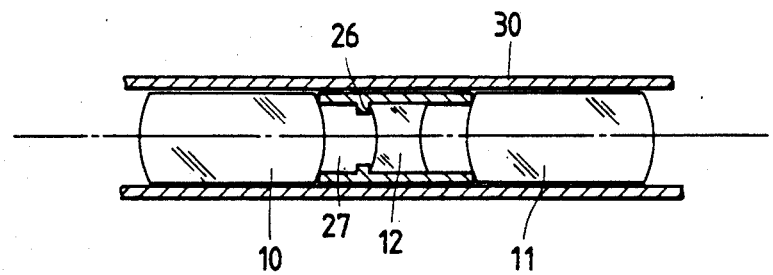
FIG. 63 and FIG. 64 show sectional views illustrating states wherein the lens components are accommodated in outer tubes.
Figure 64:
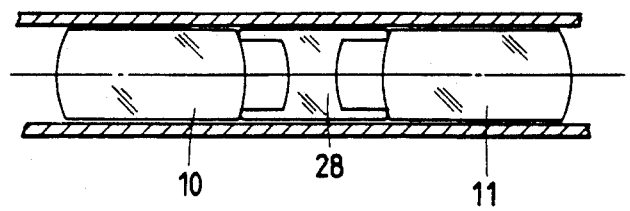

FIG. 63 and FIG. 64 show states wherein the lens components of the image transmission optical system according to the present invention are set in outer tubes 30.

FIG. 63 illustrates a spacing member 26 which is designed as a mounting means equipped inside thereof with a step for mounting and fixing the concave lens component 12 at a predetermined location in the spacing member 26. Since height of ray is low in the vicinity of the step formed as described above, rays cannot be eclipsed or amount of light cannot be reduced. In addition, the spacing member 26 is cemented to the concave lens component 12.

FIG. 64 shows a mounting means which is molded as an integral member serving both as the spacing member and the concave lens component. Such an integral member can easily be formed by molding a glass material or a plastic material.

Figure 65:
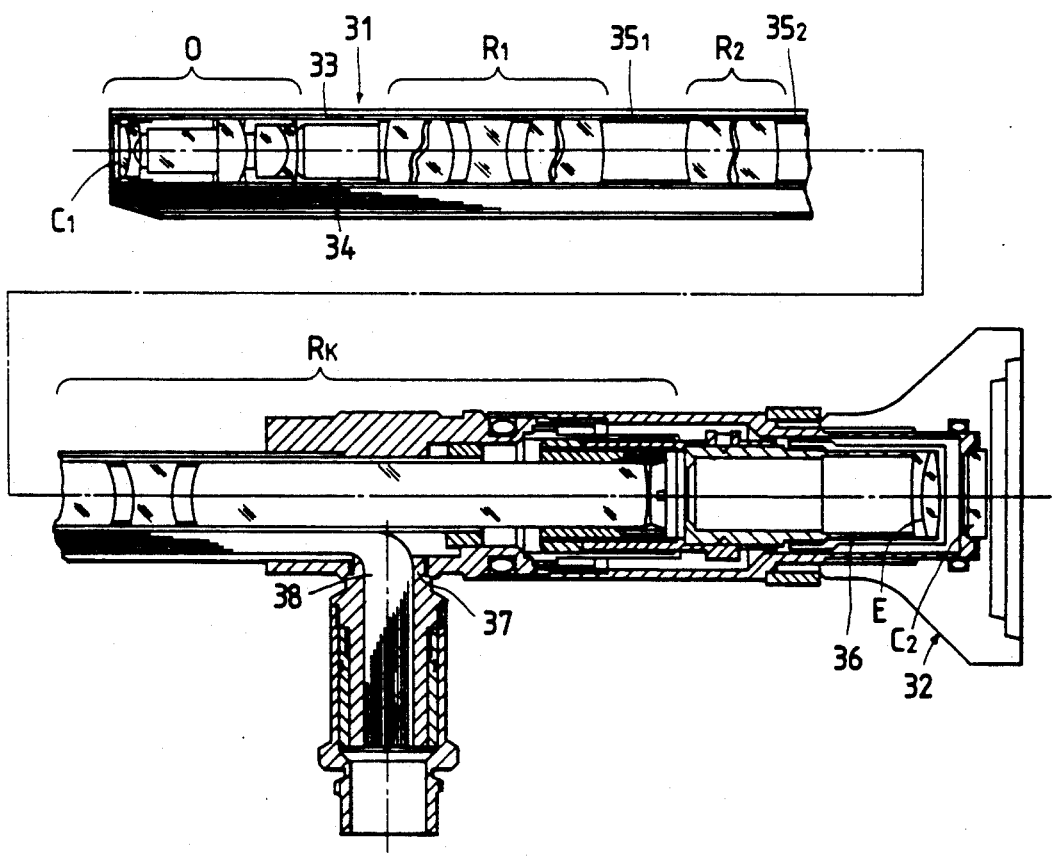
FIG. 65 shows a sectional view illustrating the main members of a non-flexible endoscope.

FIG. 65 shows a sectional view which is taken along a plane including the optical axis for illustrating the main members of a non-flexible endoscope equipped with an image transmission optical system.

A non-flexible endoscope consists of an insertion section 31 and eyepiece section 32 which are to be inserted into coelomata, and comprises an observation optical system and an illumination optical system.

The observation optical system is arranged in a cylindrical tube 33 which extends from the insertion section 31 to the eyepiece section, and equipped on the extremely object side thereof with a fixed objective lens 0 including a cover glass $C_1$. Arranged on the image side of an spacing tube 34 for the objective lens 0 are relay lens unit $R_1, R_2, \ldots R_k$ each serving for relaying an image for a unit relaying distances and spacing tubes $35_1, 35_2, \ldots 35_{k-1}$ alternately with one another. A relay lens system is composed of the relay lens units in the number of k. An eyepiece frame 36 having an eyepiece E fixed thereto is attached to the emergence side end of the cylindrical tube 33 and a cover glass C2 is arranged on the eyepiece section 32 so as to be opposed to the eyepiece lens E.

The illumination optical system is equipped with a light guide which consists of an optical fiber bundle, has an end exposed to a cable connector 37 for the light guide cable for illumination, is arranged so as to extend along the lower half of the cylindrical tube inside the insertion section, and has the other end exposed to the non-flexible endoscope in parallel with the objective lens 0.

Since non-flexible endoscopes of different types have variable lengths, image transmission optical systems to be used therewith comprise relay lens units in different numbers. It is therefore desirable that aberrations are corrected completely in each of the relay lens units.

However, aberrations may be corrected by objective lenses and/or eyepiece lenses even when aberrations are not corrected completely in the image transmission optical systems.

As a method for manufacturing lenses having aspherical surfaces, it is adequate to select molding of glass materials or plastic materials. It is desirable to select glass materials for manufacturing lens elements to be used in non-flexible endoscopes which generally comprise plural numbers of relay lens units, and to be used at various temperatures and humidities. Out of glass materials which have various refractive indices and dispersing characteristics, it is preferable to select, from the viewpoint of optical performance, glass materials having relatively low fusing temperatures as typically exemplified by dence flint glass materials.

As is understood from the foregoing description, the image transmission optical system according to the present invention, of either the type 1 or the type 2, comprises a small number of air-contact surfaces on the lens unit serving for relaying an image for a unit relaying distance, and has favorably corrected aberrations and astigmatism. Accordingly, the image transmission optical system according to the present invention allows little production of aberrations and very slight coloring of an image, and is quite suited for use with non-flexible endoscopes.

We claim:

1. An image relay optical system for reimaging an image of an object at a predetermined location comprising:

two bar-shaped cemented lens components, each of said bar-shaped lens components consisting of a bar-shaped lens element, and lens elements cemented to both end surfaces of each of said bar-shaped lens elements and having a refractive index higher than that of said bar-shaped lens element, wherein said lens unit satisfies the condition (9)

$$0.01 \leq D/L \leq 0.2 \qquad (9)$$

wherein the reference symbol L represents a distance as measured from the image of the object to a second image of the object reimaged by said image relay optical system, and the reference symbol D designates a distance as measured from the image of the object to a first surface of said optical system.

2. An image relay optical system for reimaging an image of an object at a predetermined location comprising:

two bar-shaped cemented lens components each consisting of a bar-shaped lens element, and lens elements cemented to end surfaces of said bar-shaped lens elements, said cemented lens elements having a refractive index higher than that of said bar-shaped lens elements, wherein each of the cemented surfaces and air-contact surface of the cemented lens elements of each of said bar-shaped lens components satisfy the following conduction (1)

$$-3 < \phi_A/(\phi_A - \phi_B - d/n_A \cdot \phi_A \cdot \phi_B) < 5 \qquad (1)$$

wherein the reference symbol d represents a distance as measured from said cemented surface to said air-contact surface, the reference symbol $n_A$ designates a refractive index of each of lens elements cemented to said bar-shaped lens element, the reference symbol $\phi_A$ denotes a refractive power of said air-contact surfaces and the reference symbol $\phi_B$ represents the refractive power of said cemented surfaces.

3. The image relay optical system according to claim 1 or 2, wherein said two bar-shaped lens components have the same shape.

4. The image relay optical system according to claim 1 or 2, wherein each of said bar-shaped lens is symmetrical about a center thereof as the optical system is viewed from right to left.

5. The image relay optical system according to claim 1, wherein the end surfaces having lens elements cemented thereto and air-contact surfaces of each of said bar shaped lens components satisfies the following condition (1)

$$-3 < \phi_A/(\phi_A + \phi_B - d/n_A \cdot \phi_A \cdot \phi_B) < 5 \qquad (1)$$

wherein the reference symbol d represents the distance as measured from said end surface to said air-contact surface, the reference symbol $n_A$ designates a refractive index of each of lens elements cemented to said bar-shaped components, the reference symbol $\phi_A$ denotes the refractive power of each of said air-contact surfaces and the reference symbol $\phi_B$ represents the refractive power of each of said cemented surfaces.

6. The image relay optical system according to claim 1 or 2 wherein each of said bar-shaped lens components includes at least one aspherical surface, wherein both a total sum of spherical aberration coefficients and a total sum of astigmatism coefficients for the surface of said bar-shaped lens component with lens elements cemented to end surfaces thereof comprise a reference sphere to said aspherical surface adopted in place thereof, have positive values, and said spherical surface has such a shape so as to progressively strengthen positive refractive power as the lens portions become farther from the optical axis toward the marginal portion.

7. The image relay optical system according to claim 1 or 2 wherein each of said bar-shaped lens components comprises at least one aspherical surface, wherein both spherical aberration coefficients and astigmatism coefficients for the cemented end surfaces of said bar-shaped lens component comprise a reference sphere of said aspherical surface adopted in place thereof, have negative values, and said aspherical surface has such a shape so as to progressively strengthen negative refractive power as the lens portions become farther from the optical axis toward the marginal portion.

8. The image relay optical system according to claim 1 or 2 wherein a cemented surface, from the cemented end surfaces in each of said bar-shaped lens components, located near the other bar-shaped lens component has a positive refractive power, and each of said bar-shaped lens components satisfies the following condition (2):

$$\nu_A > \nu_B \qquad (2)$$

wherein the reference symbol $\nu_A$ represents the Abbe's number of each of the lens elements of said bar-shaped lens component opposed to each other, and the reference symbol $\nu_B$ designates the Abbe's number of each of said bar-shaped elements.

9. The image relay optical system according to claim 1 or 2 wherein a cemented surface, from the cemented end surfaces in each of said bar-shaped lens components, located near the other bar-shaped lens component has a negative refractive power, and each of said bar-shaped lens components satisfies the following condition (3):

$$\nu_A < \nu_B \qquad (3)$$

wherein the reference symbol $\nu_A$ represents the Abbe's number of each of the lens elements of said bar-shaped lens components opposed to each other and the reference symbol $\nu_B$ designates the Abbe's number of each of the bar-shaped lens elements.

10. An image relay optical system for reimaging an image of an object at a predetermined location comprising:
    two bar-shaped cemented lens components each consisting of a bar-shaped lens element, and
    lens element cemented to both end surfaces of said bar-shaped lens element and having a refractive index higher than that of said bar-shaped lens element,
    said image relay optical system satisfying the following condition (10):

$$0 \leq D_4/L \leq 0.4 \qquad (10)$$

wherein the reference symbol $D_4$ represents a distance as measured between said two bar-shaped lens components and the reference symbol L represents a distance as measured from the image of the object to a second image of the object reimaged by said image relay optical system.

11. An image relay optical system for reimaging an image of an object at a predetermined location comprising:
    two bar-shaped lens components each consisting of a bar-shaped lens element, and
    lens elements cemented to end surfaces of each of said bar-shaped lens elements and having a refractive index higher than that of said bar-shaped lens elements.
    each of said bar-shaped lens components comprising at least one aspherical surface and satisfying the following conditions (7) and (8):

$$-2 \leq \Delta S \leq 0 \qquad (7)$$

$$\Delta S = \Sigma Si(ASP)/\Sigma Si(SP)$$

$$-3 \leq \Delta A \leq 0 \qquad (8)$$

$$\Delta A = \Sigma Ai(ASP)/\Sigma Ai(SP)$$

$$x = y^2/r(1 + \sqrt{1-(y/r)^2}) + Ey^4$$

wherein the reference symbol $\Sigma Si(ASP)$ represents total sum of spherical aberration coefficients of said aspherical surface, the reference symbol $\Sigma Si(SP)$ designates a total sum of spherical aberration coefficients of a spherical surface having a curvature equal to that of said aspherical surface in an area near an optical axis, the reference symbol $\Sigma Ai(ASP)$ denotes a total sum of astigmatism coefficients of said aspherical surface, the reference symbol $\Sigma Ai(AP)$ represents a total sum of astigmatism coefficients of the spherical surface having the same curvature as that of said aspherical surface in an area near the optical axis, the reference symbol x designates the optical axis taken as the abscissa, the reference symbol y denotes the direction perpendicular to the optical axis taken as the ordinate, the reference symbol r represents a radius of curvature on said aspherical surface as measured proximate the optical axis, and the reference symbol E designates a fourth order aspherical surface coefficient.

* * * * *